(12) United States Patent
Yoshida

(10) Patent No.: US 12,158,256 B2
(45) Date of Patent: *Dec. 3, 2024

(54) LIGHT-EMITTING DEVICE INCLUDING MOVEMENT MECHANISM

(71) Applicant: NICHIA CORPORATION, Anan (JP)

(72) Inventor: Norimasa Yoshida, Komatsushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/458,275

(22) Filed: Aug. 30, 2023

(65) Prior Publication Data

US 2023/0408754 A1    Dec. 21, 2023

Related U.S. Application Data

(63) Continuation of application No. 17/725,991, filed on Apr. 21, 2022, now Pat. No. 11,782,205.

(30) Foreign Application Priority Data

Apr. 28, 2021  (JP) .................................. 2021-076453
Nov. 16, 2021  (JP) .................................. 2021-186478

(51) Int. Cl.
*F21V 14/06*     (2006.01)
*F21V 5/04*      (2006.01)
(Continued)

(52) U.S. Cl.
CPC .............. *F21V 14/06* (2013.01); *F21V 5/045* (2013.01); *F21V 7/0091* (2013.01); *F21V 14/04* (2013.01);
(Continued)

(58) Field of Classification Search
CPC .......... F21V 5/045; F21V 14/02; F21V 14/06; F21V 17/02; F21V 17/162; F21V 19/004; F21V 19/02; G03B 2215/0585
See application file for complete search history.

(56) References Cited

U.S. PATENT DOCUMENTS 6,048,080 A    4/2000  Belliveau
6,792,028 B2   9/2004  Cook et al.
(Continued)

FOREIGN PATENT DOCUMENTS

CN    108397750 A    8/2018
JP    2002-072037 A  3/2002
(Continued)

OTHER PUBLICATIONS

Non-Final Office Action in U.S. Appl. No. 17/725,991 dated Feb. 10, 2023.

*Primary Examiner* — Keith G. Delahoussaye
(74) *Attorney, Agent, or Firm* — Foley & Lardner LLP

(57) ABSTRACT

A light-emitting device includes: a light-emitting unit having a light-emitting surface; a light guide member configured to guide light from the light-emitting unit, the light guide member having a first surface that includes an incident portion on which light from the light-emitting unit is incident, and a second surface from which the light exits, the second surface including a plurality of concentric protrusions; and a movement mechanism configured to move the light guide member such that the incident portion and the plurality of concentric protrusions move together relative to the light-emitting unit in a first direction that intersects a center axis of the light-emitting surface.

18 Claims, 38 Drawing Sheets

(51) Int. Cl.
*F21V 7/00* (2006.01)
*F21V 8/00* (2006.01)
*F21V 14/04* (2006.01)
*F21V 17/16* (2006.01)

(52) U.S. Cl.
CPC .......... *F21V 17/162* (2013.01); *G02B 6/0021* (2013.01); *G02B 6/0038* (2013.01); *G02B 6/0088* (2013.01)

(56) References Cited

U.S. PATENT DOCUMENTS

| | | | |
|---|---|---|---|
| 10,819,898 | B1 | 10/2020 | Han et al. |
| 10,881,052 | B1 | 1/2021 | Tsao |
| 2002/0036839 | A1 | 3/2002 | Kishima et al. |
| 2006/0139918 | A1* | 6/2006 | Dolgin .................. G02B 3/00 362/232 |
| 2006/0239000 | A1 | 10/2006 | McDermott et al. |
| 2008/0037116 | A1 | 2/2008 | Alasaarela et al. |
| 2010/0061090 | A1* | 3/2010 | Bergman .............. F21V 5/007 362/231 |
| 2010/0103677 | A1 | 4/2010 | Belliveau et al. |
| 2012/0063146 | A1 | 3/2012 | Kawagoe et al. |
| 2013/0265756 | A1 | 10/2013 | Christoffersen |
| 2014/0313744 | A1 | 10/2014 | Collias |
| 2014/0316742 | A1 | 10/2014 | Sun et al. |
| 2016/0072996 | A1 | 3/2016 | Rammah et al. |
| 2018/0112848 | A1 | 4/2018 | Streppel |
| 2019/0280174 | A1 | 9/2019 | Okahisa et al. |
| 2020/0089059 | A1 | 3/2020 | Nakamura |
| 2021/0108780 | A1 | 4/2021 | Huang et al. |
| 2022/0333751 | A1 | 10/2022 | Yoshida |

FOREIGN PATENT DOCUMENTS

| | | |
|---|---|---|
| JP | 2004-046053 A | 2/2004 |
| JP | 2006-330052 A | 12/2006 |
| JP | 2011-096666 A | 5/2011 |
| JP | 2011-184468 A | 9/2011 |
| JP | 2012-049214 A | 3/2012 |
| JP | 2012-069409 A | 4/2012 |
| JP | 2014-182994 A | 9/2014 |
| JP | 2015-507817 A | 3/2015 |
| JP | 2015-195170 A | 11/2015 |
| JP | 2016-031846 A | 3/2016 |
| JP | 2018-098162 A | 6/2018 |
| JP | 2018-205349 A | 12/2018 |
| JP | 2019-160780 A | 9/2019 |
| JP | 2020-053194 A | 4/2020 |
| WO | WO-2006/072885 A1 | 7/2006 |
| WO | WO-2011/055519 A1 | 5/2011 |
| WO | WO-2013/065408 A1 | 5/2013 |

* cited by examiner

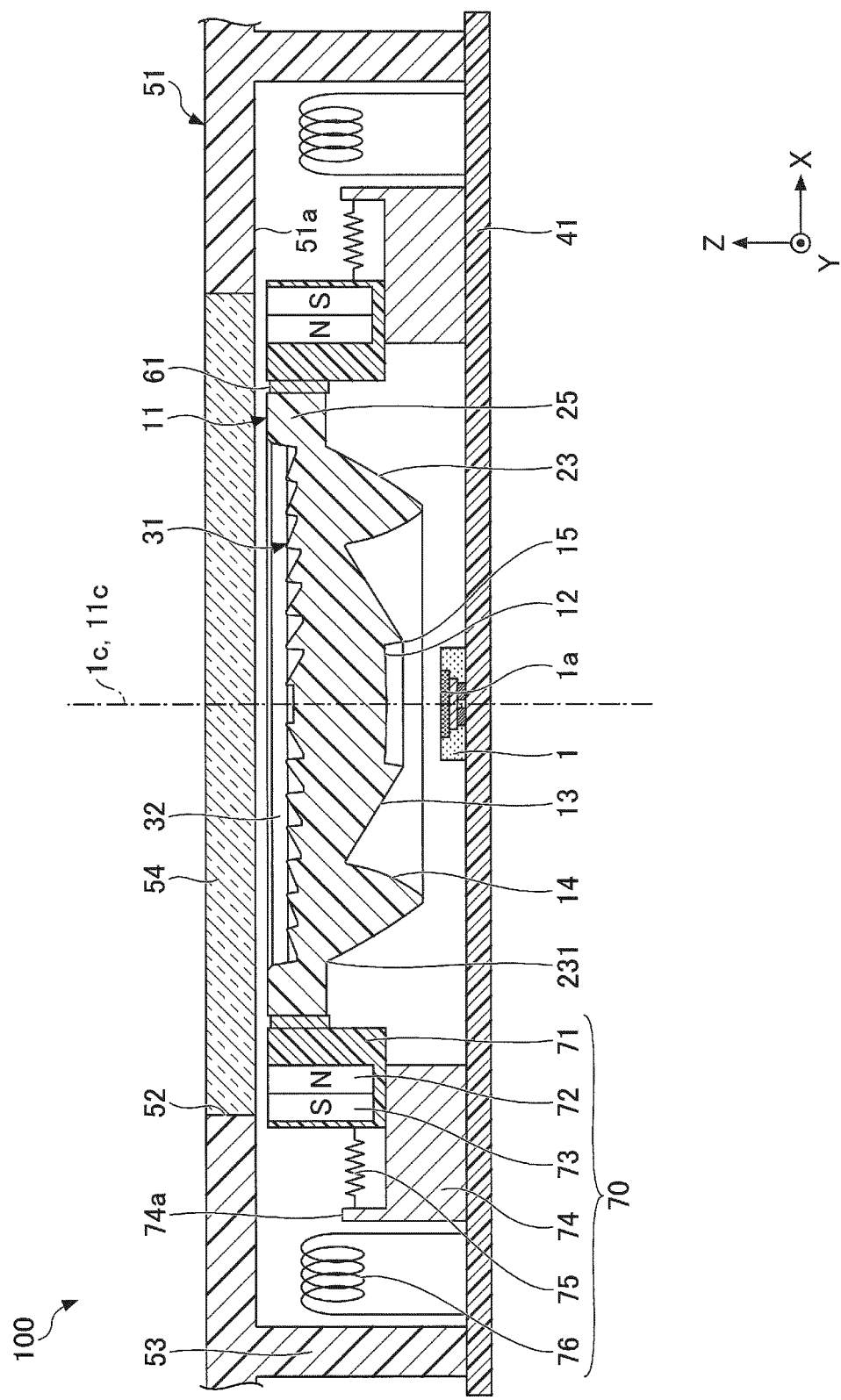

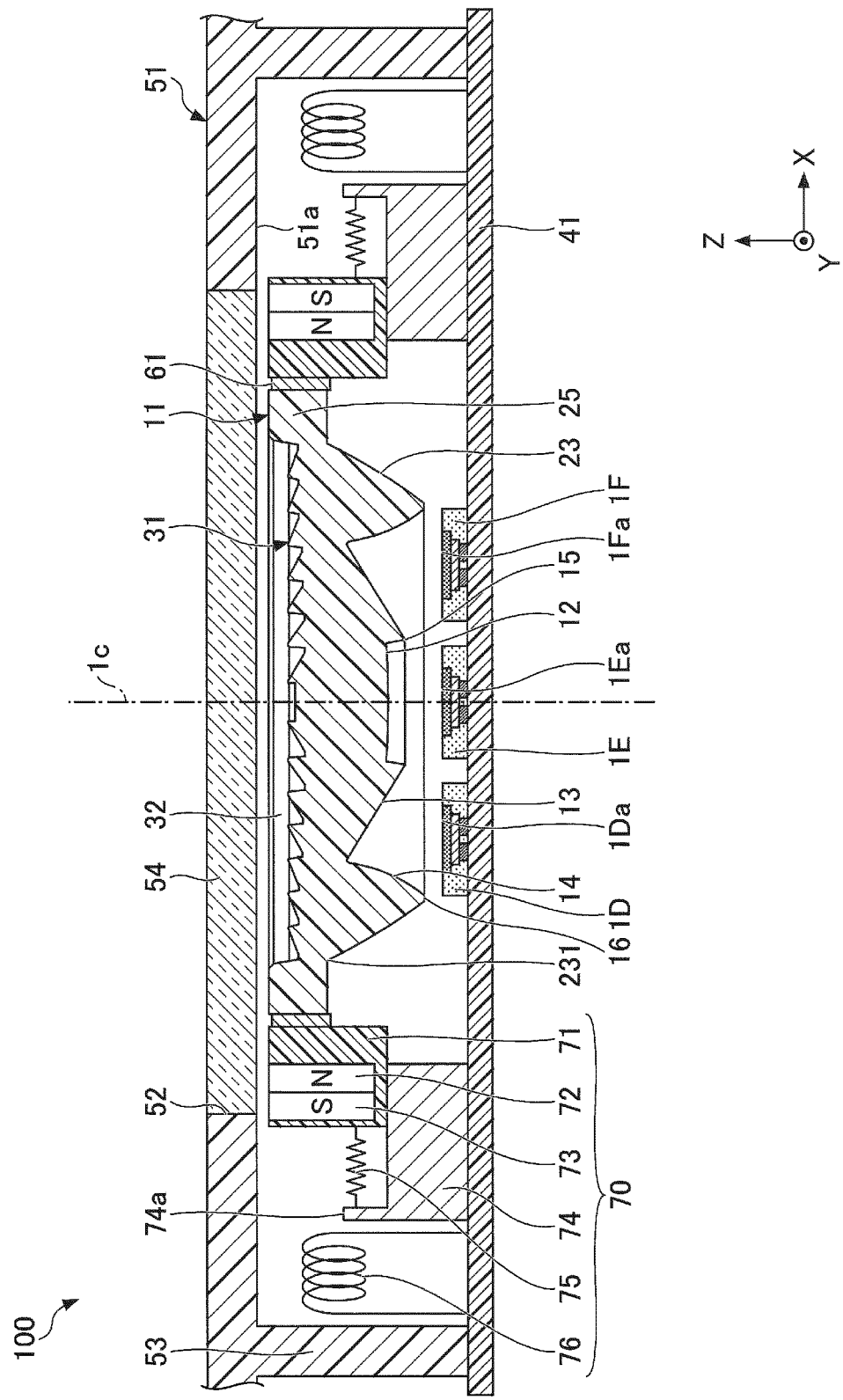

LIGHT-EMITTING DEVICE INCLUDING MOVEMENT MECHANISM

CROSS-REFERENCE TO RELATED APPLICATION

This application is a continuation of U.S. patent application Ser. No. 17/725,991, filed on Apr. 21, 2022, which claims priority to Japanese Patent Application No. 2021-076453, filed on Apr. 28, 2021, and Japanese Patent Application No. 2021-186478, filed on Nov. 16, 2021. The disclosures of these applications are hereby incorporated by reference in their entireties.

BACKGROUND

The present disclosure relates to a light-emitting device.

A light-emitting device including a light-emitting diode or the like is widely used. For example, the configuration described in Japanese Patent Publication No. 2020-53194 includes a light source, a lens through which light emitted from the light source in a first direction passes through, and a support mechanism that movably supports the lens relative to the light source in a second direction that intersects the first direction.

SUMMARY

A light-emitting device is required to efficiently extract light from a light-emitting unit to outside of the light-emitting unit.

An embodiment according to the present disclosure is directed at providing a light-emitting device capable of changing the radiation direction of light and efficiently extracting light from a light-emitting unit to outside of the light-emitting unit.

A light-emitting device according to an embodiment of the present disclosure includes: a light-emitting unit having a light-emitting surface; a light guide member configured to guide incident light from the light-emitting unit, the light guide member including: a total reflection portion configured to reflect the incident light from the light-emitting unit and a Fresnel lens portion where light reflected by the total reflection portion is incident; and a movement mechanism configured to move the light guide member relative to the light-emitting unit in a direction that intersects a center axis of the light-emitting surface.

According to the light-emitting device according to the embodiment of the present disclosure, the light-emitting device can change the radiation direction of light and efficiently extract the light from the light-emitting unit to outside of the light-emitting unit.

BRIEF DESCRIPTION OF DRAWINGS

FIG. 5 is a cross-sectional view of the configuration of a light-emitting device according to an embodiment.

FIG. 6B is a cross-sectional view illustrating a configuration example of a light-emitting device provided with a plurality of light-emitting units.

DETAILED DESCRIPTION

Figure 1:
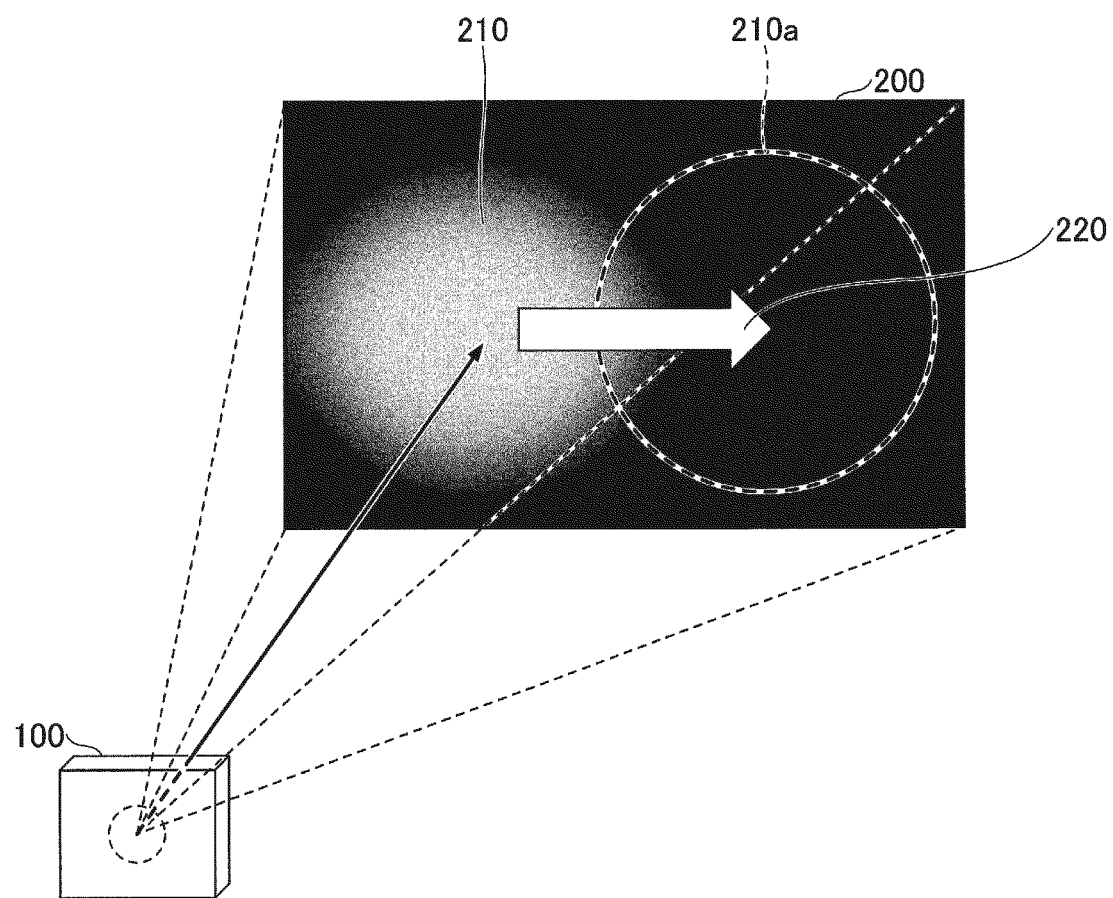
FIG. 1 is a diagram for illustrating partial irradiation of light by a light-emitting device according to an embodiment.

A light-emitting device according to an embodiment of the present invention will be described in detail with reference to the drawings. The following embodiments illustrate a light-emitting device for embodying the technical concepts of the present invention, but the present invention is not limited to the following embodiments. In addition, dimensions, materials, shapes, relative arrangements, or the like of constituent members described in the embodiments are not intended to limit the scope of the present invention, unless otherwise specified, and are merely exemplary. Note that the size, positional relationship, or the like of members illustrated in the drawings may be exaggerated for clarity of description. Further, in the following description, members having the same terms and reference characters represent the same or similar members, and a repeated detailed description of these members will be omitted as appropriate. As a cross-sectional view, an end view illustrating only a cut surface may be used.

In the drawings described below, directions may be indicated by an X-axis, a Y-axis, and a Z-axis. An X direction along the X-axis indicates a predetermined direction in a plane including a light-emitting surface of a light-emitting unit of a light-emitting device according to an embodiment, a Y direction along the Y-axis indicates a direction orthogonal to the X-direction in the plane, and a Z direction along the Z-axis indicates a direction orthogonal to the plane.

Further, the direction in the X direction in which the arrow indicates is the +X direction or the +X side and the opposite direction to the +X direction is the −X direction or the −X side, the direction in the Y direction in which the arrow indicates is the +Y direction or the +Y side and the opposite direction to the +Y direction is the −Y direction or the −Y side. The direction in the Z direction in which the arrow indicates is the +Z direction or the +Z side and the opposite direction to the +Z direction is the −Z direction or the −Z side. In the embodiments, the light-emitting unit of the light-emitting device emits light in the +Z direction as an example. Also, the expression "in a plan view" used in the embodiment refers to viewing the object from the Z direction. However, this does not limit the orientation of the light-emitting device during use, and the orientation of the light-emitting device may be any chosen orientation.

A light-emitting device according to an embodiment includes a light-emitting unit including a light-emitting surface; a light guide member including a total reflection portion that reflects incident light from the light-emitting unit and a Fresnel lens portion where the light reflected by the total reflection portion is incident, the light guide member being configured to guide the incident light; and a movement mechanism configured to move the light guide member relative to the light-emitting unit in a direction that intersects a center axis of the light-emitting surface. The light-emitting device can partially irradiate light to a desired region, which is part of an irradiatable region able to be irradiated with light by the light-emitting device, and can change the partial irradiation region via relative movement by the movement mechanism. Here, the Fresnel lens portion refers to a portion in which a convex or concave lens shape is divided into concentric regions, and the cross section of each region has a sawtooth shape.

FIG. 1 is a diagram for illustrating partial irradiation of light by a light-emitting device 100 according to an embodiment. In FIG. 1, the light-emitting device 100 irradiates light to a partial irradiation region 210, which is a part of an irradiatable region 200, and does not irradiate light to regions other than the partial irradiation region 210.

In a static state in which the light-emitting device 100 itself is stationary, via relative movement by the movement mechanism, the region partially irradiated with light, for example, can be moved in the direction of an arrow 220 and can be changed from the partial irradiation region 210 to a partial irradiation region 210a.

The irradiatable region 200 is a region that can be irradiated with light by the light-emitting device 100 while the light-emitting device 100 is in a static state, or, in other words, a region in which the partial irradiation region 210 can be changed via relative movement by the movement mechanism. Furthermore, "partial irradiation" refers to partially irradiating a part of the irradiatable region 200 with light.

In FIG. 1, as an example, the irradiatable region 200 is a substantially rectangular region and the partial irradiation region 210 is a substantially circular region. However, no such limitation is intended. The irradiatable region 200 may be a substantially circular or a substantially elliptical shaped region, and the partial irradiation region 210 may be a substantially rectangular or a substantially elliptical shaped region, for example.

Figure 2:
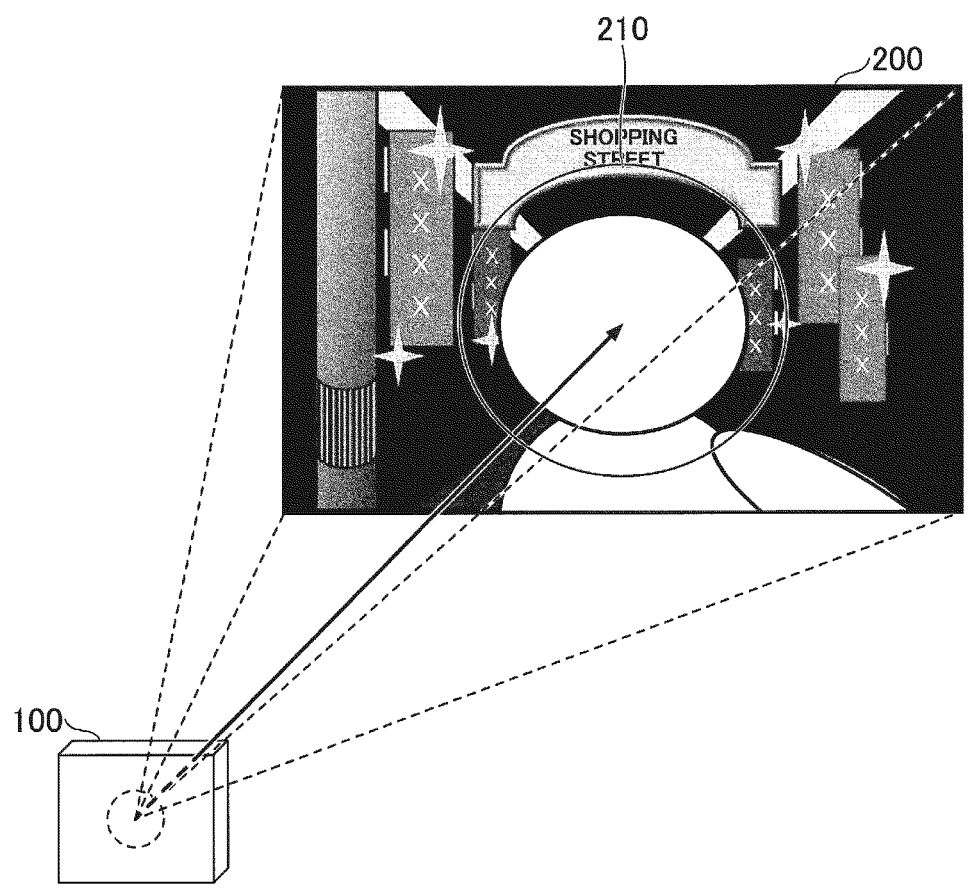
FIG. 2 is a diagram illustrating a first example of a usage situation of a light-emitting device according to an embodiment.
Figure 3:
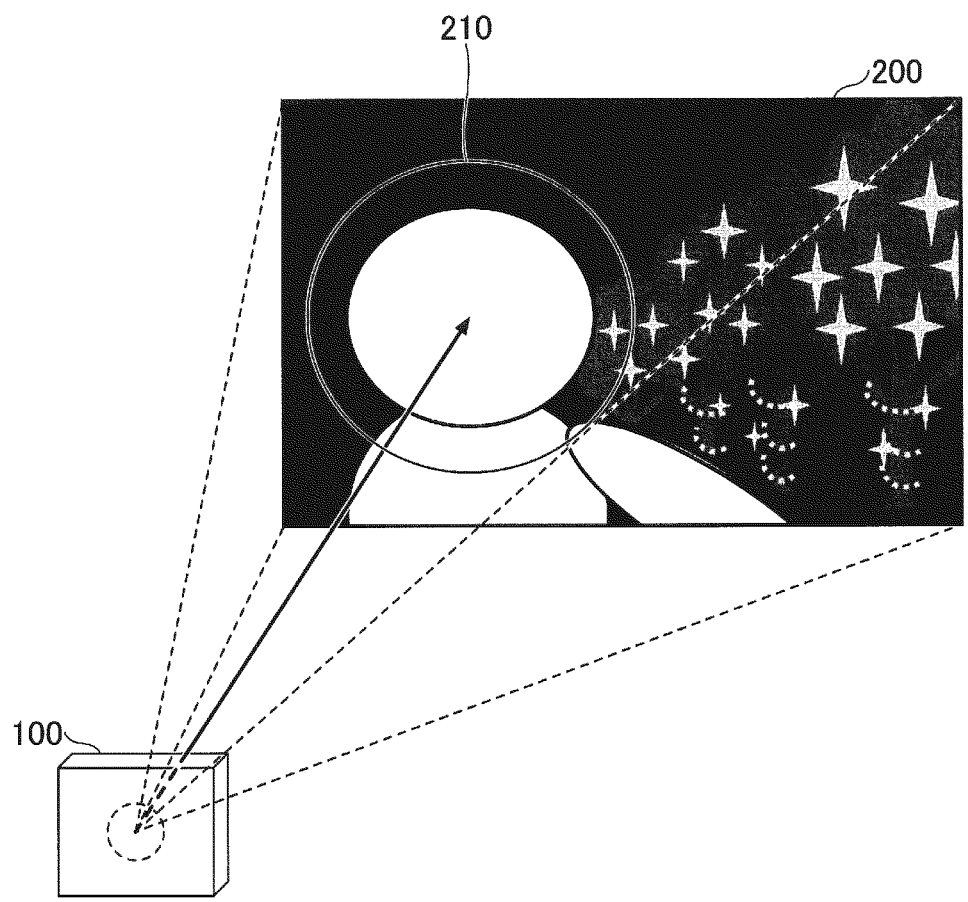
FIG. 3 is a diagram illustrating a second example of a usage situation of a light-emitting device according to an embodiment.
Figure 4:
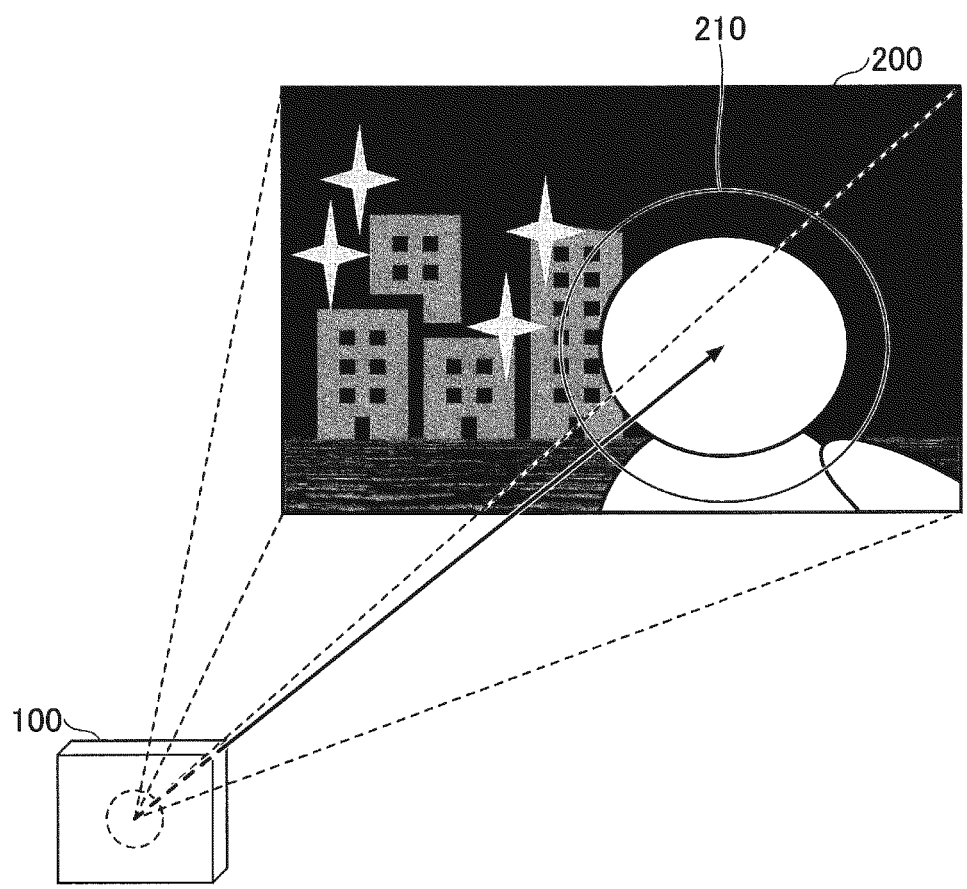
FIG. 4 is a diagram illustrating a third example of a usage situation of a light-emitting device according to an embodiment.

FIGS. 2 to 4 are diagrams illustrating examples of situations in which the light-emitting device 100 is used. FIG. 2 is a first example, FIG. 3 is a second example, and FIG. 4 is a third example. FIGS. 2 to 4 illustrate a usage situation where the light-emitting device 100 is installed in an imaging apparatus, such as a camera or a video camera, and image capture is performed using the light emitted from the light-emitting device 100 as illumination light.

FIGS. 2 to 4 illustrate an image of a person being captured in a dark environment such as at night. In FIG. 2, the image of the person is captured with a shopping street as the background, in FIG. 3 the background is illumination lights, and in FIG. 4 the background is a night scene. By partially irradiating only the region around the person without irradiating the background region with light, the background can be clearly captured and a desired region, such as the face of the person, can be captured with bright image capture conditions.

For example, in a case in which the light-emitting device 100 is installed in a smart phone and the camera installed in the smart phone captures an image in the usage situations of FIGS. 2 to 4, relative movement by the movement mechanism linked to a touch operation by the user of the smart phone on a touch panel doubling as both a display screen and an operation screen is possible.

The user checks the position of the person in a still image or moving images displayed on the touch panel and performs a touch operation to partially irradiate the person at the position of the person. For example, the light-emitting device 100 moves the partial irradiation light along a trajectory drawn with a finger by the user on the touch panel to change the partial irradiation region 210.

The partial irradiation light continues to illuminate while moving, without a break in the irradiation. As a result, the user can capture still images or video while viewing the still images or video in real-time. Accordingly, with a simple operation, the background can be clearly captured and a desired region, such as the face of the person, can be captured with bright image capture conditions.

However, the light-emitting device 100 is not limited to being used in image capture with a camera as described above and may be used in any light irradiation applications. Also, the device or apparatus in which the light-emitting device 100 is installed is not limited to a camera or a smart phone, and the light-emitting device 100 can be installed in various lighting devices, vehicles, and the like.

The configuration and function of the light-emitting device 100 will be described in detail below.

Overall Configuration Example

Figure 6A:
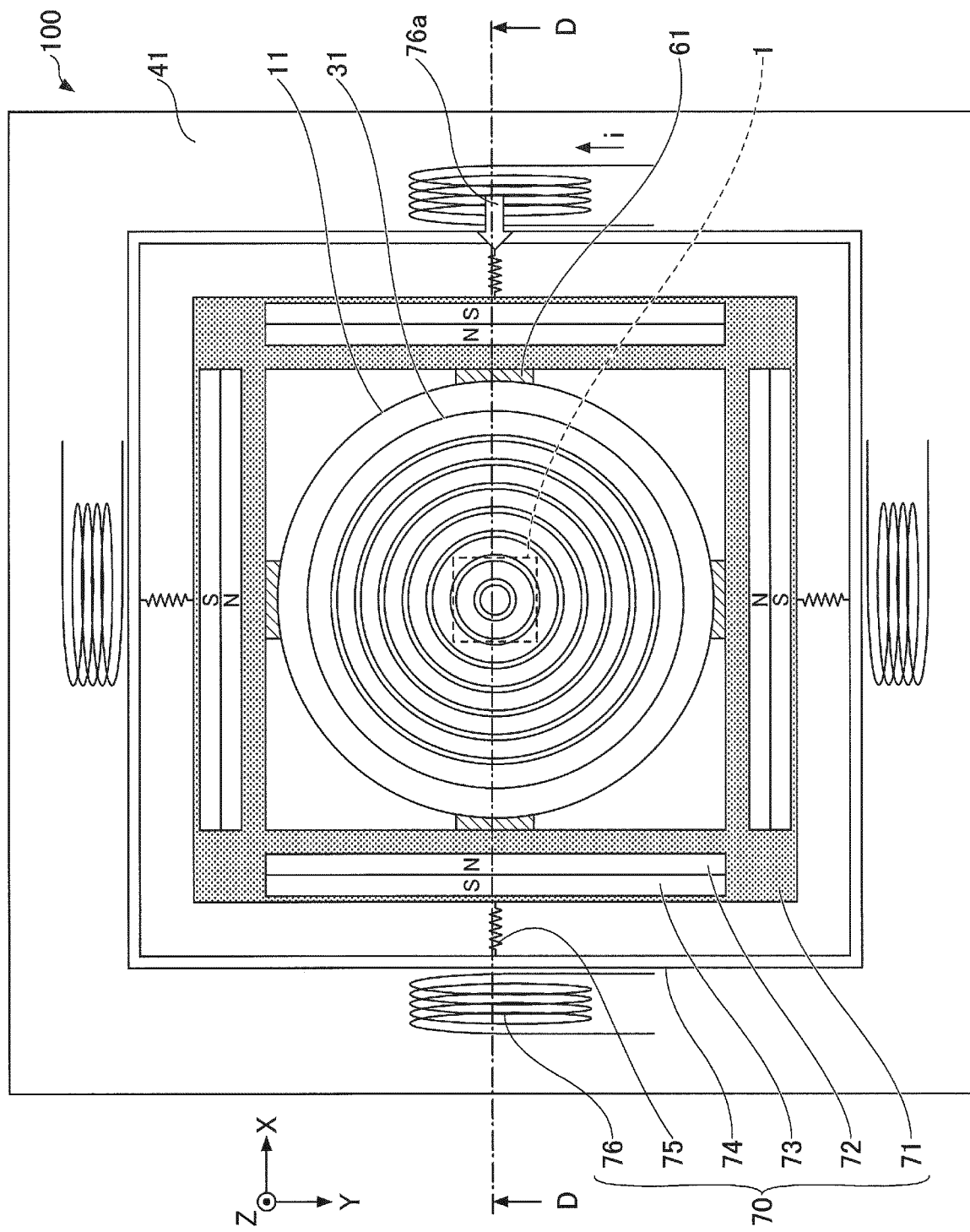
FIG. 6A is a plan view, as seen from a light guide member side, of a light-emitting device according to an embodiment with a housing and a light-transmitting body omitted.
Figure 7:
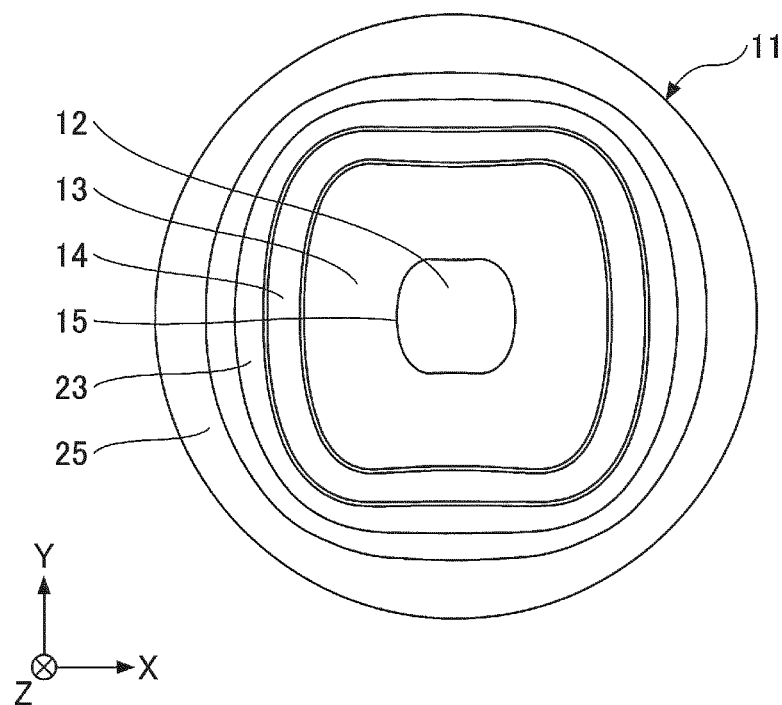
FIG. 7 is a plan view of a light guide member of a light-emitting device according to an embodiment as seen from a light-emitting unit side.

FIG. 5 is a cross-sectional view illustrating an example of the configuration of the light-emitting device 100 according to an embodiment. FIG. 6A is a plan view, as seen from a light guide member 11 side, of the light-emitting device 100 with a housing 51 and a light-transmitting body 54 omitted. FIG. 7 is a plan view of the light guide member 11, as seen from a light-emitting unit 1 side. Note that FIG. 5 is a cross-sectional view taken along line D-D of the light-emitting device 100 illustrated in FIG. 6A.

As illustrated in FIGS. 5 to 7, the light-emitting device 100 includes the light-emitting unit 1, the light guide member 11, and a movement mechanism 70.

Figure 6C:
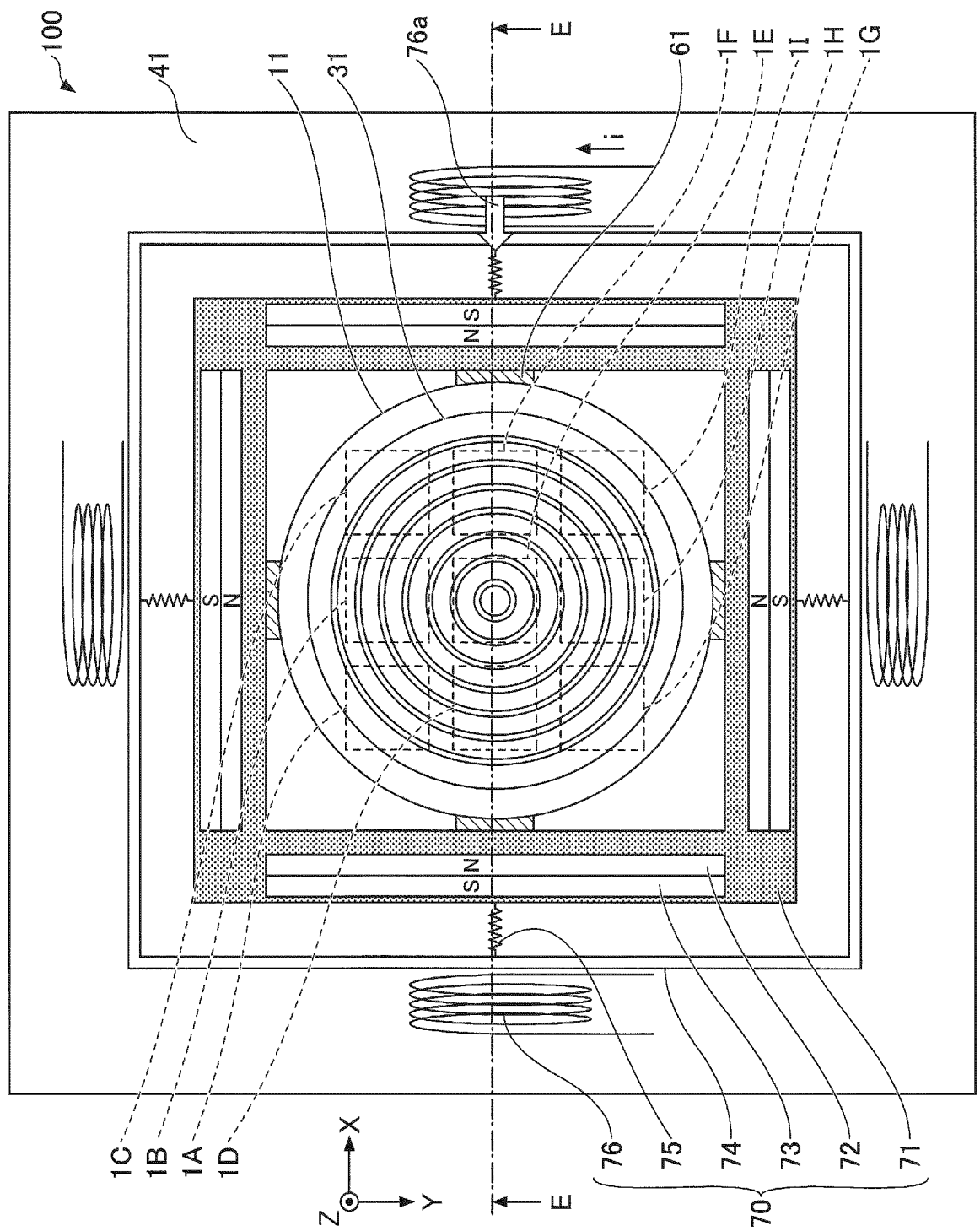
FIG. 6C is a plan view, as seen from a light guide member side, of the light-emitting device in FIG. 6B with the housing and the light-transmitting body omitted.

The light-emitting unit 1 has a substantially rectangular shape in a plan view and is mounted on a +Z side surface of a light-emitting unit mounting substrate 41. It is only required that at least one light-emitting unit 1 is provided, but a plurality of the light-emitting units 1 may be provided, for example. FIG. 6B is a cross-sectional view illustrating an example of the configuration of the light-emitting device 100 including a plurality of the light-emitting units 1. FIG. 6C is a plan view of the light-emitting device 100 in FIG. 6B as seen from a light guide member 11 side, with the housing 51 and the light-transmitting body 54 omitted. Note that FIG. 6B is a cross-sectional view taken along line E-E of the light-emitting device 100 illustrated in FIG. 6C.

As illustrated in FIGS. 6B and 6C, as the plurality of light-emitting units 1, nine light-emitting units, that is, light-emitting units 1A, 1B, 1C, 1D, 1E, 1F, 1G, 1H, 1I, are arranged lengthwise, widthwise or in a grid-like manner in a plan view. The light-emitting unit 1A includes a light-emitting surface 1Aa, the light-emitting unit 1B includes a light-emitting surface 1Ba, the light-emitting unit 1C includes a light-emitting surface 1Ca, the light-emitting unit 1D includes a light-emitting surface 1Da, and the light-emitting unit 1E includes a light-emitting surface 1Ea. Furthermore, the light-emitting unit 1F includes a light-emitting surface 1Fa, the light-emitting unit 1G includes a light-emitting surface 1Ga, the light-emitting unit 1H includes a light-emitting surface 1Ha, and the light-emitting unit 1I includes a light-emitting surface 1Ia. Preferably, all of the light-emitting surfaces 1Aa, 1Ba, 1Ca, 1Da, 1Ea, 1Fa, 1Ga, 1Ha, and 1Ia of the light-emitting units 1A, 1B, 1C, 1D, 1E, 1F, 1G, 1H, and 1I are disposed inward of a total reflection portion 23 in a plan view (specifically, inward of a lowest portion 16 of the frame-like light guide member 11 in a plan view). From the perspective of the light-emitting characteristics of the light-emitting device 100, a narrower interval between the light-emitting units is preferable.

Note that, as described below, one light-emitting unit 1 may include a plurality of light-emitting surfaces 1a in a plan view. By providing a plurality of the light-emitting units 1 or a plurality of the light-emitting surfaces 1a, the amount of light of the light-emitting device 100 can be increased. Furthermore, in a case in which the light-emitting device 100 is provided with a plurality of the light-emitting units 1 or a plurality of the light-emitting surfaces 1a, the plurality of light-emitting units 1 or the plurality of light-emitting surfaces 1a (specifically, light-emitting elements 2 corresponding to the plurality of light-emitting surfaces 1a) may be independently controlled and turned on.

In the examples illustrated in FIGS. 6B and 6C, nine light-emitting units 1 are disposed vertically, laterally or in a grid-like manner. However, the arrangement and number of the light-emitting units 1 are not limited thereto and may be changed as appropriate.

The light-emitting unit mounting substrate 41 is a plate-like member with a substantially rectangular shape in a plan view and is a substrate provided with wiring on which a light-emitting element or various electrical elements can be mounted. The housing 51 is provided on the light-emitting unit mounting substrate 41, and the light-transmitting body 54 is disposed inside an opening 52 of the housing 51. The light-transmitting body 54 overlaps the light-emitting unit 1 and the light guide member 11 in a plan view.

The light-emitting unit 1 includes the light-emitting surface 1a and emits light toward the light guide member 11 provided on the +Z side of the light-emitting unit 1. The light-emitting surface 1a refers to a main light extraction surface of the light-emitting unit 1. A light-emitting diode (LED) or the like can be used for the light-emitting unit 1. The light emitted by the light-emitting unit 1 is preferably white light, but may be monochromatic light. By selecting the light-emitting unit 1 in accordance with the use of the light-emitting device 100, the light emitted by the light-emitting unit 1 can be appropriately selected.

The light guide member 11 guides and emits incident light from the light-emitting unit 1. The light guide member 11 is a member formed with a first incident portion 12, a second incident portion 13, a third incident portion 14, the total reflection portion 23, and a Fresnel lens portion 31. The light guide member 11 is light-transmissive to light emitted by the light-emitting unit 1 and includes at least one of a resin material, such as polycarbonate resin, acrylic resin, silicone resin, epoxy resin, and the like or a glass material. Note that the phrase "light-transmissive" refers to a property that allows 60% or more of the light from the light-emitting unit 1 to be transmitted.

The light guide member 11 is formed with an overall substantially circular shape in a plan view. The first incident portion 12, the second incident portion 13, the third incident portion 14, and the total reflection portion 23 are formed on the side on which the light from the light-emitting unit 1 is incident. The first incident portion 12 has a substantially rectangular shape in a plan view, and the second incident portion 13, the third incident portion 14, and the total reflection portion 23 have a substantially rectangular frame-like shape in a plan view. A substantially rectangular frame-like shape in a plan view is an example of a frame-like shape in a plan view. Herein, the term "frame-like" refers to a state surrounding the periphery. Alternatively, the shape of the first incident portion 12 in a plan view may be substantially circular, and the shape of the second incident portion 13, the third incident portion 14, and the total reflection portion 23 in a plan view may be annular. Note that "annular" refers to a state like a ring.

The Fresnel lens portion 31 is formed on the emission side of the light guided by the light guide member 11, i.e., the opposite side to where the light from the light-emitting unit 1 is incident, and has a substantially circular shape in a plan view.

However, the overall shape of the light guide member 11 in a plan view is not limited to a substantially circular shape and may be a substantially rectangular shape, a substantially triangular shape, a substantially elliptical shape, or a substantially polygonal shape. In a case in which the light-emitting device 100 is used as a flash light source for a camera, taking into account that the image capture area of a typical camera is substantially rectangular, the shape of the light guide member 11 in a plan view is preferably a four-rotation symmetric shape or a two-rotation symmetrical shape.

Light that enters the inside of the light guide member 11 through the first incident portion 12 or the second incident portion 13 is focused inside the light guide member 11 by guiding the light toward the Fresnel lens portion 31. The light that enters inside the light guide member 11 through the third incident portion 14 is guided inside the light guide member 11 and reaches the total reflection portion 23 where it is reflected. The light reflected at the total reflection portion 23 is focused inside the light guide member 11 by being guided toward the Fresnel lens portion 31. The first incident portion 12, the second incident portion 13, the third incident portion 14, and the total reflection portion 23 function as, for example, total internal reflection (TIR) lenses that focus light emitted by the light-emitting unit 1. A TIR lens is an example of the light guide member 11 that includes the total reflection portion 23 that totally reflects light. Note that the light guide member 11 may not include the second incident portion 13, but the light from the light-emitting unit 1 can be extracted more efficiently in a case in which the second incident portion 13 is provided.

The first incident portion 12 is formed into a protrusion that protrudes to the light-emitting unit 1 side, and a protrusion corner portion 15 disposed in a substantially rectangular frame-like manner is preferably formed around the first incident portion 12.

The corner portion 15 is preferably disposed continuously or intermittently in a substantially rectangular frame-like shape around the first incident portion 12. In the present embodiment, the corner portion 15 is formed into a substantially rectangular frame-like shape of one revolution, but may be formed having a plurality of revolutions. By providing the corner portion 15, the radius of the first incident portion 12 can be reduced, thereby allowing more incident light from the light-emitting unit 1 to be extracted and the light focusing properties to be improved. In this example of the present embodiment, the third incident portion 14 has a curvature in the radial direction.

The first incident portion 12, the second incident portion 13, and the third incident portion 14 are formed inward of the total reflection portion 23 provided in a substantially rectangular frame-like shape, and have a curved surface that focuses incident light from the light-emitting unit 1. The curvature radii of the curved surfaces of the first incident portion 12, the second incident portion 13, and the third incident portion 14 are preferably different from each other. That is, the light guide member 11 preferably includes a plurality of curved surfaces having different radii of curvature.

In this example of the present embodiment, the total reflection portion 23 has a curvature in the radial direction. Note that the total reflection portion 23 and the third incident portion 14 may form, for example, a tapered shape, regardless of whether they have curvature in the radial direction.

With this shape, the total reflection portion 23 and the third incident portion 14 have a smaller cross-sectional area orthogonal to a center axis 11c of the light guide member 11 on the light-emitting unit 1 side than the Fresnel lens portion 31 side. The curvature radius of the total reflection portion 23 in the radial direction or the inclination angle of the inclined surface of the total reflection portion 23 with respect to the center axis 11c of the light guide member 11 can be set as appropriate within a range that allows the incident light from the light-emitting unit 1 to be reflected. By determining the shape of the first incident portion 12, the second incident portion 13, the third incident portion 14, and the total reflection portion 23 in order to satisfy the condition of totally reflecting the largest amount of the light incident on the total reflection portion 23, the efficiency of the extraction of the light emitted by the light-emitting unit 1 is further improved.

By providing the total reflection portion 23 outward from the third incident portion 14, the light, of the light emitted from the light-emitting unit 1, that is emitted in a wide angle with reference to a center axis 1c of the light-emitting surface 1a (hereinafter, simply referred to as wide angle) can be focused by the light guide member 11, allowing the efficiency of the extraction of light emitted from the light-emitting unit 1 to be improved.

In the present embodiment, an area of the region inward of an outer edge 231 of the total reflection portion 23 is greater than an area of the light-emitting surface 1a of the light-emitting unit 1. According to this configuration, when the light-emitting unit 1 faces the first incident portion 12 provided in the center of the light guide member 11, light incident on the light guide member 11 is inhibited from reaching the total reflection portion 23, so the spread of light is suppressed.

The Fresnel lens portion 31 transmits the light emitted from the light guide member 11 of the light guided inside the light guide member 11. The Fresnel lens portion 31 is divided into regions in which the curved surface of the lens is substantially concentrically shaped and is formed so as to be folded into a desired thickness. The Fresnel lens portion 31 has a sawtooth cross-sectional shape and has a generally concentric shape in a plan view that is symmetrical about a center axis of the Fresnel lens portion 31. In the present embodiment, the Fresnel lens portion 31 is formed on the bottom surface of a recess portion 32 formed on the +Z side surface of the light guide member 11.

The Fresnel lens portion 31 refracts or diffracts light passing through the Fresnel lens portion 31 according to its shape to produce desired optical characteristics, such as light distribution characteristics. The optical characteristics of the Fresnel lens portion 31 can be set as appropriate by determining the width or height of the circle of the substantially concentric circle shape.

The movement mechanism 70 is installed on the +Z side surface of the light-emitting unit mounting substrate 41 and is an electromagnetic actuator that movably supports the light guide member 11 in an XY plane. The XY plane is a plane that is substantially parallel to the +Z side surface of the light-emitting unit mounting substrate 41. The movement mechanism 70 includes a frame portion 71, an N pole magnet 72, an S pole magnet 73, a platform portion 74, a spring 75, and a coil 76.

The frame portion 71 is a member having a substantially rectangular frame-like shape in a plan view. The light guide member 11 is disposed inside the frame portion 71, and the frame portion 71 supports the light guide member 11 with an outer edge portion 25 of the light guide member 11 and the inner surface of the frame portion 71 being adhered together via an adhesive member 61.

The frame portion 71 is configured to include a resin material or a metal material. The frame portion 71 preferably includes, inside or on the surface thereof, a color material such as a black material capable of absorbing light emitted by the light-emitting unit 1. With this configuration, light that leaks to the frame portion 71 side through the outer edge portion 25 of the light guide member 11 or the total reflection portion 23 can be absorbed by the frame portion 71, and the frame portion 71 can suppress the return of the reflected light toward the light guide member 11. As a result, ghost light or flared light associated with the return light can be reduced, and the contrast of the light emitted by the light-emitting device 100 can be increased.

The contrast of the emitted light refers to the contrast between the partial irradiation region and the regions other than the partial irradiation region, from among the irradiatable regions of the light-emitting device 100. When the contrast is high, the contrast between the partial irradiation region and the regions other than the partial irradiation region becomes larger.

The N pole magnet 72 and the S pole magnet 73 are quadrangular columnar members that include a metal material or the like. The N pole magnet 72 is magnetized to be an N pole magnet, and the S pole magnet 73 is magnetized to be a S pole magnet. The N pole magnet 72 and the S pole magnet 73 are a pair, and four pairs of the N pole magnet 72 and the S pole magnet 73 are respectively fixed inside sides of the frame portion 71 with an adhesive member or the like. The N pole magnet 72 is a generic name for four N pole magnets, and the S pole magnet 73 is a generic name of four S pole magnets.

The platform portion 74 is a member having a substantially rectangular frame-like shape in a plan view. The platform portion 74 is fixed on the +Z side surface of the light-emitting unit mounting substrate 41 such that the light guide member 11 is disposed inside. The frame portion 71 is movably mounted on the +Z side surface of the platform portion 74. A wall portion 74a is provided on the outer portion of the platform portion 74, that is, on the side opposite to the side facing the light guide member 11 (hereinafter, simply referred to as outward).

The spring 75 is an elastic member that can expand and contract along the center direction of the light guide member 11. The material of the spring 75 is not particularly limited, and a metal material, resin material, or the like can be used. The spring 75 includes four springs, and each spring is provided surrounding the light guide member 11 at a position that is axisymmetric with respect to the center axis 11c of the light guide member 11 when the center axis 11c of the light guide member 11 and the center axis of the light-emitting surface 1a of the light-emitting unit 1 are substantially aligned. In other words, each spring is provided so as to surround the light guide member 11 at a position that is point symmetrical with respect to the center of the light-transmitting body 54 in a plan view. The spring 75 is a generic name for four springs.

One end of the spring 75 is connected to the outer surface of the frame portion 71, and the other end is connected to the wall portion 74a of the platform portion 74. The frame portion 71 is configured to be movable on the placement surface of the platform portion 74 together with the light guide member 11. The spring 75 limits movement so that the frame portion 71 does not move too far, and imparts a restoring force to the frame portion 71 that returns the frame portion 71 to its initial position.

The coil 76 is a member capable of conducting a current and is configured by winding wire or the like in a spiral or coil shape. The coil 76 includes four coils, and the coil 76 is a generic name for four coils. The four coils are paired with the four sets of the N pole magnet 72 and the S pole magnet 73. The four coils are respectively disposed on the opposite side of the four sets of the N pole magnet 72 and the S pole magnet 73 across the wall portion 74a and the spring 75, and are fixed on the +Z side surface of the light-emitting unit mounting substrate 41.

For example, when a current i flows from an external drive circuit into the coil 76 as illustrated in FIG. 6A, the action of the N pole magnet 72, the S pole magnet 73, and the coil 76 generates an electromagnetic force 76a in the direction toward the light guide member 11 according to Fleming's left hand rule. The white arrow representing the electromagnetic force 76a indicates the direction in which the electromagnetic force 76a acts. When the frame portion 71 is pushed by the electromagnetic force 76a, the frame portion 71 moves in the pushed direction.

The magnitude of the electromagnetic force 76a changes in accordance with the amount of current flowing through the coil 76, and this likewise changes the amount of movement of the frame portion 71. Furthermore, the direction of the electromagnetic force 76a changes in accordance with the direction of the current flowing in the coil 76, and this likewise changes the direction of movement of the frame portion 71. For example, when a current flows in a direction opposite to the direction in which the current i illustrated in FIG. 6A flows, an electromagnetic force is generated in a direction opposite to the direction indicated by the white arrow of the electromagnetic force 76a. At this time, the frame portion 71 moves in a direction to which the frame portion 71 is drawn by the generated electromagnetic force 76a.

The movement mechanism 70 generates an electromagnetic force for each pair of the coil 76, the N pole magnet 72, and the S pole magnet 73 depending on the amount and orientation of current flowing in each of the four coils 76. By the generated electromagnetic force, the movement mechanism 70 causes the light guide member 11 to move relative to the light-emitting unit 1 along a direction that intersects with the center axis 1c of the light-emitting surface 1a. In other words, the movement mechanism 70 can move the light guide member 11 relative to the light-emitting unit 1 in the XY plane intersecting with the +Z direction. The direction intersecting with the center axis 1c of the light-emitting surface 1a is, for example, a direction orthogonal to or substantially orthogonal to the center axis 1c of the light-emitting surface 1a. The term "substantially orthogonal" means that, regarding relative movement, deviation from the orthogonal to a degree generally recognized as error is acceptable. Similarly, the XY plane intersecting with the +Z direction is an XY plane that is orthogonal to or substantially orthogonal to the +Z direction.

The movement mechanism 70 can move the light guide member 11 relative to the light-emitting unit 1 such that the light-emitting surface 1a of the light-emitting unit 1 is located inward of the total reflection portion 23 formed in a substantially rectangular frame-like shape in a plan view.

By relatively moving the light guide member 11 while the light-emitting unit 1 is emitting light, the light-emitting device 100 can continuously change the direction of the partial irradiation light.

Note that in the present embodiment described above, the movement mechanism 70 is an electromagnetic actuator. However, the driving method of the movement mechanism 70 is not limited thereto, and other driving methods such as using a piezoelectric actuator or ultrasonic actuator can be used.

The housing 51 is a member with a substantially rectangular box-shape in a plan view that is capable of housing the light-emitting unit 1, the light guide member 11, the movement mechanism 70, and other components within. A portion of a housing such as the housing of a smart phone installed with the light-emitting device 100 may be served as the housing 51. The housing 51 includes the opening 52 and a holding portion 53.

The opening 52 is formed into a substantially circular shape in a plan view. The opening 52 is preferably formed larger than the Fresnel lens portion 31 of the light guide member 11 such that the Fresnel lens portion 31 is exposed. The −Z side surface of the holding portion 53 is fixed to the +Z side surface of the light-emitting unit mounting substrate 41 by an adhesive member or the like.

The housing 51 is preferably formed of a member having light-shielding properties and is preferably formed of a resin material or the like containing a filler, such as a light reflecting member, or a light absorbing member so that the distribution direction of the light emitted from the light-emitting device 100 can be restricted.

The light-transmitting body 54 is a substantially circular plate-like member in a plan view and includes a resin material or a glass material that is light-transmissive to at least the light emitted by the light-emitting unit 1. The light-transmitting body 54 is disposed on the +Z side of the light guide member 11 and is supported in a state of being inserted into the opening 52 of the housing 51. Note that the light-transmitting body 54 may be adhered to the housing 51 by an adhesive member or the like.

The light-transmitting body 54 transmits light that has been emitted from the light guide member 11 through the Fresnel lens portion 31. After being emitted from the light guide member 11, the light transmitted through the light-transmitting body 54 corresponds to light emitted by the light-emitting device 100.

By housing the light-emitting unit 1, the light guide member 11, the movement mechanism 70, and the like inside the space enclosed by the light-emitting unit mounting substrate 41, the housing 51, and the light-transmitting body 54, foreign matter such as debris and dirt can be prevented from adhering to or coming into contact with the light-emitting unit 1, the light guide member 11, the movement mechanism 70, and the like.

Note that the shape of the housing 51 and the light-transmitting body 54 is not limited to that described above, and a housing with a substantially circular shape, a substantially elliptical shape, or a substantially polygonal shape in a plan view may be used, and a light-transmitting body with a substantially rectangular shape, a substantially elliptical shape, or a substantially polygonal shape in a plan view may be used.

Configuration Example of Light-Emitting Unit 1

Figure 8:
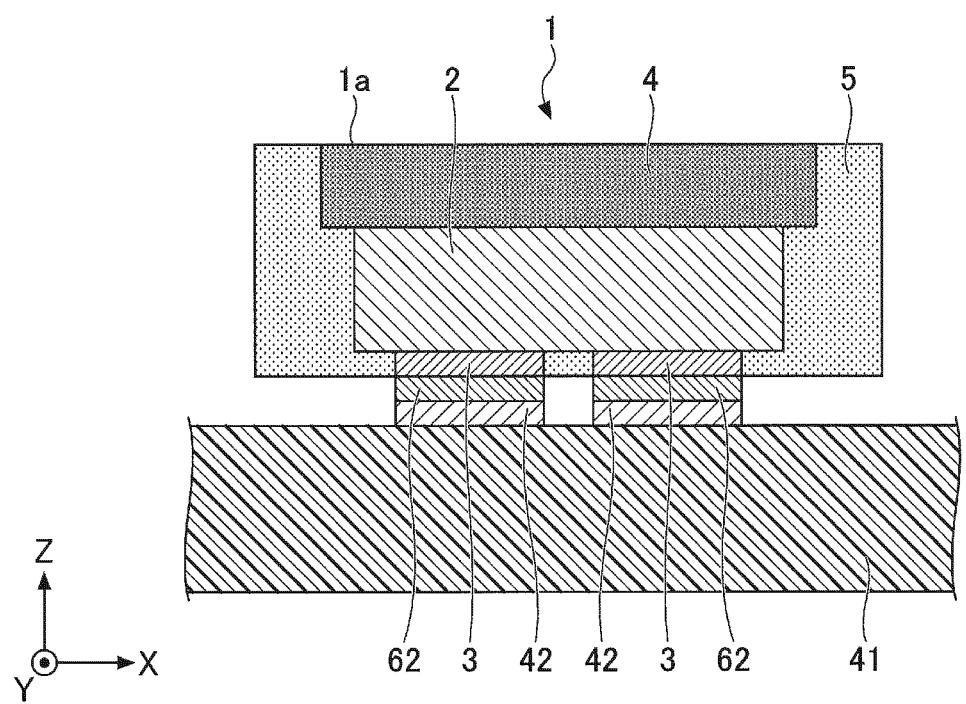
FIG. 8 is a cross-sectional view illustrating an example of the configuration of a light-emitting unit of a light-emitting device according to an embodiment.
Figure 9A:
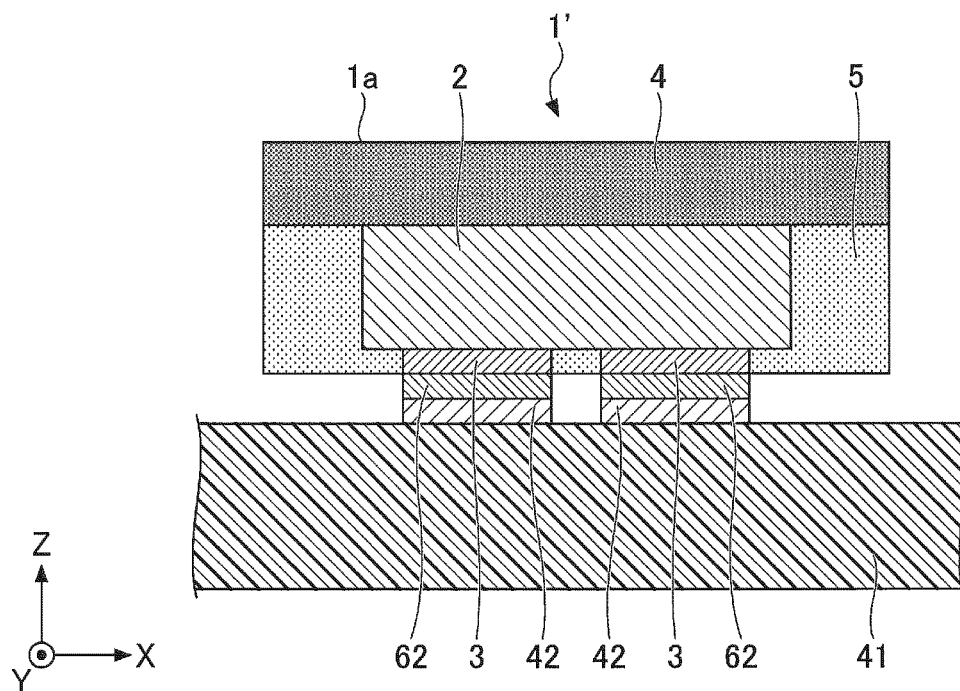
FIG. 9A is a cross-sectional view illustrating another example of the configuration of a light-emitting unit of a light-emitting device according to an embodiment.

FIG. 8 is a cross-sectional view illustrating an example of the configuration of the light-emitting unit 1. FIG. 9A is a cross-sectional view illustrating a light-emitting unit 1' as another example of the configuration of the light-emitting unit 1. As illustrated in FIGS. 8 and 9A, the light-emitting unit 1 and the light-emitting unit 1' are mounted on the +Z side surface of the light-emitting unit mounting substrate 41 with the +Z side surface serving as the light-emitting surface 1a and the surface opposite to the light-emitting surface 1a serving as the mounting surface.

The light-emitting unit 1 includes the light-emitting element 2, a light-transmitting member 4 provided on the +Z side of the light-emitting element 2, and a covering member 5 that covers a lateral surface of the light-emitting element 2 and a lateral surface of the light-transmitting member 4 without covering the +Z side surface of the light-transmitting member 4. Note that, as in the light-emitting unit 1' illustrated in FIG. 9A, the lateral surface of the light-transmitting member 4 may be exposed from the covering member 5.

At least a pair of positive and negative electrodes 3 are preferably provided on a surface of the light-emitting element 2 opposite the light-emitting surface 1a. In the present embodiment, the shape of the light-emitting unit 1 in a plan view is substantially rectangular, but may be substantially circular, substantially elliptical, substantially triangular, substantially hexagonal or another polygonal shape.

The light-emitting element 2 is preferably formed from various semiconductors such as a III-V compound semiconductor or a II-VI compound semiconductor. As the semiconductor, preferably, a nitride-based semiconductor such as $In_XAl_YGa_{1-X-Y}N$ ($0 \leq X$, $0 \leq Y$, $X+Y \leq 1$) or the like is used, and InN, AlN, GaN, InGaN, AlGaN, InGaAlN, and the like can also be used.

The light-transmitting member 4 is a plate-like member having a substantially rectangular shape in a plan view and is provided covering the upper surface of the light-emitting element 2. The light-transmitting member 4 can be formed using a light-transmissive resin material or an inorganic material such as ceramic or glass. A thermosetting resin, such as a silicone resin, a silicone modified resin, an epoxy resin, or a phenol resin, can be used as the resin material. Particularly, a silicone resin or a modified resin thereof with good light resistance and heat resistance is used. Note that herein, light transmissivity corresponds to preferably transmit 60% or more of the light from the light-emitting element 2.

Furthermore, a thermoplastic resin such as a polycarbonate resin, an acrylic resin, a methyl pentene resin, or a polynorbornene resin can be used for the light-transmitting member 4.

Furthermore, the light-transmitting member 4 may be formed of the resin described above and a wavelength conversion member that converts the wavelength of at least a portion of light from a light diffusion member or the light-emitting element 2. Examples of the light-transmitting member 4 formed of a resin and a wavelength conversion member include a member containing a wavelength conversion member in a resin material, ceramic, glass, or the like, a sintered body for a wavelength conversion member, and the like. The light-transmitting member 4 may include a resin layer containing a wavelength conversion member or a light diffusion member on a −Z side surface of a sintered body such as a resin, ceramic, glass, or the like.

In the light-emitting device according to the embodiment, a blue light-emitting element is used as the light-emitting element 2, and a white light is emitted by the light-transmitting member 4 being provided with a wavelength conversion member for converting the light emitted from the light-emitting element 2 to yellow.

Examples of the wavelength conversion member included in the light-transmitting member 4 include a yttrium aluminum garnet phosphor (for example, $Y_3(Al, Ga)_5O_{12}:Ce$), a lutetium aluminum garnet phosphor (for example, $Lu_3(Al, Ga)_5O_{12}:Ce$), a terbium aluminum garnet phosphor (for example, $Tb_3(Al, Ga)_5O_{12}:Ce$), a CCA phosphor (for example, $Ca_{10}(PO_4)_6Cl_2:Eu$), an SAE phosphor (for example, $Sr_4Al_{14}O_{25}:Eu$), a chlorosilicate phosphor (for example, $Ca_8MgSi_4O_{16}Cl_2:Eu$), a nitride phosphor, a fluoride phosphor, a phosphor having a perovskite structure (for example, $CsPb(F, Cl, Br, I)_3$), a quantum dot phosphor (for example, CdSe, InP, $AgInS_2$, $AgInSe_2$), and the like. Examples of a nitride phosphor include a β-sialon phosphor (for example, $(Si, Al)_3(O, N)_4:Eu$), an α-sialon phosphor (for example, $Ca(Si, Al)_{12}(O, N)_{16}:Eu$), an SLA phosphor (for example, $SrLiAl_3N_4:Eu$), a CASN phosphor (for example, $CaAlSiN_3:Eu$), a SCASN phosphor (for example, $(Sr, Ca)AlSiN_3:Eu$), and the like; and examples of a fluoride phosphor include a KSF phosphor (for example, $K_2SiF_6:Mn$), a KSAF phosphor (for example, $K_2(Si, Al)F_6:Mn$), an MGF phosphor (for example, $3.5\ MgO_{0.5}MgF_2GeO_2:Mn$), and the like. The phosphors described above are particles. Furthermore, one type of these wavelength conversion members may be used alone, or two or more types of these wavelength conversion members may be used in combination.

The KSAF phosphor may have a composition represented by Formula (I) below.

$$M_2[Si_pAl_qMn_rF_s] \quad (I)$$

In Formula (I), M represents an alkali metal and may include at least K. Mn may be a tetravalent Mn ion. p, q, r, and s may satisfy $0.9 \leq p+q+r \leq 1.1$, $0 < q \leq 0.1$, $0 < r \leq 5.9 \leq s \leq 6.1$. Preferably $0.95 \leq p+q+r \leq 1.05$ or $0.97 \leq p+q+r \leq 1.03$, $0 < q \leq 0.002 \leq q \leq 0.02$ or $0.003 \leq q \leq 0.015$, $0.005 \leq r \leq 0.15$, $0.01 \leq r \leq 0.12$ or $0.015 \leq r \leq 0.1$, $5.92 \leq s \leq 6.05$ or $5.95 \leq s \leq 6.025$. Examples thereof include compositions represented by $K_2[Si_{0.946}Al_{0.005}Mn_{0.049}F_{5.995}]$, $K_2[Si_{0.942}Al_{0.008}Mn_{0.050}F_{5.992}]$, $K_2[Si_{0.939}Al_{0.014}Mn_{0.047}F_{5.986}]$. According to such a KSAF phosphor, it is possible to obtain red light emission having a high luminance and a narrow half band width of the light emission peak wavelength.

Examples of the light diffusion member included in the light-transmitting member 4 include titanium oxide, barium titanate, aluminum oxide, and silicon oxide.

The covering member 5 is a member that covers the lateral surfaces of the light-emitting element 2 and the light-transmitting member 4 and covers the lateral surfaces of the light-emitting element 2 and the light-transmitting member 4 directly or indirectly. The upper surface of the light-transmitting member 4 is exposed from the covering member 5 and constitutes the light-emitting surface 1a of the light-emitting unit 1.

The covering member 5 is preferably constituted by a member having a high light reflectivity in order to improve light extraction efficiency. A resin material containing a light-reflective material such as white pigment, for example, can be used as the covering member 5.

Light-reflective materials include titanium oxide, zinc oxide, magnesium oxide, magnesium carbonate, magnesium hydroxide, calcium carbonate, calcium hydroxide, calcium silicate, magnesium silicate, barium titanate, barium sulfate, aluminum hydroxide, aluminum oxide, zirconium oxide, and silicon oxide. One of these is preferably used alone, or a combination of two or more types thereof are preferably used.

Furthermore, the resin material is preferably a material in which a resin material including a thermosetting resin, such as an epoxy resin, a silicone resin, a silicone modified resin, a phenol resin, or the like as a main component is used as a base material. Note that the covering member 5 may be constituted by a member having light transmissivity with respect to visible light as necessary.

The light-emitting unit mounting substrate 41 is preferably provided with a wiring 42 disposed on at least one of the surface or the interior. In the light-emitting unit mounting substrate 41, the light-emitting unit mounting substrate 41 and the light-emitting unit 1 are electrically connected by connecting the wiring 42 and at least the positive and negative pair of electrodes 3 of the light-emitting unit 1 via an electrical conductive adhesive member 62. Note that the configuration, size, and the like of the wiring 42 of the light-emitting unit mounting substrate 41 is set according to the configuration, size, and the like of the electrodes 3 of the light-emitting unit 1.

For the light-emitting unit mounting substrate 41, an insulating material is preferably used, a material that does not easily transmit the light emitted from the light-emitting unit 1 or outside light is preferably used, or a material with a certain amount of strength is preferably used. Specifically, the light-emitting unit mounting substrate 41 can be formed of a ceramic such as alumina, aluminum nitride or mullite, or a resin such as phenol resin, epoxy resin, polyimide resin, BT resin (bismaleimide triazine resin), polyphthalamide, or the like.

The wiring 42 can be constituted by copper, iron, nickel, tungsten, chromium, aluminum, silver, gold, titanium, palladium, rhodium, alloys thereof, and the like. Furthermore, a layer of silver, platinum, aluminum, rhodium, gold, alloys thereof, or the like may be provided on the surface layer of the wiring 42 to increase the wettability and/or light reflectivity of the electrical conductive adhesive member 62.

Figure 9B:
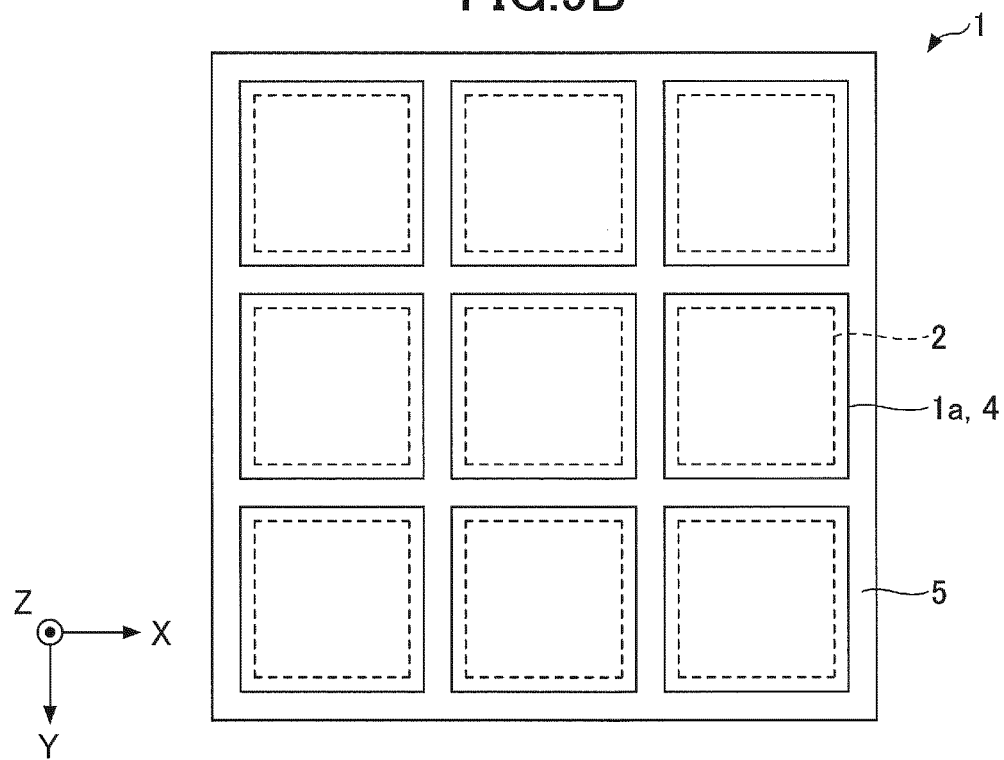
FIG. 9B is a plan view illustrating an example of a light-emitting unit including a plurality of light-emitting surfaces as seen from a light guide member side.

Note that, as described above, one light-emitting unit 1 may include a plurality of light-emitting surfaces 1a in a plan view. FIG. 9B is a plan view illustrating an example of the configuration of the light-emitting unit 1 including a plurality of the light-emitting surfaces 1a as seen from the light guide member 11 side. As illustrated in FIG. 9B, the light-emitting unit 1 includes nine light-emitting surfaces 1a arranged vertically, laterally, or in a grid-like manner in a plan view. Each one of the nine light-emitting surfaces 1a includes the light-emitting element 2, the light-transmitting member 4 provided on the +Z side of the light-emitting element 2, and the covering member 5 that covers the lateral surface of the light-emitting element 2 and the lateral surface of the light-transmitting member 4 without covering the +Z side surface of the light-transmitting member 4. Note that, similar to the light-emitting unit 1' illustrated in FIG. 9A, the lateral surface of the light-transmitting member 4 in the light-emitting surface 1a may include a portion that is not covered by the covering member 5. In other words, adjacent light-emitting elements 2 in this configuration are provided with a common light-transmitting member 4. The plurality of light-emitting surfaces 1a, specifically the light-emitting elements 2 corresponding to the plurality of light-emitting surfaces 1a, may be independently controlled and turned on. Further, in the above-described example illustrated in FIG. 9B, nine light-emitting surfaces 1a are disposed vertically, laterally or in a grid-like manner. However, the arrangement and number of the light-emitting surfaces 1a are not limited thereto and may be changed as appropriate.

Example of Change in Optical Path and Illuminance Distribution of Irradiation Light Accompanying Relative Movement With reference to FIGS. 10 to 17, changes in the optical path and the illuminance distribution of the irradiation light accompanying the movement of the light guide member 11 by the movement mechanism 70 will be described.

Figure 10:
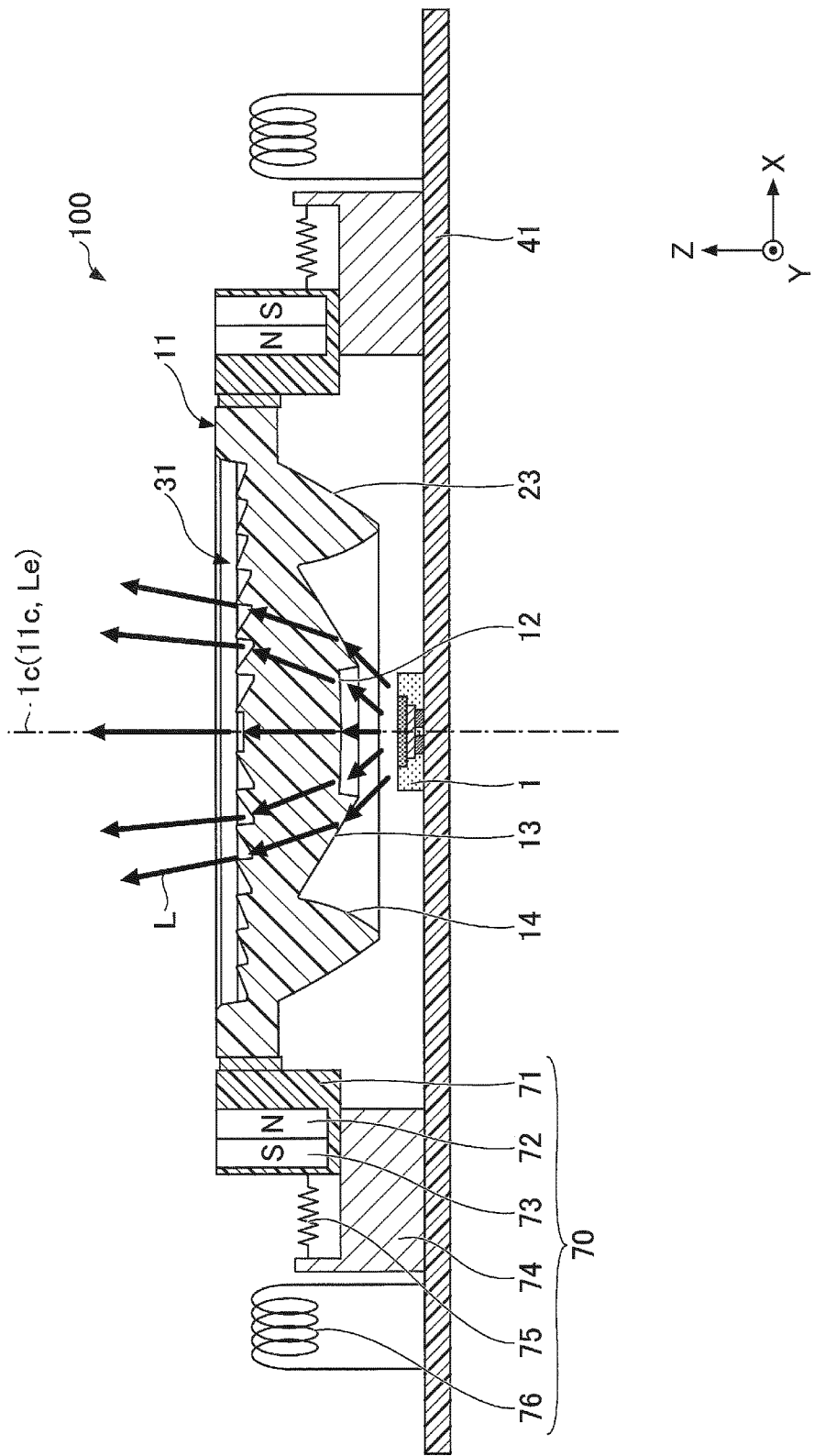
FIG. 10 is a cross-sectional view illustrating the optical path of a light-emitting device in a state in which the light guide member is not moving.

FIG. 10 is a cross-sectional view illustrating an example of the optical path of the light-emitting device 100 in a state in which the light guide member 11 is not moving and illustrates a state in which the housing 51 and the light-transmitting body 54 are omitted. The plan view of the light-emitting device 100 in this state is similar to that of FIG. 6A.

In the state of the light-emitting device 100 illustrated in FIG. 10, no current flows through the coil 76, the frame portion 71 is stationary at the initial position together with the light guide member 11, and the center axis 1c of the light-emitting surface 1a and the center axis 11c of the light guide member 11 are substantially aligned.

A light L emitted from the light-emitting unit 1 is focused by being guided through the interior of the light guide member 11 through each of the first incident portion 12 and the second incident portion 13, and exits from the interior of the light guide member 11 through the Fresnel lens portion 31. At this time, most of the light L does not pass through the third incident portion 14 and does not reach the total reflection portion 23. A center axis Le of light emitted from the Fresnel lens portion 31 substantially matches the center axis 1c of the light-emitting surface 1a and the center axis 11c of the light guide member 11.

Figure 11:
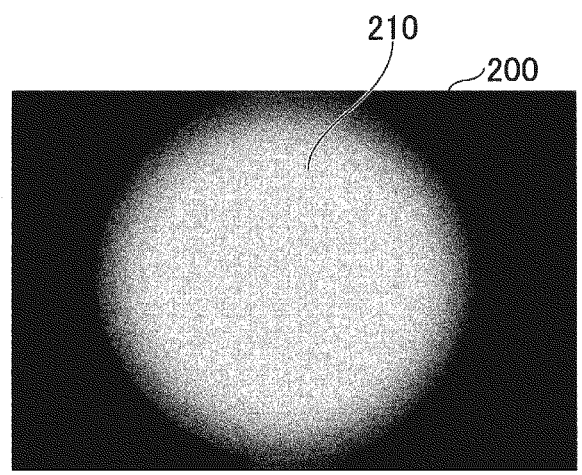
FIG. 11 is a schematic diagram illustrating the illuminance distribution of the light-emitting device in FIG. 10.

FIG. 11 is a schematic diagram illustrating an example of the illuminance distribution of the irradiation light in the light-emitting device 100 of FIG. 10. As illustrated in FIG. 11, the partial irradiation region 210 caused by the irradiation light is located in a central region of the irradiatable region 200. The size of the irradiatable region 200, the ratio between the size of the irradiatable region 200 and the partial irradiation region 210, and the like can be set as appropriate by determining the shape of the first incident portion 12, the second incident portion 13, and the Fresnel lens portion 31 in the light guide member 11, the spacing between the light guide member 11 and the light-emitting unit 1, and the like.

Figure 12:
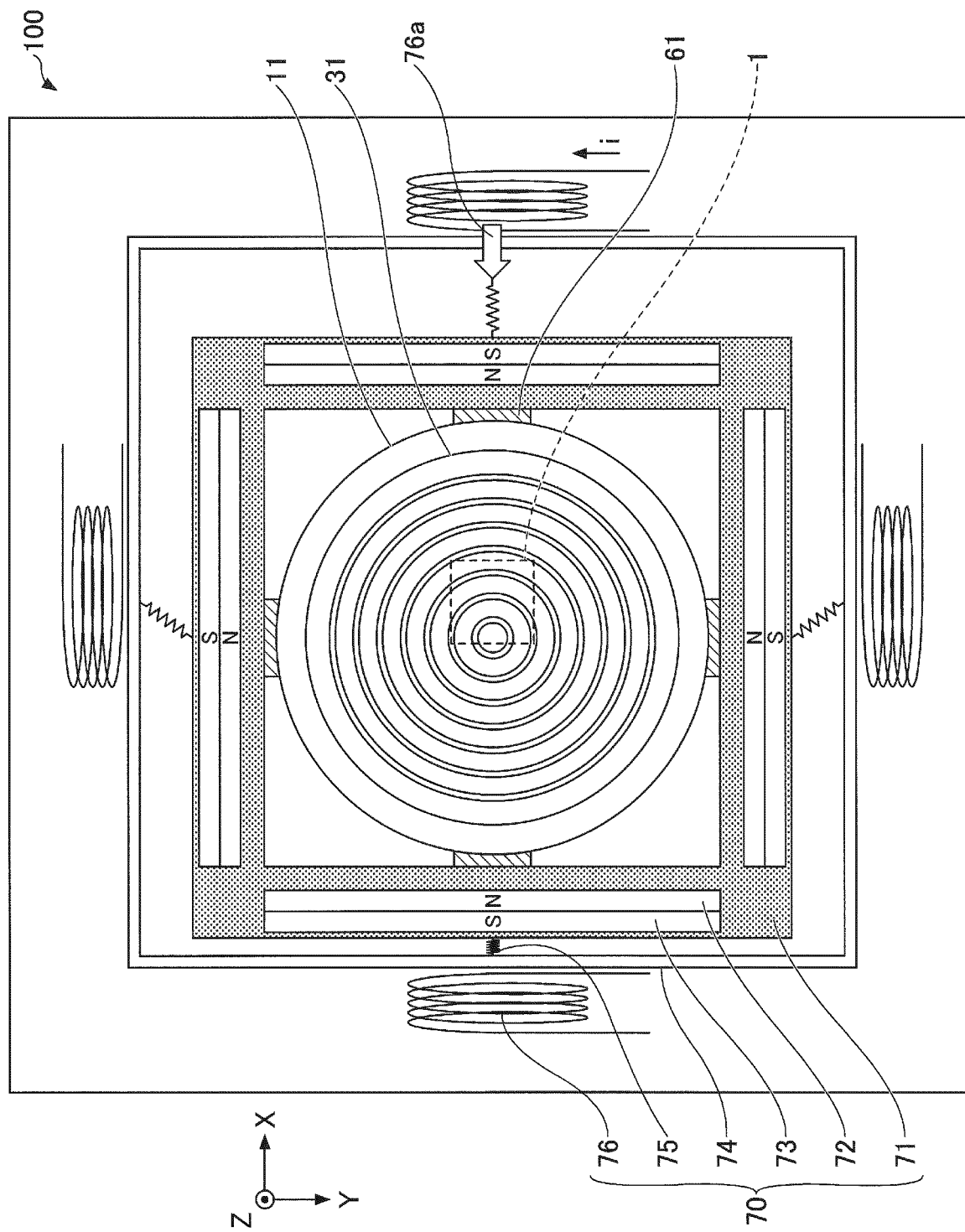
FIG. 12 is a plan view illustrating the positional relationship, in a light-emitting device according to an embodiment, between a light guide member moved to one side and a light-emitting unit in a state with a housing and a light-transmitting body omitted, as seen from the light guide member side.
Figure 13:
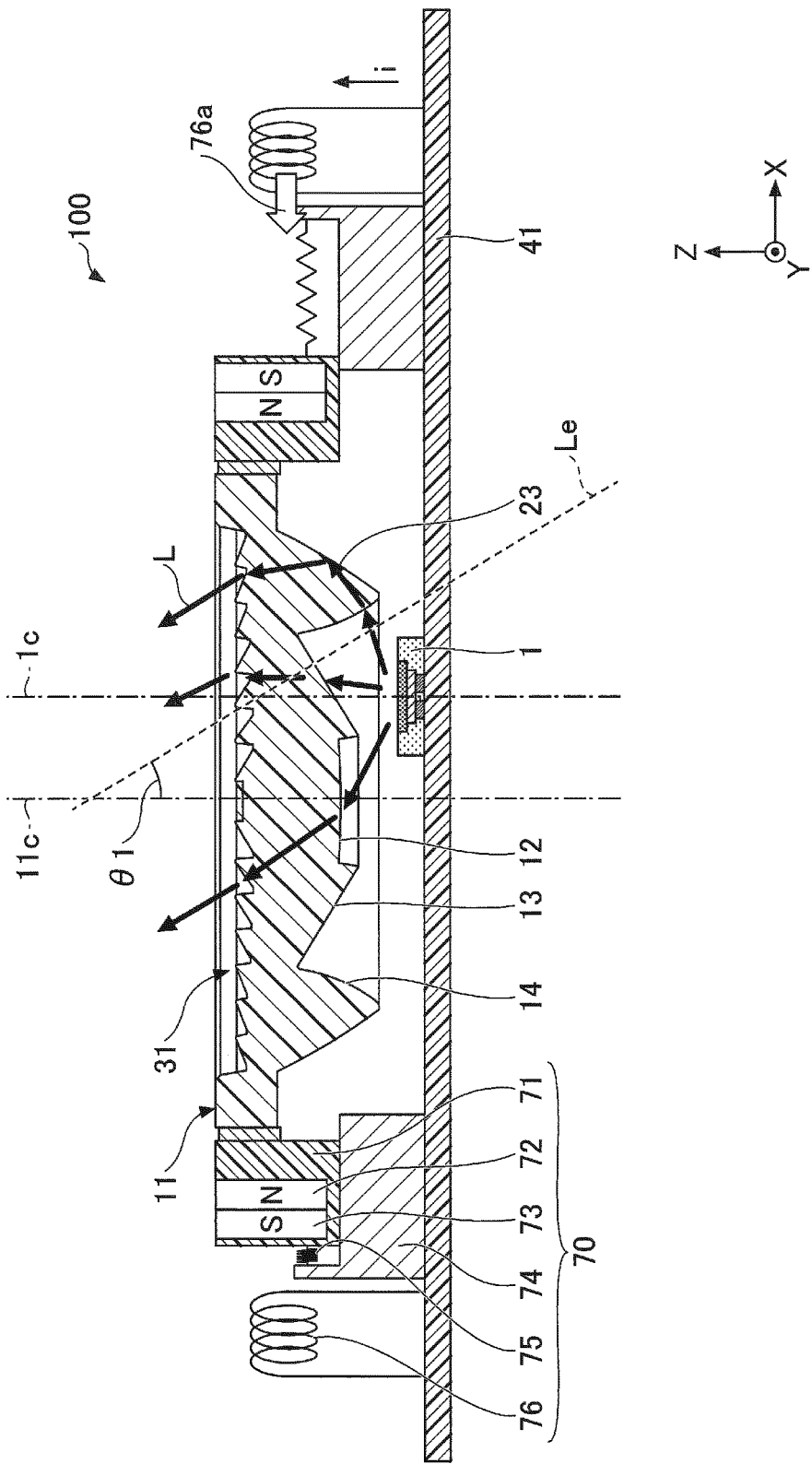
FIG. 13 is a cross-sectional view illustrating the optical path of the light-emitting device in FIG. 12.

FIG. 12 is a diagram illustrating an example of a positional relationship between the light guide member 11 and the light-emitting unit 1 in a state in which, in the light-emitting device 100, the light guide member 11 is moved to one side, that is, to the −X side, and is a plan view as seen from the light guide member 11 side of a state in which the housing 51 and the light-transmitting body 54 are omitted. FIG. 13 is a cross-sectional view illustrating an example of the optical path of the light-emitting device 100 of FIG. 12.

In the state of the light-emitting device 100 illustrated in FIGS. 12 and 13, of the four coils 76, the current i flows from the outside to the inside (hereinafter, referred to as the forward direction) in the coil disposed on the +X side, and the electromagnetic force 76a is generated toward the −X side. The frame portion 71 is pressed and moved toward the −X side together with the light guide member 11 by the electromagnetic force 76a, and the center axis 11c of the light guide member 11 is shifted toward the −X side with respect to the center axis 1c of the light-emitting surface 1a.

Note that, in a state in which the light guide member 11 is moving to the −X side, of the four coils 76, no current flows through the coils 76 disposed on the +Y side, the −Y side, and the −X side. However, a current may flow from the inside to the outside (hereinafter referred to as the reverse direction) in the coil that is disposed on the −X side. This can further increase the electromagnetic force 76a compared to a case in which current flows through only the coil 76 that is positioned on the +X side.

The light L emitted from the light-emitting unit 1 is focused by being guided through the interior of the light guide member 11 through each of the first incident portion 12, the second incident portion 13, and the third incident portion 14. The light L having passed through the first incident portion 12 and the second incident portion 13 exits from the interior of the light guide member 11 through the Fresnel lens portion 31. On the other hand, after the light L that has passed through the third incident portion 14 is reflected at the total reflection portion 23, the light L exits from the interior of the light guide member 11 through the Fresnel lens portion 31. The center axis Le of the emitted light is inclined at an angle θ1 with respect to the center axis 11c of the light guide member 11 in accordance with the shift between the center axis 11c of the light guide member 11 and the center axis 1c of the light-emitting surface 1a. Note that in the present embodiment, even when the light guide member 11 is moved relative to the light-emitting unit 1, the center axis 11c of the light guide member 11 remains substantially parallel with the center axis 1c of the light-emitting surface 1a.

The relationship between the current amount of the current i and the travel amount of the light guide member 11 can be set as appropriate by determining the number of winds of the coil 76, the magnetic forces of the N pole magnet 72 and the S pole magnet 73, and the like. The angle θ1 of the center axis Le of the light emitted from the light guide member 11 in accordance with the travel amount of the light guide member 11 can be set as appropriate by determining the shape of the first incident portion 12, the second incident portion 13, and the Fresnel lens portion 31 in the light guide member 11, the spacing between the light guide member 11 and the light-emitting unit 1, and the like.

Figure 14:
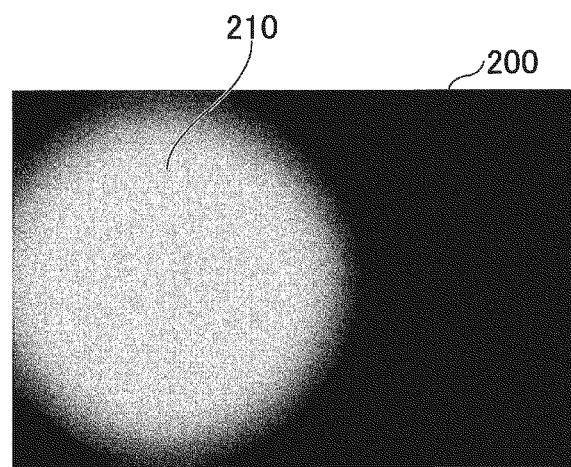
FIG. 14 is a schematic diagram illustrating the illuminance distribution of the light-emitting device in FIG. 13.

FIG. 14 is a schematic diagram illustrating an example of the illuminance distribution of the irradiation light in the light-emitting device 100 of FIG. 12. As illustrated in FIG. 14, the partial irradiation region 210 generated by the irradiation light is located at a position offset from the center of the irradiatable region 200 by the angle θ1.

Figure 15:
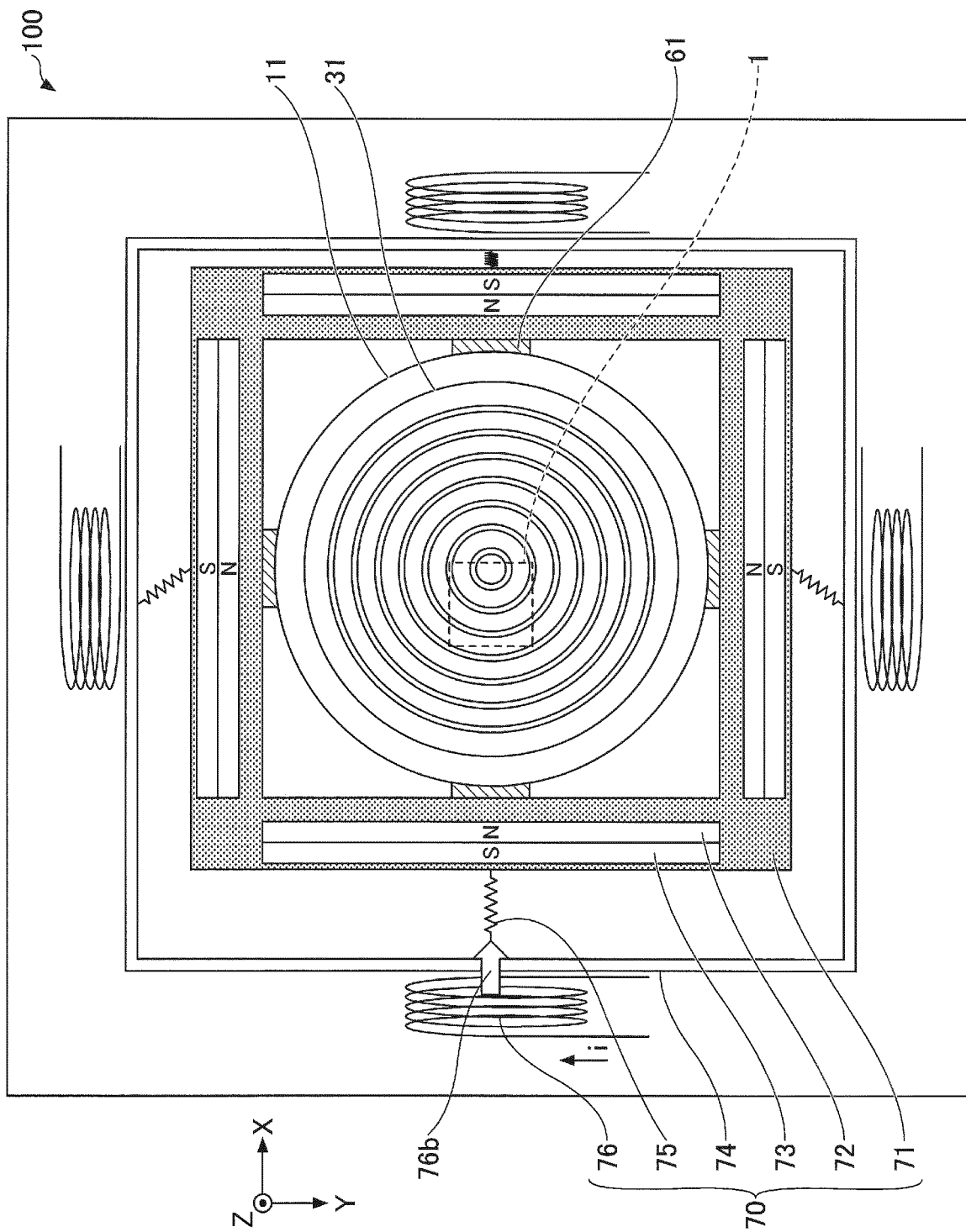
FIG. 15 is a plan view illustrating the positional relationship, in a light-emitting device according to an embodiment, between a light guide member moved to the other side and a light-emitting unit in a state with a housing and a light-transmitting body omitted, as seen from the light guide member side.
Figure 16:
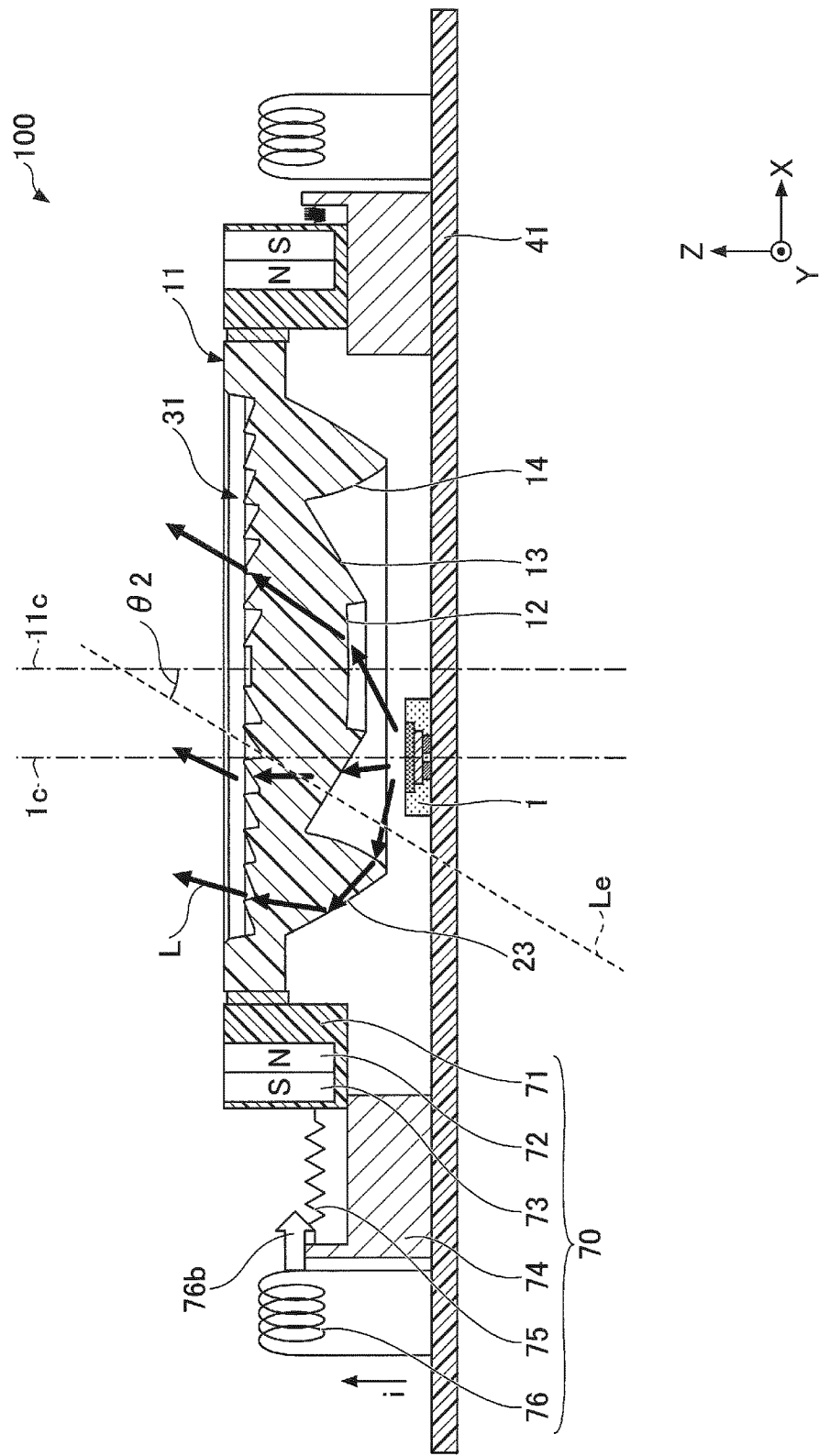
FIG. 16 is a cross-sectional view illustrating the optical path of the light-emitting device in FIG. 15.

Next, FIG. 15 is a diagram illustrating an example of a positional relationship between the light guide member 11 and the light-emitting unit 1 in a state in which, in the light-emitting device 100, the light guide member 11 is moved to the other side, that is, to the +X side, and is a plan view as seen from the light guide member 11 side of a state in which the housing 51 and the light-transmitting body 54 are omitted. FIG. 16 is a cross-sectional view illustrating an example of the optical path of the light-emitting device 100 of FIG. 15.

In the state of the light-emitting device 100 illustrated in FIGS. 15 and 16, of the four coils 76, the current i flows in the forward direction in the coil disposed on the −X side, and an electromagnetic force 76b is generated toward the +X side. The frame portion 71 is pushed and moved toward the +X side together with the light guide member 11 by the electromagnetic force 76b, and thus the center axis 11c of the light guide member 11 is offset to the +X side with respect to the center axis 1c of the light-emitting surface 1a.

Note that, in a state in which the light guide member 11 is moving to the +X side, of the four coils 76, no current flows through the coils 76 disposed on the +Y side, the −Y side, and the +X side. However, a current may flow in the reverse direction in the coil 76 that is disposed on the +X side. This can further increase the electromagnetic force 76b compared to a case in which current flows through only the coil 76 that is positioned on the −X side.

The light L emitted from the light-emitting unit 1 is focused by being guided through the interior of the light guide member 11 through each of the first incident portion 12, the second incident portion 13, and the third incident portion 14. The light L having passed through the first incident portion 12 and the second incident portion 13 exits from the interior of the light guide member 11 through the Fresnel lens portion 31. On the other hand, after the light L that has passed through the third incident portion 14 is reflected at the total reflection portion 23, the light L exits from the interior of the light guide member 11 through the Fresnel lens portion 31. The center axis Le of the emitted light is inclined at an angle θ2 with respect to the center axis 11c of the light guide member 11 in accordance with the shift between the center axis 11c of the light guide member 11 and the center axis 1c of the light-emitting surface 1a.

Figure 17:
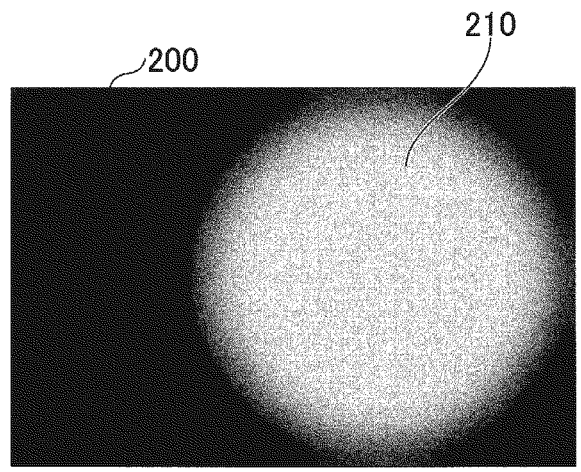
FIG. 17 is a schematic diagram illustrating the illuminance distribution of the light-emitting device in FIG. 16.

FIG. 17 is a schematic diagram illustrating an example of the illuminance distribution of the irradiation light in the light-emitting device 100 of FIG. 15. As illustrated in FIG. 17, the partial irradiation region 210 caused by the irradiation light is located at a position offset from the center of the irradiatable region 200 by the angle θ2.

In the configurations illustrated in FIGS. 10 to 17, the light-emitting device 100 includes one light-emitting unit 1 (in other words, one light-emitting surface 1a), and the movement mechanism 70 moves the light guide member 11 relative to the light-emitting unit 1 in a state in which one light-emitting unit 1 is emitting light. In a case in which the light-emitting device 100 includes a plurality of the light-emitting surfaces 1a, it is only required that the light guide member 11 be moved by the movement mechanism 70 relative to the plurality of light-emitting surfaces 1a or the plurality of light-emitting units 1 such that at least the light-emitting surface 1a, of the plurality of light-emitting surfaces 1a, that is emitting light is located inward of the total reflection portion 23 in a plan view (specifically, inward of the lowest portion 16 of the frame-like light guide member 11 in a plan view).

Effect of Fresnel Lens Portion 31

Figure 18:
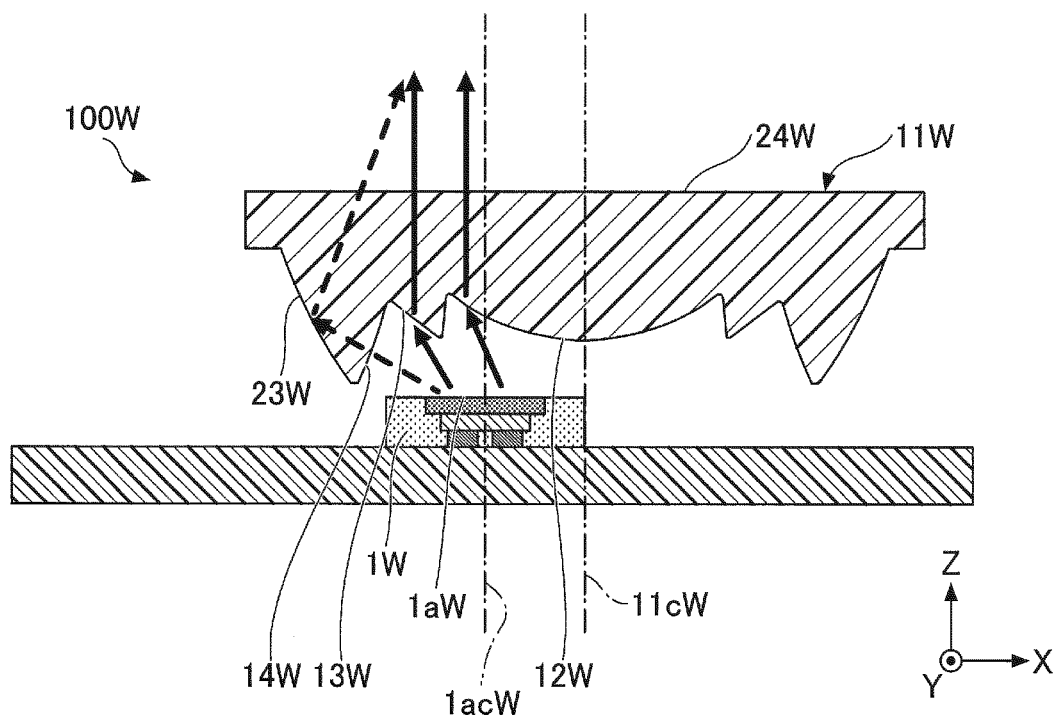
FIG. 18 is a cross-sectional view illustrating the optical path of a light-emitting device according to another example of an embodiment.
Figure 19:
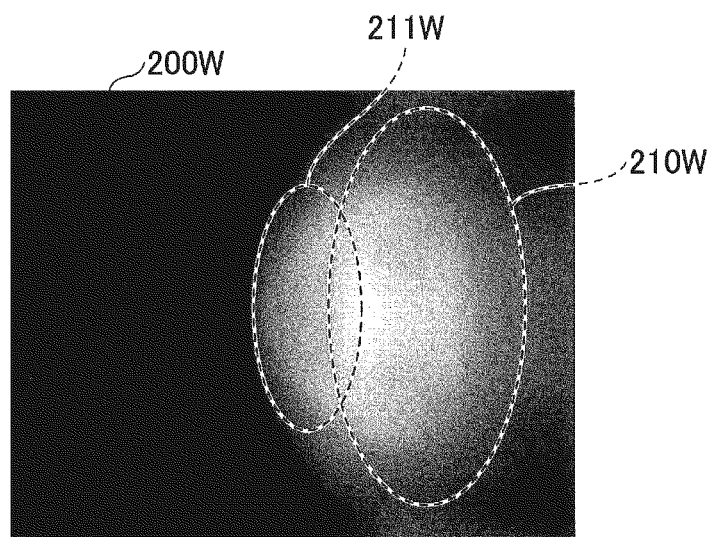
FIG. 19 is a schematic diagram illustrating the illuminance distribution of the light-emitting device in FIG. 18.
Figure 20:
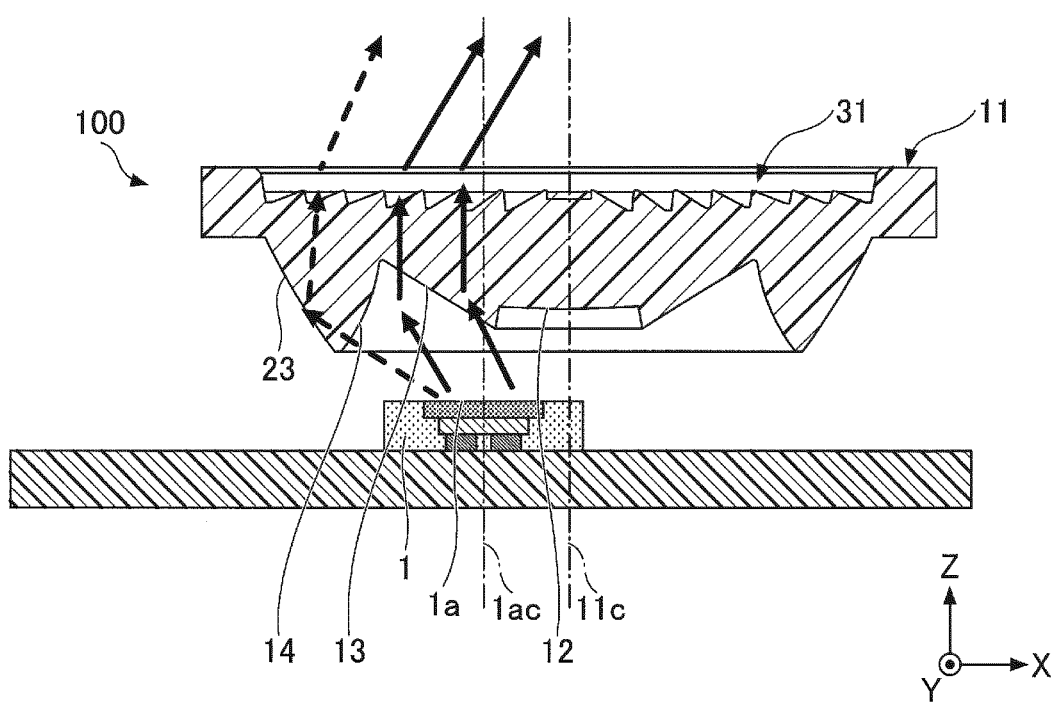
FIG. 20 is a cross-sectional view illustrating the optical path of a light-emitting device according to an embodiment.
Figure 21:
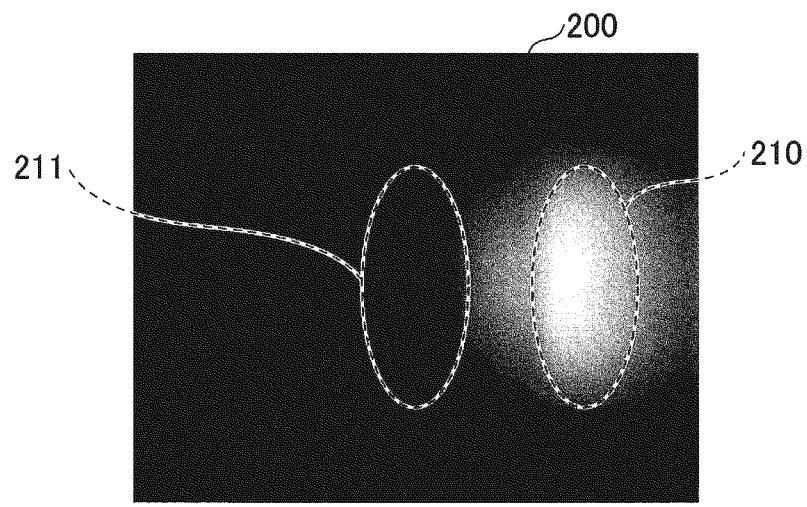
FIG. 21 is a schematic diagram illustrating the illuminance distribution of the light-emitting device in FIG. 20.

FIGS. 18 to 21 are diagrams illustrating the operation of the Fresnel lens portion 31. FIG. 18 is a cross-sectional view illustrating the optical path of a light-emitting device 100W according to another example of an embodiment, and FIG. 19 is a schematic diagram illustrating the illuminance distribution of the irradiation light of the light-emitting device 100W of FIG. 18. Also, FIG. 20 is a cross-sectional view illustrating an example of the optical path of the light-emitting device 100 according to an embodiment, and FIG. 21 is a schematic diagram illustrating an example of the illuminance distribution of the irradiation light of the light-emitting device 100 of FIG.

As illustrated in FIG. 18, the light-emitting device 100W includes a light guide member 11W that is not provided with a Fresnel lens on the emission side. FIG. 18 illustrates an arrangement in which a center axis 11cW of the light guide member 11W is shifted to the +X side with respect to a center axis 1acW of a light-emitting surface 1aW in order to emit partial irradiation light from the light-emitting device 100W in a direction inclined to the +X side.

Light incident on an outer region (in other words, a third incident portion 14W) in the light guide member 11W from a light-emitting unit 1W is reflected at a total reflection portion 23W, then exits from the light guide member 11W through an emission plane 24W in a direction inclined to the +X side, and, as illustrated in FIG. 19, reaches a partial irradiation region 210W of an irradiatable region 200W.

On the other hand, light incident on an inner region (in other words, a first incident portion 12W and a second incident portion 13W) in the light guide member 11W from the light-emitting unit 1W does not enter the total reflection portion 23W, exits to the outside from the light guide member 11W through the emission plane 24W in a substantially parallel state, and, as illustrated in FIG. 19, reaches a central region 211W of the irradiatable region 200W.

FIG. 20 illustrates an arrangement in which the center axis 11c of the light guide member 11 is shifted to the +X side with respect to the center axis 1ac of the light-emitting surface 1a in order to incline the partial irradiation light from the light-emitting device 100 to the +X side.

Light incident on the outer region (in other words, the third incident portion 14) within the light guide member 11 from the light-emitting unit 1 is reflected at the total reflection portion 23, is incident on the Fresnel lens portion 31, and exits to the outside from the light guide member 11 in a direction inclined to the +X side by the refraction or diffraction action of the Fresnel lens portion 31. Then, as illustrated in FIG. 21, the light reaches the partial irradiation region 210 in the irradiatable region 200.

On the other hand, light incident on the inner region (in other words, the first incident portion 12 and the second incident portion 13) within the light guide member 11 from the light-emitting unit 1 does not enter the total reflection portion 23, is incident on the Fresnel lens portion 31 in a substantially parallel state, and exits to the outside from the light guide member 11 in a direction inclined to the +X side by the refraction or diffraction action of the Fresnel lens portion 31. Then, as illustrated in FIG. 21, the light reaches the partial irradiation region 210 in the irradiatable region 200.

In the light-emitting device 100W, by moving the light guide member 11W relative to the light-emitting unit 1W, the light incident on the outer region within the light guide member 11W from the light-emitting unit 1W is focused at the total reflection portion 23W, and a target region of the irradiatable region 200W can be partially irradiated. In the light-emitting device 100, light incident on the inner region within the light guide member 11 from the light-emitting unit 1 can be inclined by the refraction or diffraction action of the Fresnel lens portion 31. Thus, the light reaching a central region 211 of the irradiatable region 200 can be suppressed, and only a desired region in the irradiatable region 200 can be appropriately partially irradiated.

For example, when the shape of the Fresnel lens portion 31 is determined such that the refractive power with respect to the light incident on the inner region within the light guide member 11 from the light-emitting unit 1 is greater, light reaching the central region 211 of the irradiatable region 200 can be further suppressed. This is more preferable because, as a result, only the desired region in the irradiatable region 200 can be more appropriately partially irradiated. By using the Fresnel lens portion 31, the light guide member 11 is not made thicker when the refractive power is increased, so it is possible to avoid increasing the size of the light-emitting device 100.

Examples of Optical Path and Illuminance Distribution for Each Light Passing Through Different Regions of the Light Guide Member 11

FIGS. 22 to 36 are diagrams illustrating the optical path and illuminance distribution for each light passing through different regions of the light guide member 11. The different regions of the light guide member 11 specifically refer to three regions: region A, region B, and region C. The region A is a region through which light incident on the light guide member 11 passes through the first incident portion 12 and the second incident portion 13. The region B is a region through which light that exits without entering the total reflection portion 23 passes after being incident on the light guide member 11 through the third incident portion 14. The region C is a region through which light that exits via the total reflection portion 23 passes after being incident on the light guide member 11 through the third incident portion 14.

Figure 22:
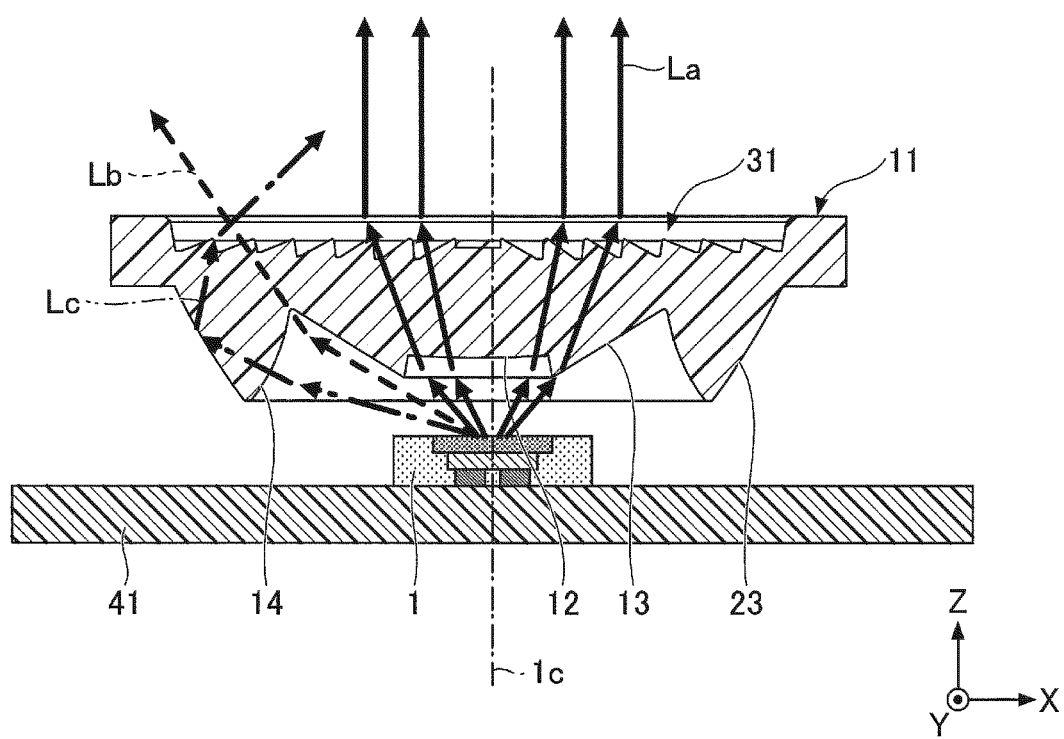
FIG. 22 is a cross-sectional view illustrating a first example of the optical path of a light-emitting device according to an embodiment.
Figure 23:
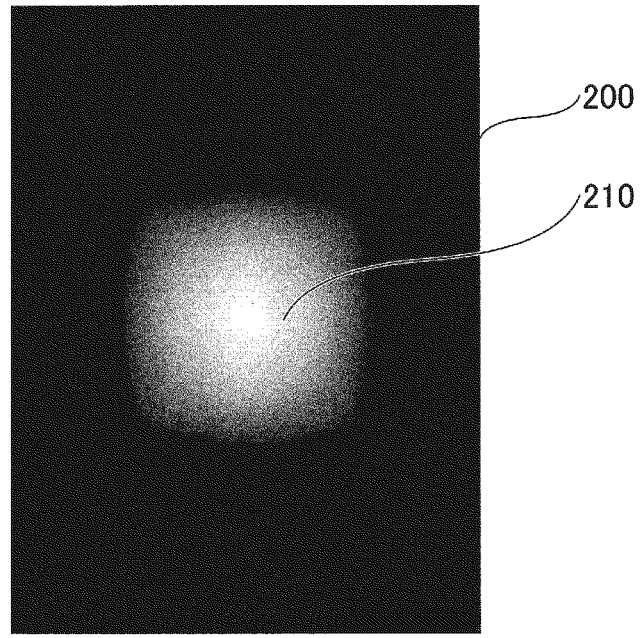
FIG. 23 is a schematic diagram of the illuminance distribution by light passing through a region A of the light-emitting device in FIG. 22.
Figure 24:
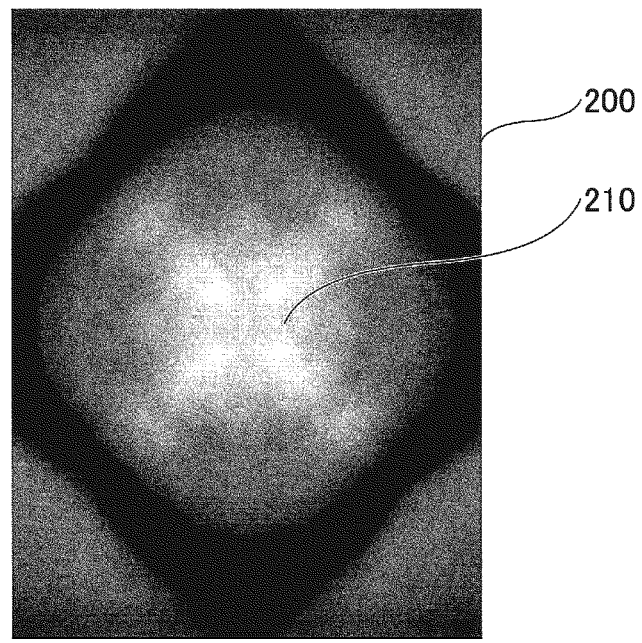
FIG. 24 is a schematic diagram of the illuminance distribution by light passing through a region B of the light-emitting device in FIG. 22.
Figure 25:
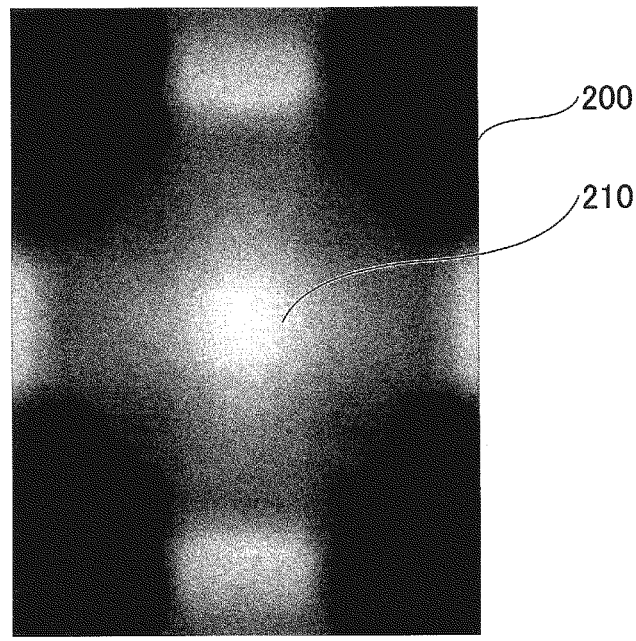
FIG. 25 is a schematic diagram of the illuminance distribution by light passing through a region C of the light-emitting device in FIG. 22.
Figure 26:
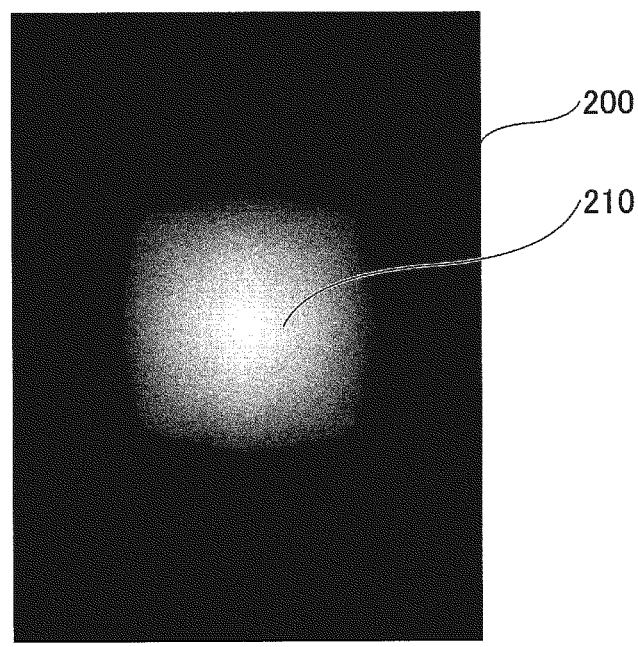
FIG. 26 is a schematic diagram of a combined illuminance distribution of the illuminance distributions of FIGS. 23 to 25.

FIGS. 22 to 26 are diagrams illustrating, as a first example, a state in which the light guide member 11 is not moving. FIG. 22 is a diagram illustrating the light paths of the light-emitting device 100. FIG. 23 is a schematic diagram of the illuminance distribution of the light that passes through the region A. FIG. 24 is a schematic diagram of the illuminance distribution of the light that passes through the region B. FIG. 25 is a schematic diagram of the illuminance distribution of the light that passes through the region C. FIG. 26 is a schematic diagram of a combined illuminance distribution of the illuminance distributions of FIGS. 23 to 25.

Figure 27:
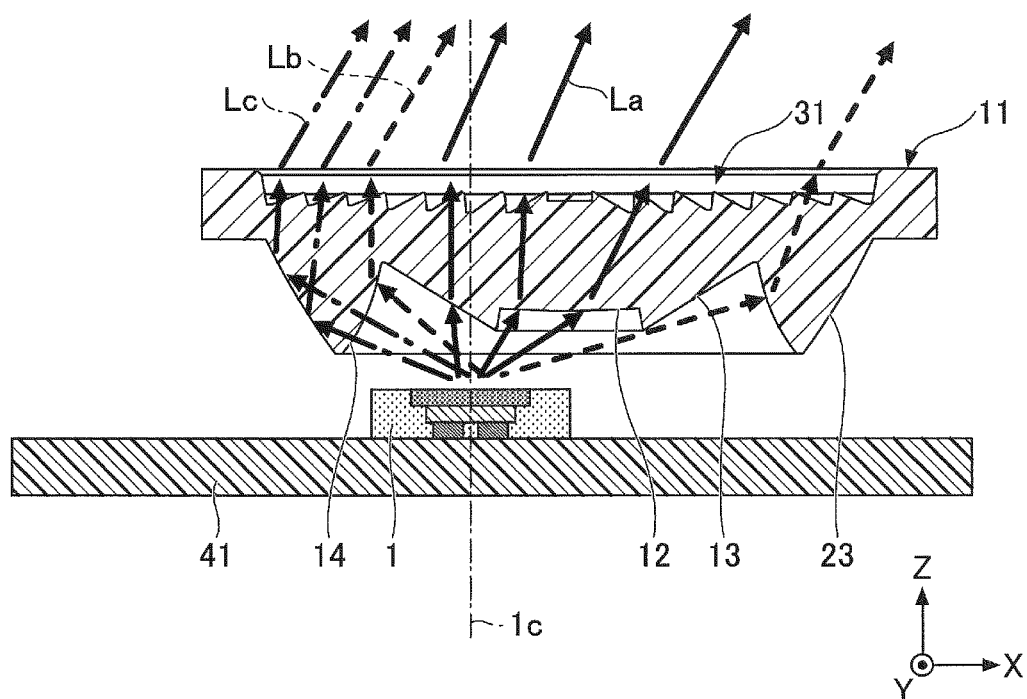
FIG. 27 is a cross-sectional view illustrating a second example of the optical path of a light-emitting device according to an embodiment.
Figure 28:
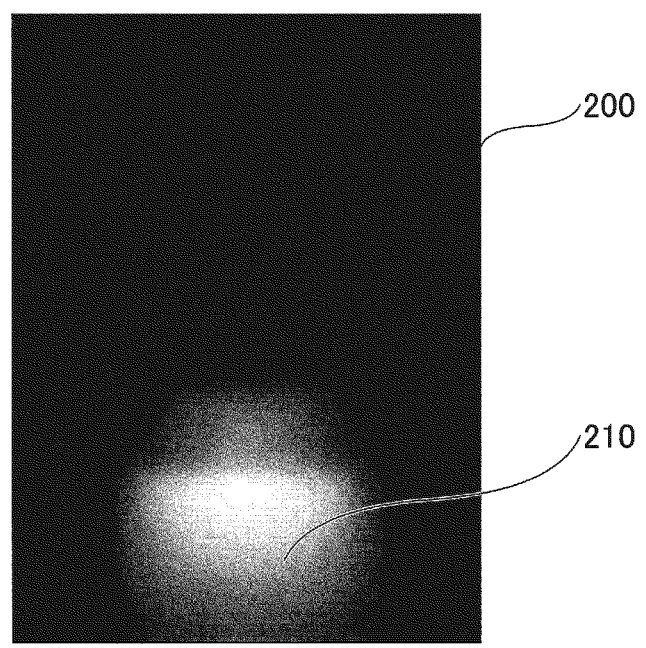
FIG. 28 is a schematic diagram of the illuminance distribution by light passing through a region A of the light-emitting device in FIG. 27.
Figure 29:
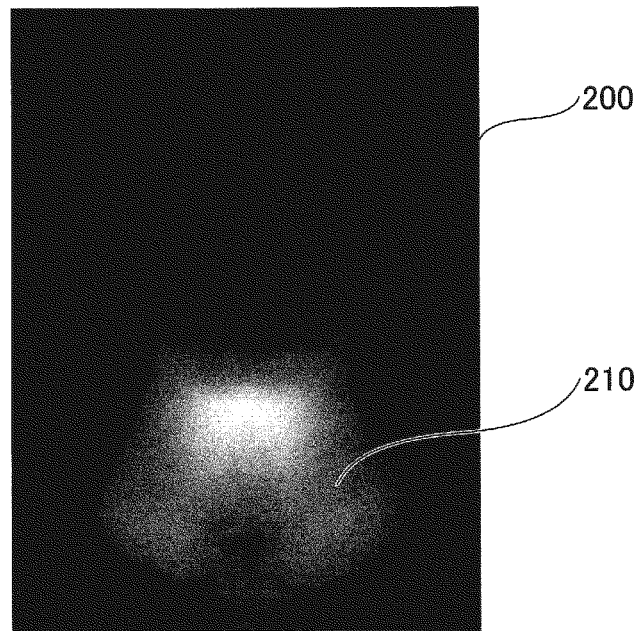
FIG. 29 is a schematic diagram of the illuminance distribution by light passing through a region B of the light-emitting device in FIG. 27.
Figure 30:
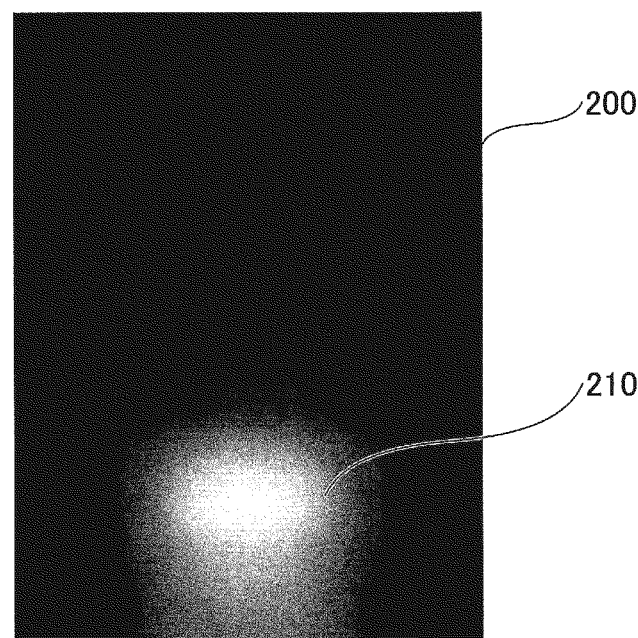
FIG. 30 is a schematic diagram of the illuminance distribution by light passing through a region C of the light-emitting device in FIG. 27.
Figure 31:
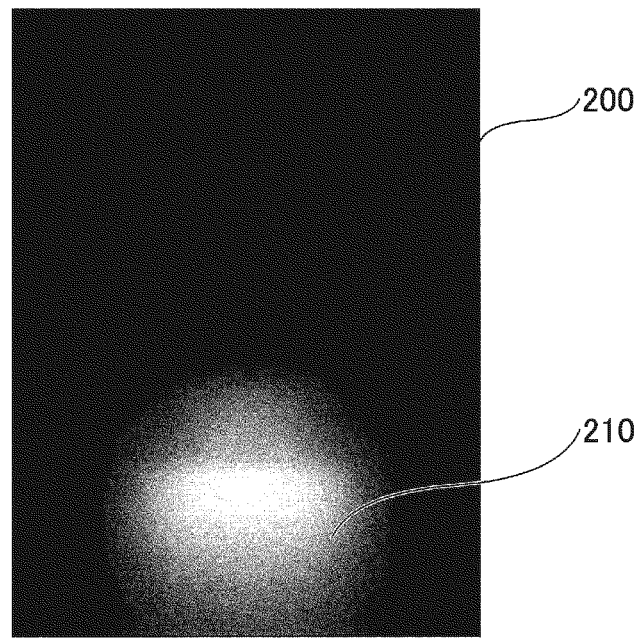
FIG. 31 is a schematic diagram of a combined illuminance distribution of the illuminance distributions of FIGS. 28 to 30.

FIGS. 27 to 31 are diagrams illustrating, as a second example, a state in which the light guide member 11 is moving in the X direction or the Y direction, that is, in the lateral direction, in a plan view. FIG. 27 is a diagram illustrating the light paths of the light-emitting device 100. FIG. 28 is a schematic diagram of the illuminance distribution of the light that passes through the region A. FIG. 29 is a schematic diagram of the illuminance distribution of the light that passes through the region B. FIG. 30 is a schematic diagram of the illuminance distribution of the light that passes through the region C. FIG. 31 is a schematic diagram of a combined illuminance distribution of the illuminance distributions of FIGS. 28 to 30.

Figure 32:
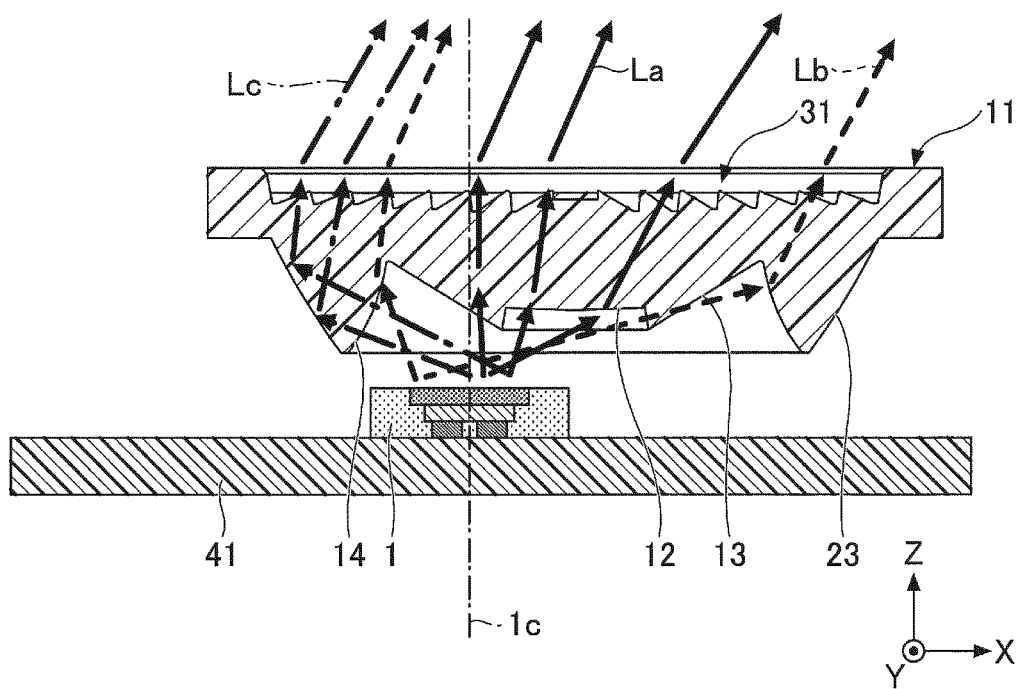
FIG. 32 is a cross-sectional view illustrating a third example of the optical path of a light-emitting device according to an embodiment.
Figure 33:
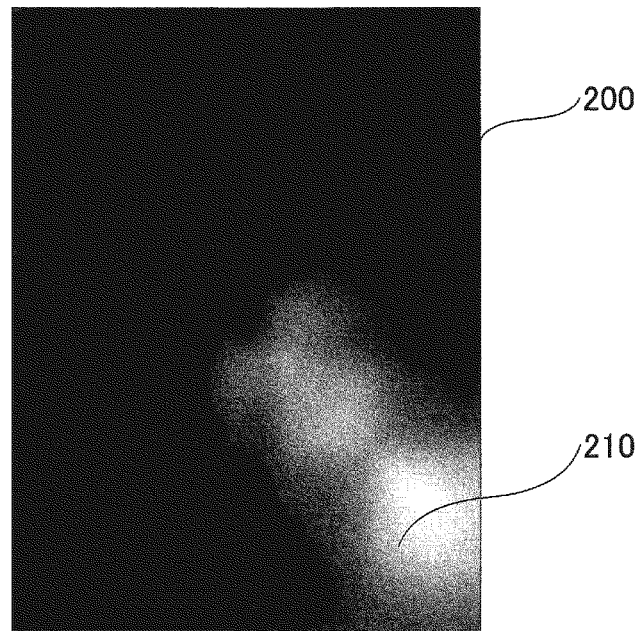
FIG. 33 is a schematic diagram of the illuminance distribution by light passing through a region A of the light-emitting device in FIG. 32.
Figure 34:
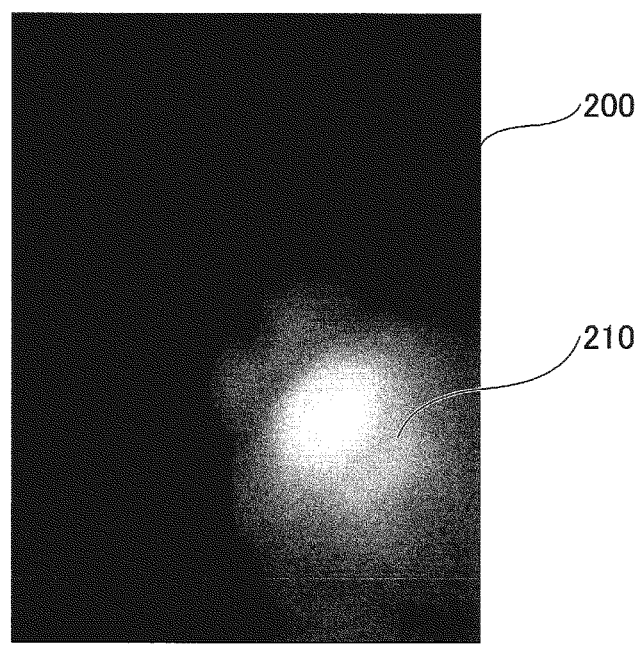
FIG. 34 is a schematic diagram of the illuminance distribution by light passing through a region B of the light-emitting device in FIG. 32.
Figure 35:
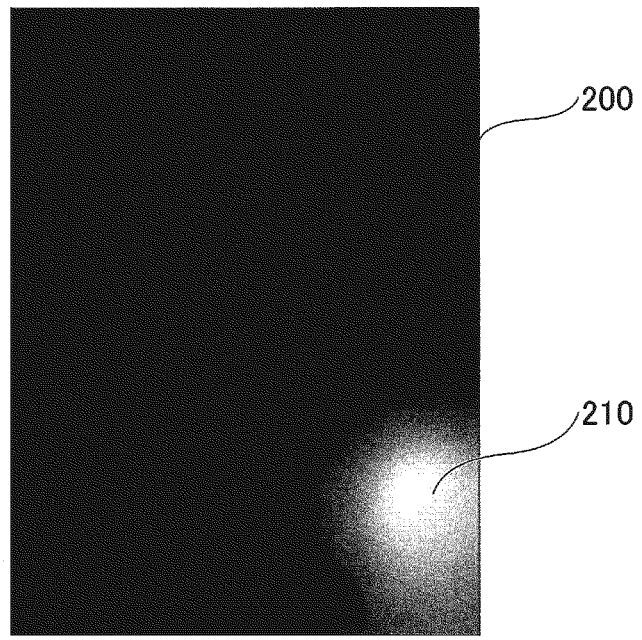
FIG. 35 is a schematic diagram of the illuminance distribution by light passing through a region C of the light-emitting device in FIG. 32.
Figure 36:
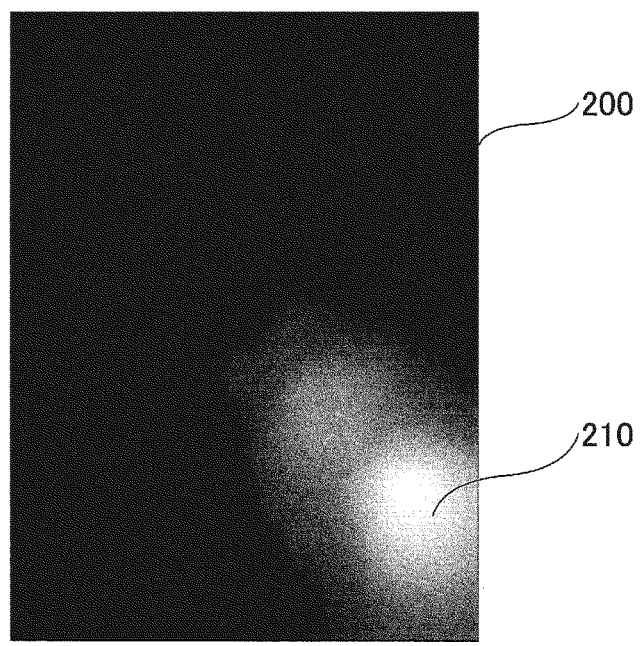
FIG. 36 is a schematic diagram of a combined illuminance distribution of the illuminance distributions of FIGS. 33 to 35.

FIGS. 32 to 36 are diagrams illustrating, as a third example, a state in which the light guide member 11 is moving in a diagonal direction, that is, in the direction of the corners of the frame portion 71, in a plan view. FIG. 32 is a diagram illustrating the light paths of the light-emitting device 100. FIG. 33 is a schematic diagram of the illuminance distribution of the light that passes through the region A. FIG. 34 is a schematic diagram of the illuminance distribution of the light that passes through the region B. FIG. 35 is a schematic diagram of the illuminance distribution of the light that passes through the region C. FIG. 36 is a schematic diagram of a combined illuminance distribution of the illuminance distributions of FIGS. 33 to 35.

FIGS. 22 to 36 all illustrate simulation results. In the optical path diagrams illustrated in FIGS. 22, 27, and 32, a light La passing through the region A is indicated by the solid arrow, a light Lb passing through the region B is indicated by the dashed line arrow, and a light Lc passing through the region C is indicated by the dot-dash line arrow.

As illustrated in FIGS. 27 to 36, in a state in which the light guide member 11 is moving in the lateral direction and the direction of the corners of the frame portion 71, the light passing through any one of the region A, the region B, and the region C can also selectively irradiate the desired partial irradiation region 210 in the lateral direction or the direction of the corners of the frame portion 71 in the irradiatable region 200. Also, as illustrated in FIGS. 22 to 26, in a state in which the light guide member 11 is not moving, the amount of light passing through the region A increases and, in this case as well, can selectively irradiate the desired partial irradiation region 210 in the center direction.

Example of Positional Relationship Between Light Guide Member 11 and Light-Emitting Unit 1 in Height Direction FIGS. 37 to 40 are diagrams illustrating examples of the positional relationship between the light guide member 11 and the light-emitting unit 1 in the height direction. Note that the height direction corresponds to the Z direction.

Figure 37:
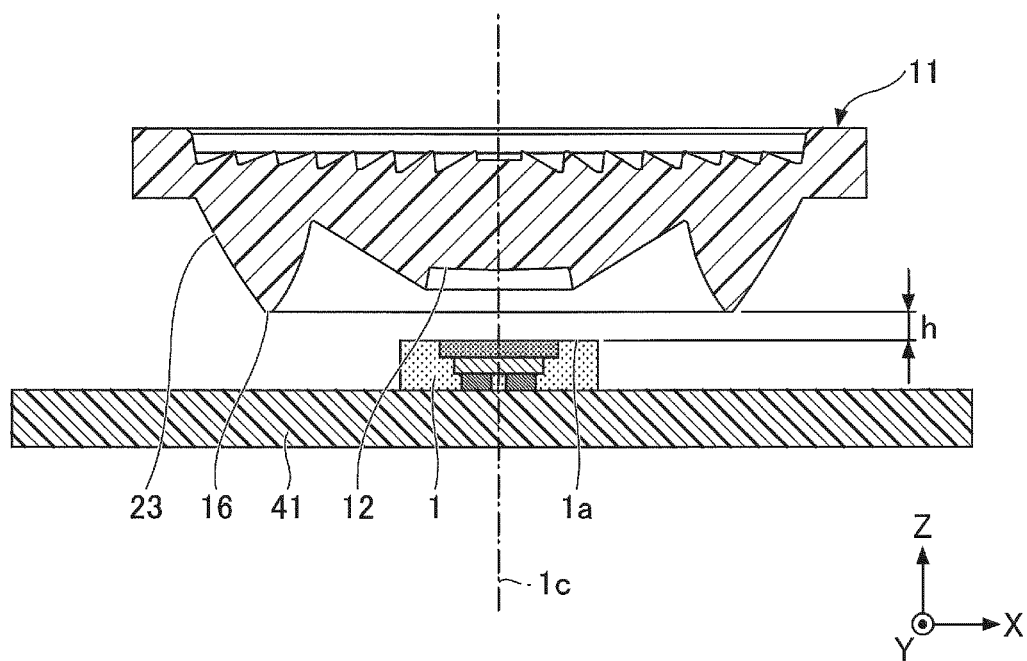
FIG. 37 is a cross-sectional view illustrating a first example of the positional relationship between a light guide member and a light-emitting unit in a height direction.
Figure 38:
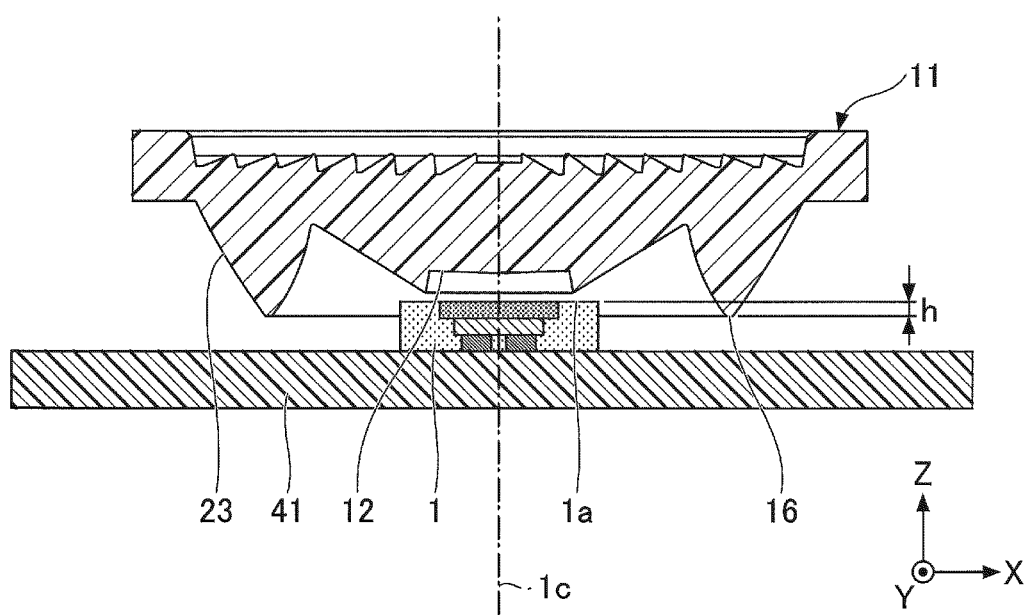
FIG. 38 is a cross-sectional view illustrating a second example of the positional relationship between a light guide member and a light-emitting unit in the height direction.
Figure 39:
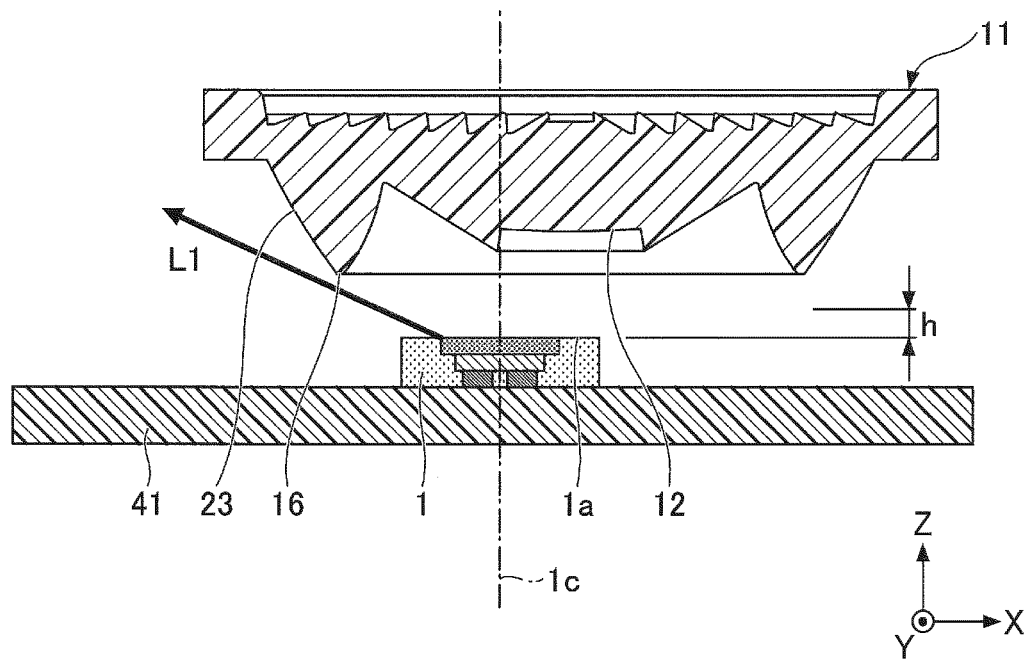
FIG. 39 is a cross-sectional view illustrating a third example of the positional relationship between a light guide member and a light-emitting unit in the height direction.
Figure 40:
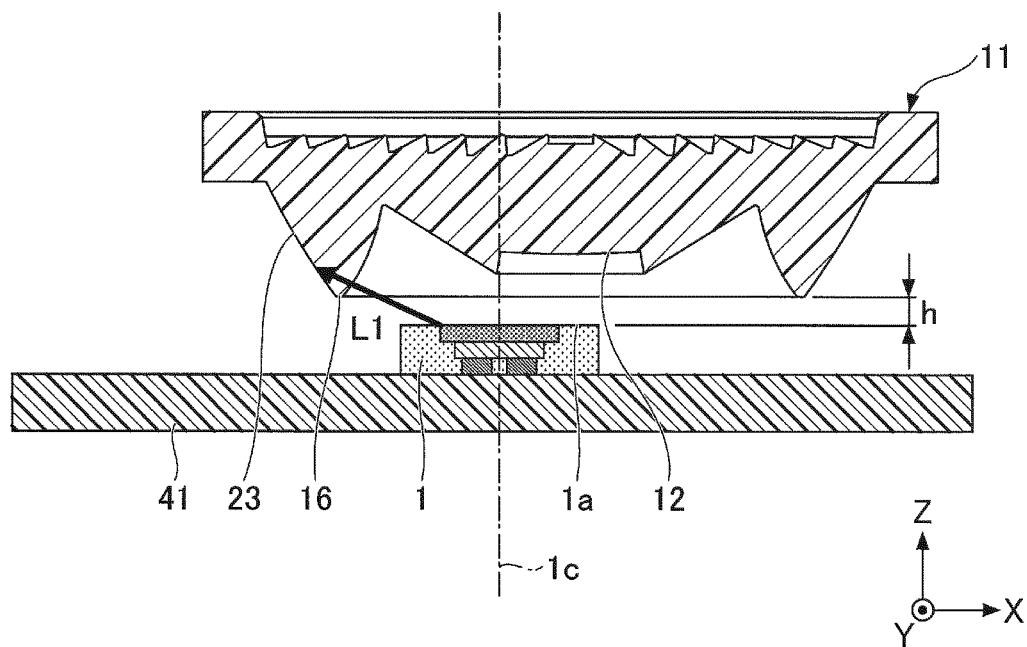
FIG. 40 is a cross-sectional view illustrating a fourth example of the positional relationship between a light guide member and a light-emitting unit in the height direction.

FIG. 37 is a diagram illustrating, as a first example, a state in which the lowest portion 16 of the light guide member 11 is on the +Z side of the light-emitting unit 1. Here, the lowest portion 16 refers to a portion of the light guide member 11 furthest to the −Z side. FIG. 38 is a diagram illustrating, as a second example, a state in which the lowest portion 16 of the light guide member 11 is on the −Z side of the light-emitting unit 1. FIG. 39 is a diagram illustrating, as a third example, a state in which the light guide member 11 is moving to the +X side relative to the light-emitting unit 1 and light emitted from the light-emitting unit 1 leaks without being incident on the light guide member 11. FIG. 40 is a diagram illustrating, as a fourth example, a state in which the light guide member 11 is moving to the +X side relative to the light-emitting unit 1 and light emitted from the light-emitting unit 1 does not leak without being incident on the light guide member 11.

A shortest distance h illustrated in FIGS. 37 to 40 refers to the shortest distance in a direction substantially orthogonal to the light-emitting surface 1a between the light-emitting surface 1a of the light-emitting unit 1 and the light guide member 11. The shortest distance h, in other words, is the distance between the light-emitting surface 1a and the lowest portion 16.

In the present embodiment, the shortest distance h is preferably in a range of from 0.0 mm to 1.0 mm. However, the shortest distance h is not only the distance between the light-emitting surface 1a and the lowest portion 16 in a state in which the lowest portion 16 of the light guide member 11 is on the +Z side of the light-emitting surface 1a (see FIG. 37) and also includes, in a case in which the light-emitting surface 1a is not in contact with the light guide member 11, the distance between the light-emitting surface 1a and the lowest portion 16 in a state in which the lowest portion 16 of the light guide member 11 is on the −Z side of the light-emitting surface 1a (see FIG. 38).

With this configuration, the light-emitting device 100 can be made thinner. In addition, when the light-emitting unit 1 faces the first incident portion 12 provided in the center of the light guide member 11, most of the incident light on the light guide member 11 does not reach the total reflection portion 23, so the spread of light is suppressed, and the desired region of the irradiatable region 200 can be more accurately partially irradiated by the light-emitting device 100.

On the other hand, as illustrated in FIG. 39, in a state in which the light guide member 11 is moving to the +X side relative to the light-emitting unit 1, depending on the shortest distance h, a light L1, of the light emitted from the light-emitting unit 1, emitted in a wide angle may leak without being incident on the light guide member 11.

Thus, the shortest distance his more preferably in a range of from 0.0 mm to 0.4 mm. According to this configuration, as illustrated in FIG. 40, even in a state in which the light guide member 11 is moving to the +X side relative to the light-emitting unit 1, the light L1 emitted in a wide angle can be incident on the light guide member 11. As a result, the light-emitting device 100 can be made compact and a reduction in light usage efficiency caused by light emitted by the light-emitting unit 1 leaking from the light guide member 11 can be suppressed.

EXAMPLES

Next, an optical simulation performed using a model of the light-emitting device of the examples will be described. However, the light-emitting device according to an embodiment is not limited to the examples described below.

Using the model of the light-emitting device 100 of the examples, the illuminance distribution when the light-emitting unit 1 is turned on was determined by simulation under the following conditions.

Figure 41:
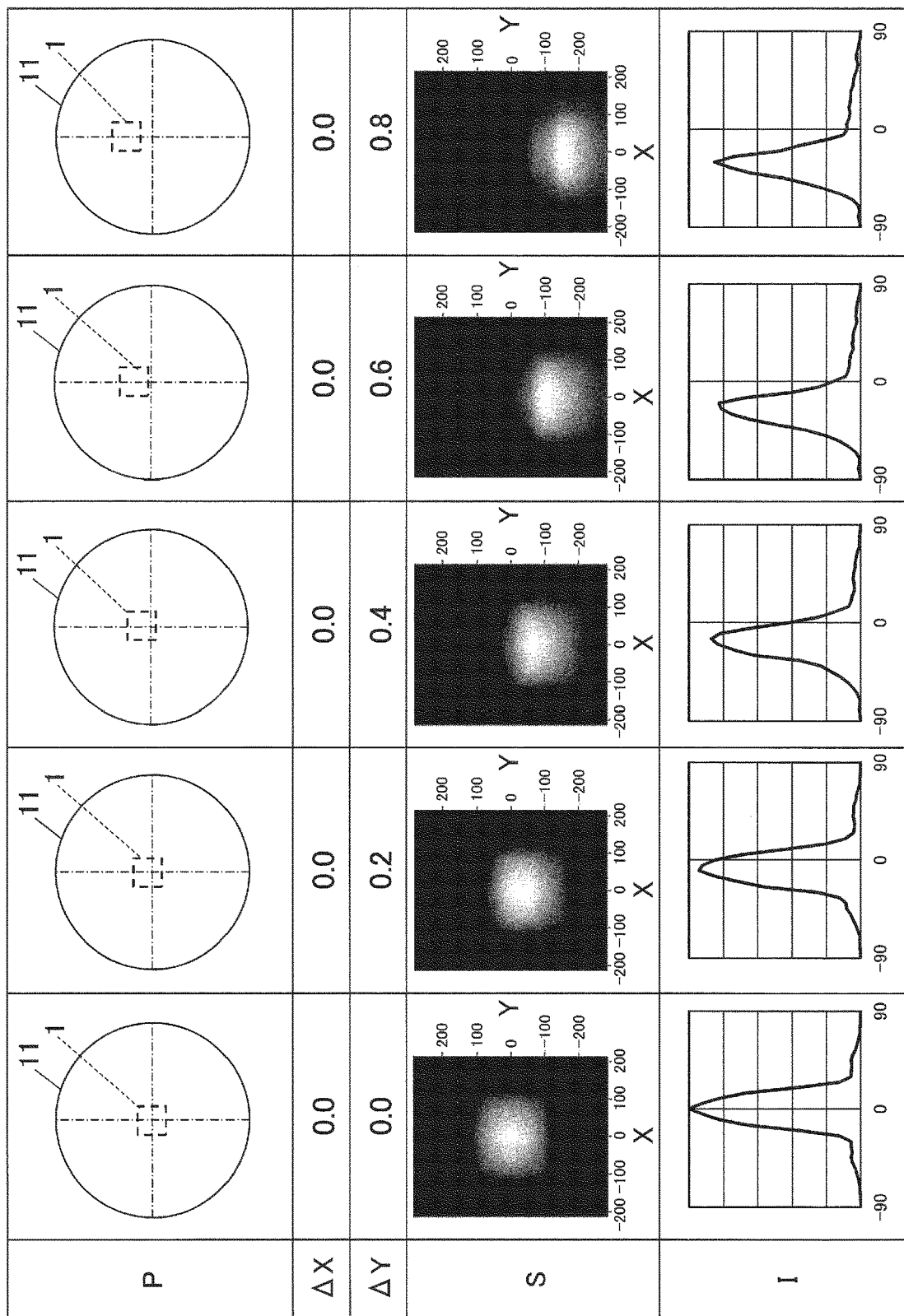
FIG. 41 is a diagram illustrating the relationship between the amount of movement of a light guide member and the illuminance distribution according to a first example.
Figure 42:
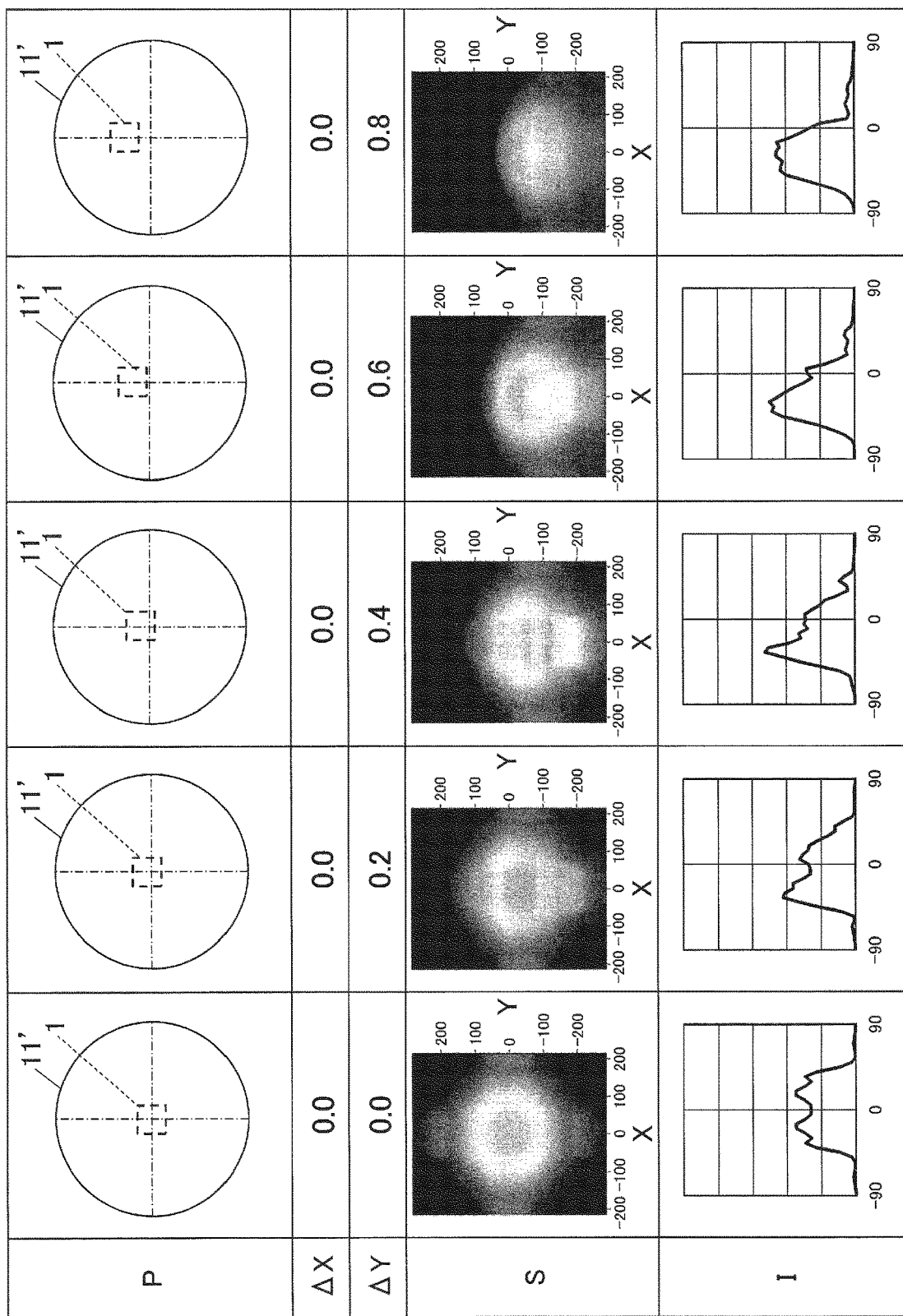
FIG. 42 is a diagram illustrating the relationship between the amount of movement of a light guide member and the illuminance distribution according to a second example.
Figure 43:
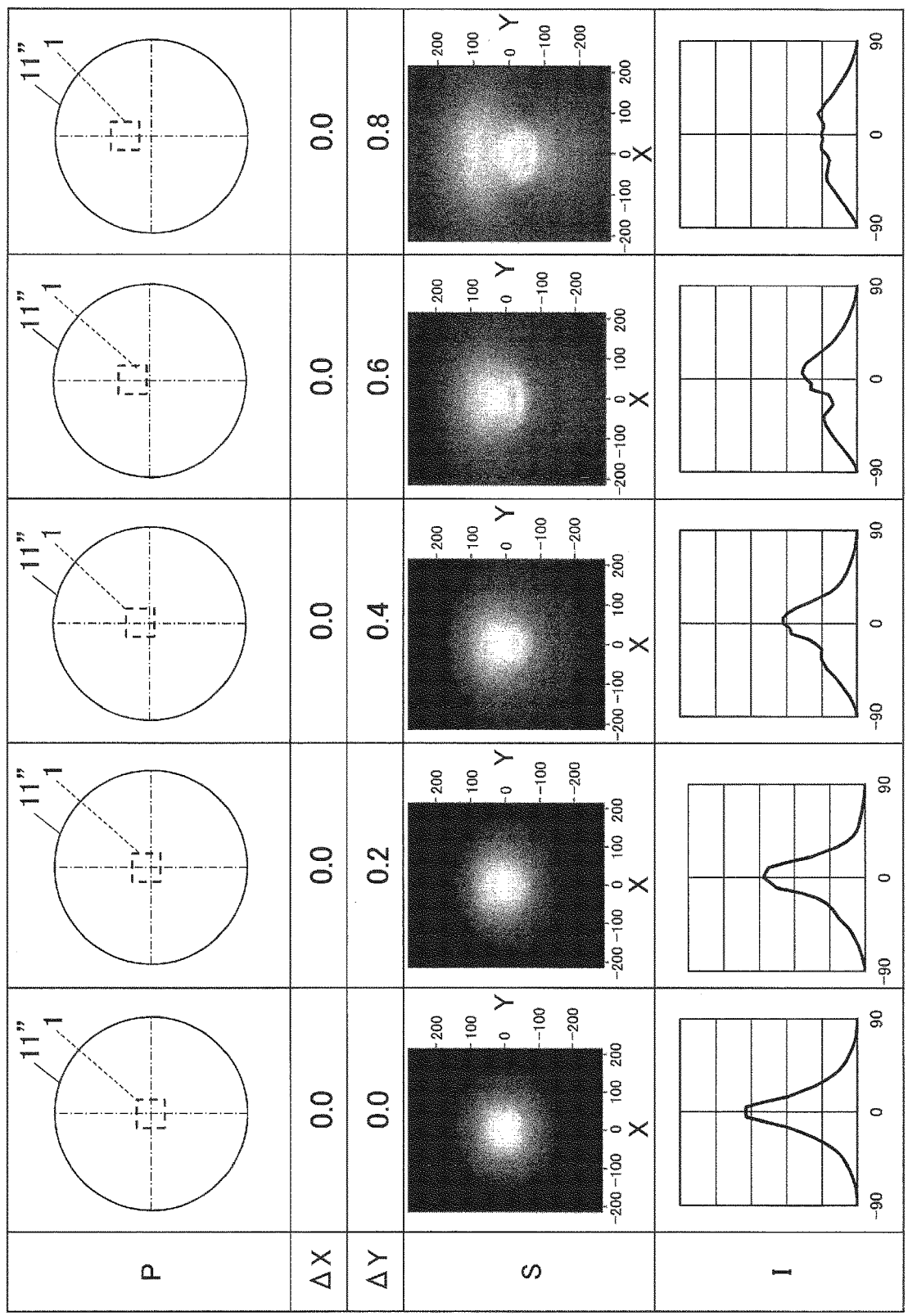
FIG. 43 is a diagram illustrating the relationship between the amount of movement of a light guide member and the illuminance distribution according to a comparative example.

Simulation Conditions
  Size of light-emitting surface of light-emitting unit 1: 0.7 mm×0.7 mm
  Size of evaluation light receiver: 429 mm×572 mm
  Distance between light-emitting device and evaluation light receiver: 300.0 mm
  Angle of view of evaluation light receiver: 100 degrees
  Shortest distance between light-emitting surface 1a of light-emitting unit 1 and light guide member 11: 0.1 mm FIGS. 41 to 43 are diagrams illustrating the relationship between the movement amount of the light guide member and the illuminance distribution in the light-emitting device. FIG. 41 illustrates a first example, FIG. 42 illustrates a second example, and FIG. 43 illustrates a comparative example. The first example is of the light-emitting device 100 including the light guide member 11 according to an embodiment. The second example is of a light-emitting device including a light guide member 11' according to an embodiment. The light guide member 11' has a flat surface on the emission side (side opposite to the light incident side) of the guided light and the light guide member 11W illustrated in FIG. 18, for example, can be applied. The comparative example is of a light-emitting device including a light guide member 11" having a Fresnel lens portion on the incident side and a flat surface on the emission side.

In FIGS. 41 to 43, the positional relationships between the light-emitting unit and the light guide member 11 in a plan view are illustrated as positional relationships P. An amount of movement ΔX indicates the amount of relative movement in the X direction (mm), and an amount of movement ΔY indicates the amount of relative movement in the Y direction (mm). In the examples of FIGS. 41 to 43, only ΔY is varied in 0.2 mm increments.

Additionally, an illuminance distribution S indicates the illuminance distribution of the irradiation light in the light-emitting device, and a cross-sectional illuminance distribution I indicates a cross-sectional illuminance distribution (X=0.0 mm) along the Y direction of the irradiation light, that is, an illuminance distribution of irradiation light in a cross-section including both midpoints of two facing sides in a square light-emitting surface 1a and including the center axis of the irradiation light. The horizontal axis of the graph representing the cross-sectional illuminance distribution I indicates a light distribution angle of from −90.0 degrees to +90.0 degrees, and the vertical axis represents illumination. The vertical axis is a unified representation of the illuminance range, i.e. the minimum value and maximum value of illumination, in all graphs in FIGS. 41 to 43.

As illustrated in FIG. 41, in the first example, the position of the partial irradiation light and the light distribution angle at which the illumination peaked varied depending on a change in the amount of movement ΔY. Furthermore, the illuminance distribution of the partial irradiation light is maintained in substantially the same state even when the amount of movement ΔY changes. The peak illumination of the partial irradiation light also maintains in a similar state even when the amount of movement ΔY changes, and a high peak is maintained.

Also, as illustrated in FIG. 42, in the second example, the position of the partial irradiation light and the light distribution angle at which the illumination peaked varied depending on a change in the amount of movement ΔY.

On the other hand, as illustrated in FIG. 43, in the comparative example, no change depending on a change in the amount of movement ΔY was found for the position of the partial irradiation light and the light distribution angle at which the illumination peaked. The illuminance distribution and the peak illumination of the partial irradiation light were not maintained due to the change in the amount of movement ΔY.

From this, it can be seen that in the comparative example, partial irradiation is difficult to perform appropriately, while in the first and second examples, partial irradiation was appropriately performed. In addition, in the first example, it was confirmed that the position and light distribution angle of the partial irradiation light can be controlled by the amount of relative movement, and that the partial irradiation was more appropriate.

Figure 44A:
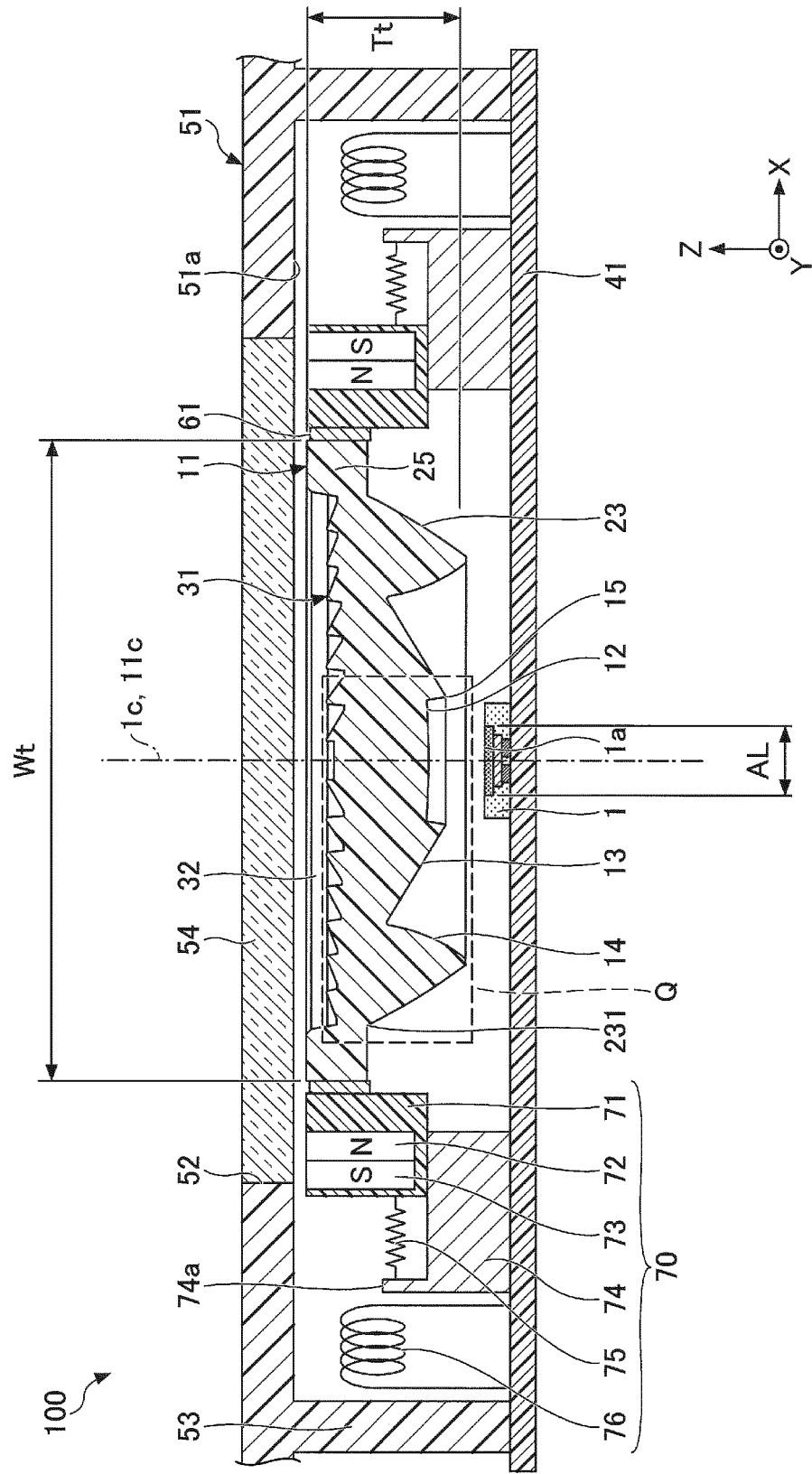
FIG. 44A is a cross-sectional view for illustrating an example of the dimensions of a light-emitting device according to an embodiment.
Figure 44B:
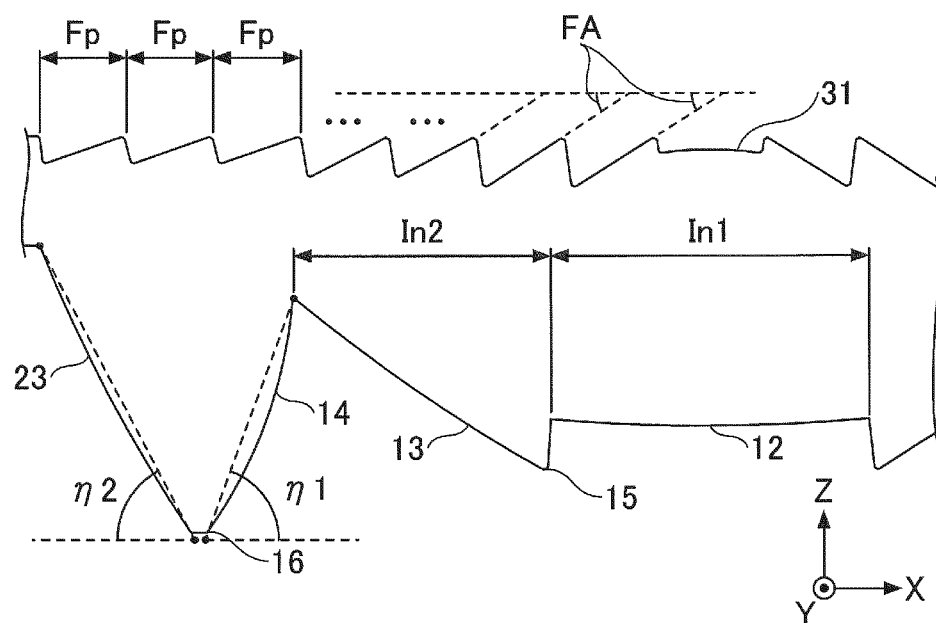
FIG. 44B is an enlarged view of a region Q in FIG. 44A.
Figure 44C:
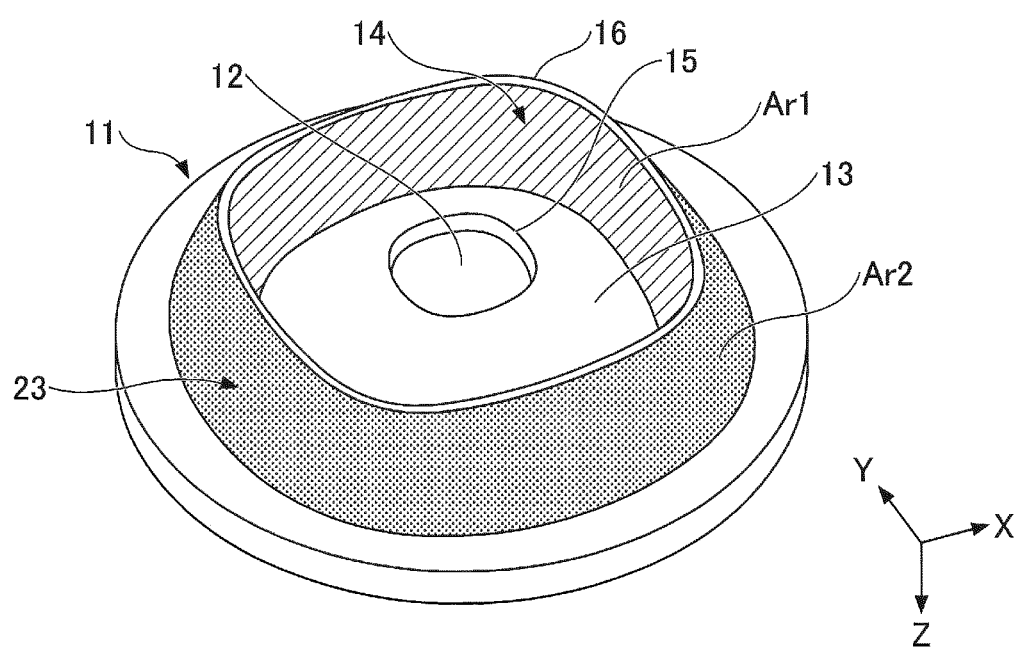
FIG. 44C is a perspective view of a light guide member as seen from the −Z side.

Next, an example of the dimensions of the light-emitting device 100 according to an embodiment will be described with reference to FIGS. 44A to 44C. FIG. 44A is a cross-sectional view for illustrating an example of the dimensions of the light-emitting device 100. FIG. 44B is a partial enlarged view of a region Q in FIG. 44A. FIG. 44C is a perspective view of the light guide member 11 as seen from the −Z direction.

In FIG. 44A, Wt represents the overall size (width) of the light guide member 11, AL represents the size (length of one side of the square) of the light-emitting surface 1*a* of the light-emitting unit 1, and Tt represents the overall thickness of the light guide member 11.

In FIG. 44B, Fp represents the pitch (spacing between adjacent outer circumferential portions of concentric circles) in the Fresnel lens portion 31, and FA represents the angle of the lens surface of the Fresnel lens portion 31 with respect to the X direction. The pitch and the angle of the lens surface with respect to the X direction of the Fresnel lens portion 31 can be adjusted as appropriate by adjusting the position where the plurality of protrusions of the Fresnel lens portion 31 is provided. In1 represents the size (width) of the first incident portion 12, In2 represents the size (width) of the frame part of the second incident portion 13, η1 represents the angle of the third incident portion 14, and η2 represents the angle of the total reflection portion 23. Note that η1 is an angle formed by a line connecting both end points in the Z direction of the third incident portion 14 and a line along the X direction, and η2 is an angle formed by a line connecting both end points in the Z direction of the total reflection portion 23 and a line along the X direction.

In FIG. 44C, Ar1 (hatched portion) represents the area of the third incident portion 14, and Ar2 (dotted portion) represents the area of the total reflection portion 23.

Table 1 below is a table showing examples of each dimension of the light-emitting device 100.

TABLE 1

| Member | Position | Item | Range |
|---|---|---|---|
| Light-emitting unit | Light-emitting surface | Size AL | Square with sides of 0.2 mm to 3.0 mm |
| Light guide member | Overall | Size Wt | Diameter 1.5 mm to 15.0 mm |
| | | Thickness Tt | 0.4 mm to 4.0 mm |
| | First incident portion | Size In1 | 0.3 mm to 10.0 mm |
| | Second incident portion | Size In2 | 0.2 mm to 2.5 mm |
| | Third incident portion | Angle η1 | 60 degrees to 80 degrees |
| | | Area | 0.7 mm$^2$ to 70.0 mm$^2$ |
| | | Shape | May be not curved |
| | Total reflection portion | Angle η2 | 50 degrees to 75 degrees |
| | | Area | 1 mm$^2$ to 120 mm$^2$ |
| | | Shape | May be not curved |
| | Fresnel | Angle FA | 0 degrees to 45 degrees |
| | | Pitch Fp | 0.1 mm to 0.5 mm |

In Table 1, "range" indicates the range that each item may adopt. For example, "square with sides of 0.2 mm to 3.0 mm" for the size AL of the light-emitting surface 1*a* in the light-emitting unit 1 indicates a square with sides of from 0.2 mm to 3.0 mm. The meaning of "to" is the same for items other than the size AL of the light-emitting surface 1*a*.

As an example, by configuring the light-emitting device 100 with the dimensions shown in Table 1, the effects of the light-emitting device 100 described below can be obtained.

Effects of Light-emitting Device 100

As described above, the light-emitting device 100 according to an embodiment includes the light-emitting unit 1 including the light-emitting surface 1*a*; the light guide member 11 including the total reflection portion 23 that reflects incident light from the light-emitting unit 1 and a Fresnel lens portion 31 where the light reflected by the total reflection portion 23 is incident, the light guide member 11 being configured to guide the incident light; and the movement mechanism 70 configured to move the light guide member 11 relative to the light-emitting unit 1 in a direction that intersects the center axis 1*c* of the light-emitting surface 1*a*.

Because the light guide member 11 includes the total reflection portion 23, light, of the light emitted from the light-emitting unit 1, emitted in a wide angle can be focused, and the light from the light-emitting unit 1 can be efficiently extracted to the outside. As a result, a large amount of light emitted by the light-emitting device 100 can be ensured.

Furthermore, because the light guide member 11 moves relative to the light-emitting unit 1, the irradiation direction of the light can be changed, and partial irradiation can be performed at a desired position and in a desired direction. Furthermore, because the distance between the light-emitting unit 1 and the light guide member 11 can be shortened, the light-emitting device 100 capable of partially irradiating a desired region in the irradiatable region 200 can be made compact. In addition, because a large area of the light-emitting surface 1*a* of the light-emitting unit 1 can be ensured, a large amount of light emitted by the light-emitting device 100 can be ensured.

Accordingly, in the present embodiment, the light-emitting device 100 provided can change the irradiation direction of light and efficiently extract light from the light-emitting unit 1 to the outside.

For example, in a case in which a light-emitting device is installed in a device such as a smartphone or a camera, when a user manually moves the device itself to change the partial irradiation region, the imaging area also changes, so it may be difficult to perform the operation of partially irradiating a desired region such as the periphery of the face of the person in the imaging area. In the present embodiment, because only the partial irradiation region 210 is changed by the movement mechanism 70 while the device is stationary, the operation of changing the partial irradiation region 210 can be easily performed.

Furthermore, when the partial irradiation region is changed by inclining the light guide member, for example, the light-emitting device is made thicker to accommodate the inclination of the light guide member. In the present embodiment, because the light guide member 11 is moved in a direction that intersects with the center axis 1c of the light-emitting surface 1a, it is possible to avoid increasing the thickness of the light-emitting device 100 compared to a case in which the light guide member is to be inclined.

In the present embodiment, the light guide member 11 preferably includes the Fresnel lens portion 31 on the emission side of the guided light. Because the Fresnel lens portion 31 allows the direction of the emitted light to be accurately determined, the light-emitting device 100 can accurately partially irradiate a desired region of the irradiatable region 200. Also, the Fresnel lens portion 31 makes the light-emitting unit 1 less conspicuous from the outside, thus improving the appearance of the light-emitting device 100. However, the light guide member according to the present embodiment is not limited to one including the Fresnel lens portion 31 on the emission side of the guided light. The light guide member can be the light guide member 11W (see FIG. 18) or the like where the emission side of the guided light is a flat surface. Also with this configuration, an effect can be obtained in which the irradiation direction of the light can be changed and the light from the light-emitting unit 1 can be efficiently extracted to the outside.

In the present embodiment, the movement mechanism 70 preferably moves the light guide member 11 relative to the light-emitting unit 1 while the light-emitting unit 1 is emitting light. Accordingly, because the region to be partially irradiated can be varied without switching the light-emitting unit 1, the partial irradiation region 210 on the irradiatable region 200 can be continuously changed without interruption of the partial irradiation.

For example, when the light-emitting device includes a plurality of light-emitting units and the partial irradiation region is changed by selectively causing a portion of the plurality of light-emitting units to emit light, partial irradiation is interrupted at the timing of switching the light emission of the light-emitting units, and thus intermittent changes in the partial irradiation region are caused. In a case in which the partial irradiation region intermittently changes, it may be difficult to perform the operation of changing the partial irradiation region in cases such as where the light-emitting device is installed in a device such as a smartphone. In the present embodiment, the partial irradiation region 210 can be continuously changed, and thus the operability of the operation to change the partial irradiation region 210 can be further improved. In addition, in a case in which continuous image capture such as capturing video is required, if the partial irradiation region changes intermittently, this change will also be recorded, which may cause the resulting video to appear unnatural. With the present embodiment, such unnatural appearance can be improved.

Also, in the present embodiment, the total reflection portion 23 is preferably formed in a substantially rectangular frame-like shape in a plan view, and the movement mechanism 70 preferably moves the light guide member 11 relative to the light-emitting unit 1 such that the light-emitting surface 1a of the light-emitting unit 1 is located inside the total reflection portion 23 in a plan view. Accordingly, even when the light guide member 11 moves relative to the light-emitting unit 1, the light emitted from the light-emitting surface 1a is inhibited from leaking from the light guide member 11 and can be reflected by the total reflection portion 23. As a result, light loss, stray light, or the like caused by light leaking from the light guide member 11 can be inhibited.

Also, in the present embodiment, the total reflection portion 23 is formed in a substantially rectangular frame-like shape in a plan view, and the light guide member 11 includes the first incident portion 12, the second incident portion 13, and the third incident portion 14 inward of the total reflection portion 23 formed into a substantially rectangular frame-like shape. Furthermore, the first incident portion 12, the second incident portion 13, and the third incident portion 14 preferably have a curved surface that focuses incident light from the light-emitting unit 1. By the focusing action of the curved surface, a desired region of the irradiatable region 200 can be more accurately partially irradiated by the light-emitting device 100 compared to a case in which the inside of the total reflection portion 23 is flat.

Additionally, in the present embodiment, the curved surface of the first incident portion 12, the second incident portion 13, and the third incident portion 14 provided inward of the total reflection portion 23 in a plan view is preferably a plurality of curved surfaces having different radii of curvature. With this configuration, it is possible to more accurately partially irradiate a desired region of the irradiatable region 200 by the light-emitting device 100 and make the light guide member 11 compact.

In addition, in the present embodiment, the total reflection portion 23 is preferably formed in a substantially rectangular frame-like shape in a plan view, and an area of the region inward of the outer edge 231 of the total reflection portion 23 is preferably larger than an area of the light-emitting surface 1a of the light-emitting unit 1. According to this configuration, when the light-emitting unit 1 faces the central region (in other words, the first incident portion 12) of the light guide member 11, most of the incident light on the light guide member 11 does not reach the total reflection portion 23, so the spread of light is suppressed, and a desired region of the irradiatable region 200 can be more accurately partially irradiated by the light-emitting device 100.

In the present embodiment, a shortest distance between the light-emitting surface 1a of the light-emitting unit 1 and the light guide member 11 in a direction orthogonal to the light-emitting surface 1a is preferably from 0.0 mm to 1.0 mm. With this configuration, the light-emitting device 100 can be made thinner. Also, when the light-emitting unit 1 faces the central region (in other words, the first incident portion 12) of the light guide member 11, most of the incident light on the light guide member 11 does not reach the total reflection portion 23, so that the spread of light is suppressed, and a desired region of the irradiatable region 200 can be more accurately partially irradiated by the light-emitting device 100.

Note that in the present embodiment described above, the total reflection portion 23 has a substantially rectangular frame-like shape in a plan view, but the shape of the total reflection portion 23 in a plan view may be a polygonal frame shape other than a rectangular frame shape, an annular shape, or the like, and in these cases, a similar effect can be obtained.

First Modified Example

In the embodiment described above, by the movement mechanism 70, the light guide member 11 is moved relative to the light-emitting unit 1 in a direction that intersects the center axis 1c of the light-emitting surface 1a. However, the light-emitting unit 1 may be moved relative to the light guide member 11.

Figure 45:
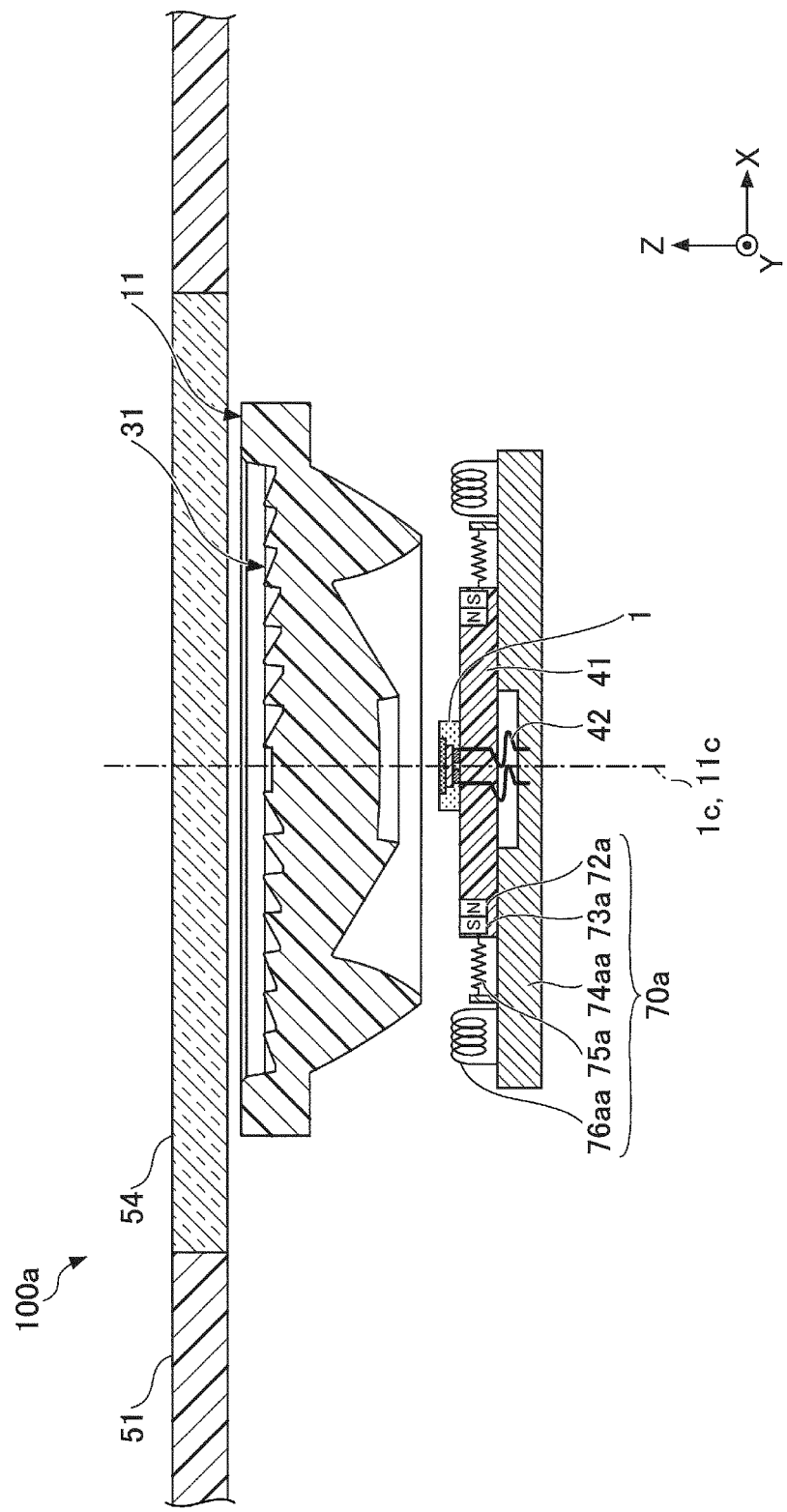
FIG. 45 is a cross-sectional view illustrating the configuration of a light-emitting device according to a first modified example.
Figure 46:
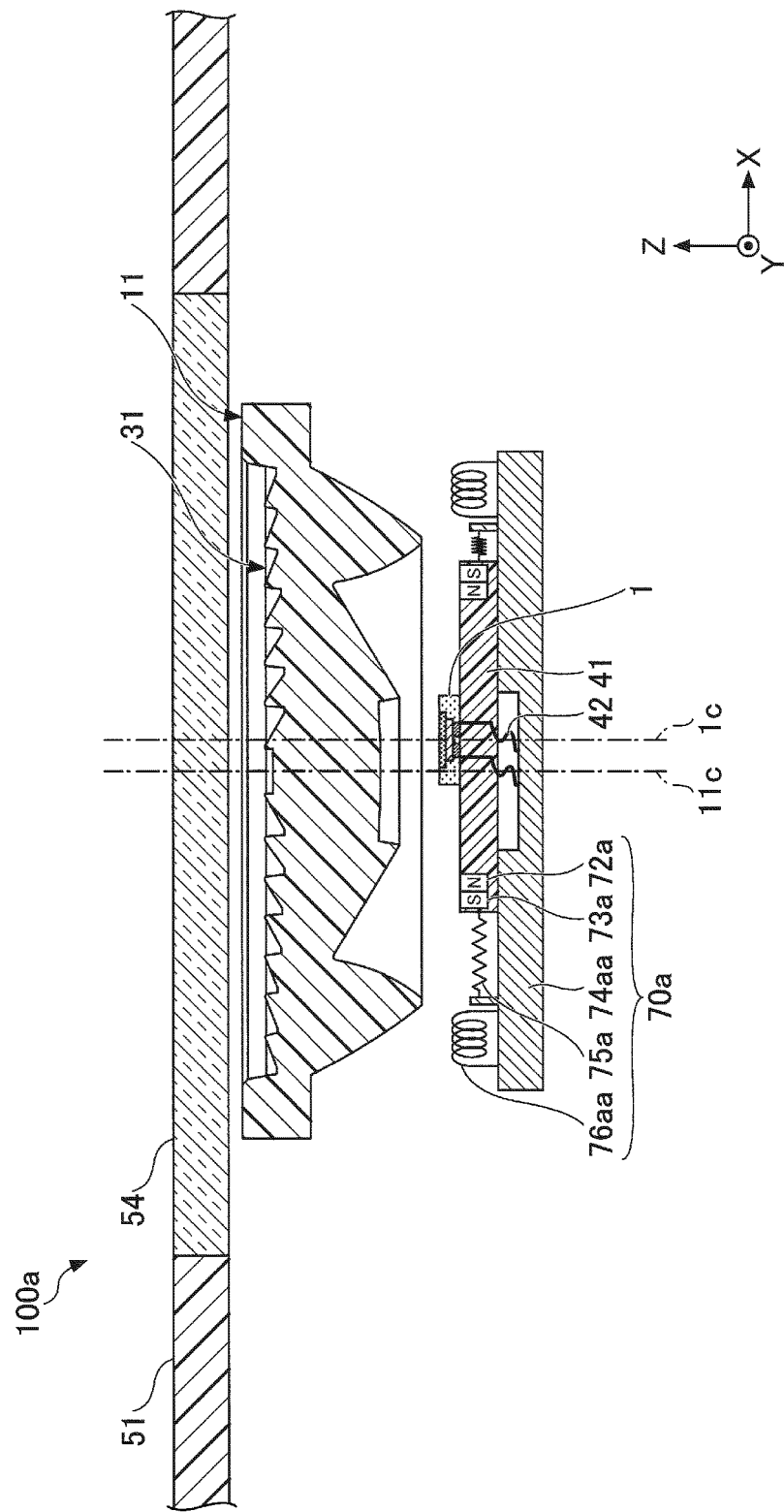
FIG. 46 is a cross-sectional view illustrating the light-emitting device in FIG. 44 in a state in which a light-emitting unit has been moved.

FIG. 45 is a cross-sectional view illustrating an example of the configuration of a light-emitting device 100a according to a first modified example. In the light-emitting device 100a, the light-emitting unit 1 is movable relative to the light guide member 11. Also, FIG. 46 is a cross-sectional view illustrating the light-emitting device 100a of FIG. 45 in a state in which the light-emitting unit 1 has been moved. Note that components that are the same as those described above in the embodiment will be denoted by the same reference numerals, and redundant descriptions thereof will be omitted as appropriate. This is the same for each of the following modified examples.

As illustrated in FIGS. 45 and 46, the light-emitting device 100a includes a movement mechanism 70a. The movement mechanism 70a includes an N pole magnet 72a, an S pole magnet 73a, a platform portion 74aa, a spring 75a, and a coil 76aa. The N pole magnet 72a and the S pole magnet 73a are provided at least one of on the surface of and/or in an interior of the light-emitting unit mounting substrate 41.

The platform portion 74aa is configured to move the light-emitting unit mounting substrate 41 in the XY plane. The wiring 42 for inputting a drive signal to the light-emitting unit 1 is provided on the platform portion 74aa. One end of the spring 75a is connected to the light-emitting unit mounting substrate 41, and the other end is connected to a portion of the platform portion 74aa. When current flows through the coil 76aa, an electromagnetic force is generated by the action of the N pole magnet 72a, the S pole magnet 73a, and the coil 76aa.

The movement mechanism 70a can cause the light-emitting unit mounting substrate 41 to be moved in a direction substantially orthogonal to the center axis 11c of the light guide member 11 by the generated electromagnetic force. Accordingly, the light-emitting unit 1 mounted on the light-emitting unit mounting substrate 41 can be moved relative to the light guide member 11. Accordingly, the light-emitting device 100a provided can change the irradiation direction of light and efficiently extract light from the light-emitting unit 1 to the outside. Effects other than this effect are similar to the embodiments.

Note that in the embodiments, provided that the light guide member 11 can be moved relative to the light-emitting unit 1 in a direction that intersects the center axis 11c of the light guide member 11, the configuration for relative movement is not limited to that described above. For example, a member to which the light guide member 11 is fixed may be moved, or a member to which the light-emitting unit 1 is mounted or fixed may be moved.

Second Modified Example

Figure 47:
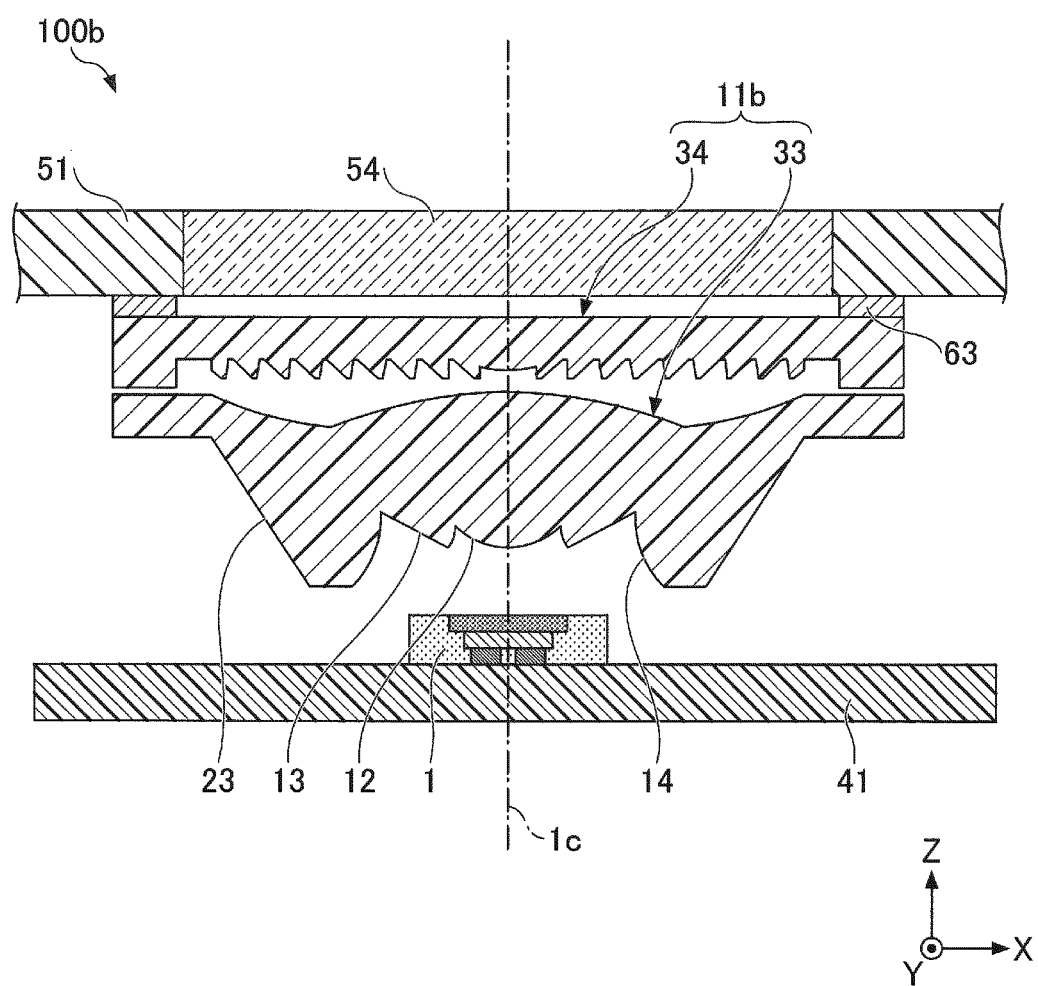
FIG. 47 is a cross-sectional view illustrating the configuration of a light-emitting device according to a second modified example.

Next, FIG. 47 is a cross-sectional view illustrating an example of the configuration of a light-emitting device 100b according to a second modified example. The light-emitting device 100b includes a light guide member 11b. The light guide member 11b includes a first lens 33 and a second lens 34.

The first lens 33 includes the first incident portion 12, the second incident portion 13, the third incident portion 14, and the total reflection portion 23. The first lens 33 functions similarly to the configuration on the side of the light guide member 11 described above where the light from the light-emitting unit 1 is incident. The second lens 34 includes a Fresnel lens portion including a plurality of protrusions on the −Z side surface. The second lens 34 is an example of a Fresnel lens.

In other words, in the light guide member 11b, a configuration on the side of the light guide member 11 on which light from the light-emitting unit 1 is incident corresponds to the first lens 33 and a configuration including the Fresnel lens portion 31 corresponds to the second lens 34, and these lenses are provided separately.

The first lens 33 and the second lens 34 may be bonded to each other by an adhesive member or the like, or may be formed integrally. Alternatively, an adhesive member 63 can be used to bond the second lens 34 to the housing 51 such that the first lens 33 and the second lens 34 are fixed to the housing 51.

Relative movement between the light-emitting unit 1 and the light guide member 11b in a direction that intersects with the center axis 1c of the light-emitting surface 1a may be achieved by moving the light-emitting unit mounting substrate 41 on which the light-emitting unit 1 is mounted or may be achieved by moving the housing 51 to which the light guide member 11b is fixed.

According to the configuration described above, the light-emitting device 100b provided can change the irradiation direction of light and efficiently extract light from the light-emitting unit 1 to the outside. Effects other than this effect are similar to the embodiments.

Third Modified Example

Figure 48:
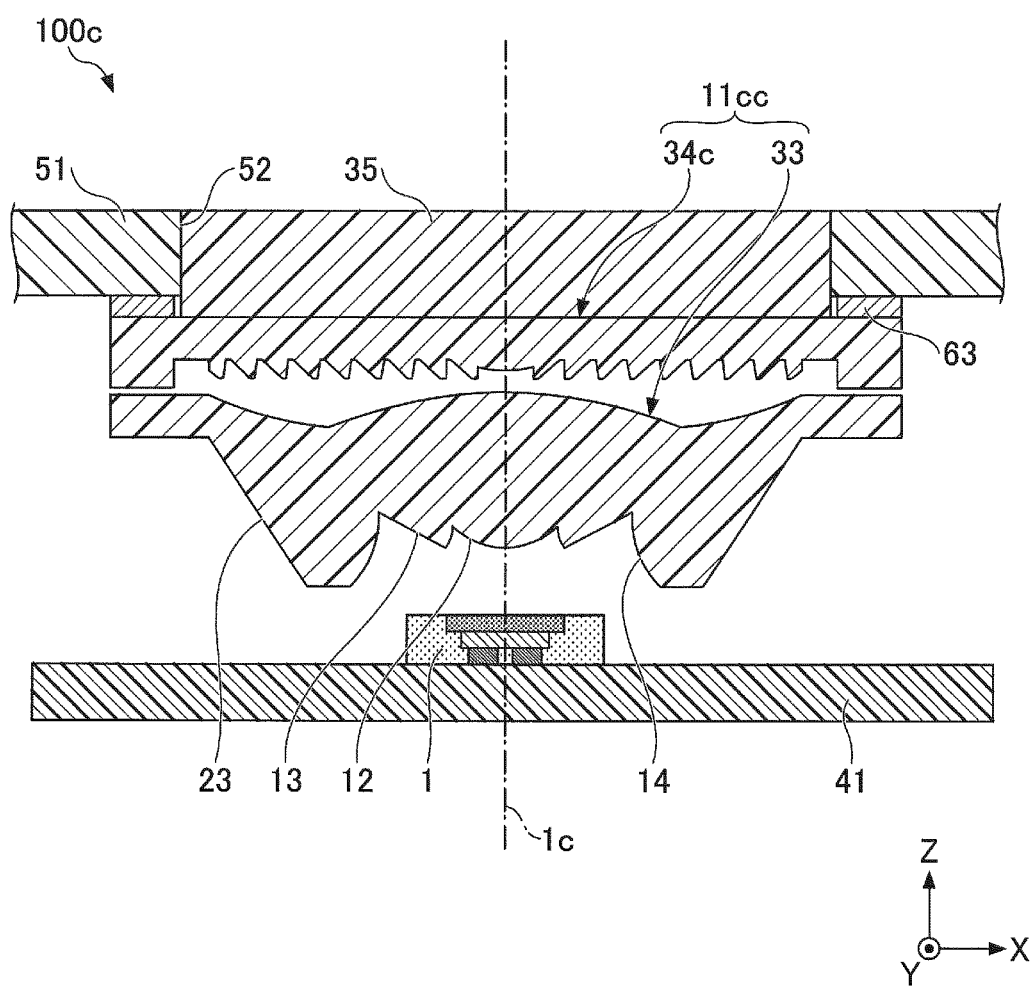
FIG. 48 is a cross-sectional view illustrating the configuration of a light-emitting device according to a third modified example.

FIG. 48 is a cross-sectional view illustrating an example of the configuration of a light-emitting device 100c according to a third modified example. The light-emitting device 100c includes a light guide member 11cc. The light guide member 11cc includes a second lens 34c. The second lens 34c is a lens in which a Fresnel lens including a plurality of protrusions is formed on the −Z side surface, and a protrusion portion 35 is formed on the +Z side surface.

Similar to the light guide member 11b, in the light guide member 11cc, a configuration on the side of the light guide member 11 on which light from the light-emitting unit 1 is incident corresponds to the first lens 33 and a configuration including the Fresnel lens portion 31 corresponds to the second lens 34c, and these lenses are provided separately. The second lens 34c is an example of a Fresnel lens. The first lens 33 and the second lens 34c may be bonded to each other by an adhesive member or the like, or may be formed integrally. Alternatively, the adhesive member 63 can be used to bond the second lens 34c to the housing 51 such that the first lens 33 and the second lens 34c are fixed to the housing 51.

The light-emitting device 100c does not include the light-transmitting body 54, and the opening 52 is sealed when the protrusion portion 35 formed in the second lens 34c is inserted into the opening 52 of the housing 51. The cost for the light-emitting device can be reduced by employing the light-emitting device 100c that does not include the light-transmitting body 54.

Note that relative movement between the light-emitting unit 1 and the light guide member 11cc in a direction that intersects with the center axis 1c of the light-emitting surface 1a may be achieved in a manner other than that described above, such as by moving the light-emitting unit mounting substrate 41 on which the light-emitting unit 1 is mounted or by moving the housing 51 to which the light guide member 11cc is fixed.

According to the configuration described above, the light-emitting device 100c provided can change the irradiation direction of light and efficiently extract light from the light-emitting unit 1 to the outside. Effects other than this effect are similar to the embodiments.

The configurations described above can be modified in various ways. For example, the number of the corner portions 15 in the light guide member 11 may be increased, or the curvature of the Fresnel lens portion 31 may be changed as appropriate. Additionally, the curvature radii of the first incident portion 12, the second incident portion 13, and the third incident portion 14, or the curvature radius or inclination angle of the total reflection portion 23 may be appropriately changed.

In the embodiment described above, a so-called single eye configuration is described in which, in the light-emitting device 100, the light-emitting unit and the light guide member form a pair, but the same effect can be obtained even with a so-called compound eye configuration in which the light-emitting device 100 has a plurality of pairs of light-emitting units and light guide members.

In the embodiment described above, a configuration is described in which a Fresnel lens is provided on the side of the light-emitting device that emits light, but the same effect can be obtained even in a configuration in which a column-shaped light guide member is disposed in an array on the side of the light-emitting device that emits light.

In the embodiment described above, a configuration is described in which the light guide member is moved relative to the light-emitting unit in a direction that intersects with the center axis of the light-emitting surface of the light-emitting unit, but a similar effect can be obtained even in a configuration in which the light guide member is rotated relative to the light-emitting unit about a center axis of the light-emitting surface of the light-emitting unit or the center axis of the light guide member.

The light-emitting device of the present disclosure can irradiate a desired partial irradiation region with light, and thus can be suitably used for lighting, the flash of a camera, headlights on a vehicle, and the like. However, the light-emitting device of the present disclosure is not limited to these uses.

What is claimed is:

1. A light-emitting device comprising:
    a light-emitting unit having a light-emitting surface;
    a light guide member configured to guide light from the light-emitting unit, the light guide member having a first surface that comprises an incident portion on which light from the light-emitting unit is incident, and a second surface from which the light exits, the second surface comprising a plurality of concentric protrusions; and
    a movement mechanism configured to move the light guide member such that the incident portion and the plurality of concentric protrusions move together relative to the light-emitting unit in a first direction that intersects a center axis of the light-emitting surface;
    wherein:
    the incident portion comprises a protrusion that protrudes toward the light-emitting unit side.

2. The light-emitting device according to claim 1, wherein:
    the movement mechanism is configured to move the light guide member relative to the light-emitting unit while the light-emitting unit is emitting light.

3. The light-emitting device according to claim 1, wherein:
    the light guide member further comprises a total reflection portion,
    the total reflection portion has a frame-like shape or an annular shape and surrounds the incident portion in a plan view, and
    the movement mechanism is configured to move the light guide member relative to the light-emitting unit such that the light-emitting surface of the light-emitting unit is located inward of the total reflection portion in a plan view.

4. The light-emitting device according to claim 1, wherein:
    the light guide member further comprises a total reflection portion,
    the total reflection portion has a frame-like shape or an annular shape and surrounds the incident portion in a plan view, and
    the light guide member includes a curved surface provided inward from the total reflection portion, the curved surface being configured to focus the incident light from the light-emitting unit.

5. The light-emitting device according to claim 4, wherein:
    the curved surface comprises a plurality of curved surfaces having different curvature radii.

6. The light-emitting device according to claim 1, wherein:
    the light guide member further comprises a total reflection portion,
    the total reflection portion has a frame-like shape or an annular shape and surrounds the incident portion in a plan view, and
    an area of a region inward of an outer edge of the total reflection portion is greater than an area of the light-emitting surface of the light-emitting unit.

7. The light-emitting device according to claim 1, wherein:
    a shortest distance between the light-emitting surface of the light-emitting unit and the light guide member in a direction orthogonal to the light-emitting surface is in a range of 0.0 mm to 1.0 mm.

8. The light-emitting device according to claim 1, wherein:
    a center axis of the light guide member coincides with a center axis of the incident portion and with a center of the plurality of concentric protrusions.

9. The light-emitting device according to claim 1, wherein:
    the incident portion and the plurality of concentric protrusions are formed of a single monolithic structure.

10. The light-emitting device according to claim 1, wherein:
    the movement mechanism is a first movement mechanism;
    the light-emitting device further comprises an additional movement mechanism configured to move the light guide member such that the incident portion and the plurality of concentric protrusions move together relative to the light-emitting unit in a second direction that intersects the center axis of the light-emitting surface and that intersects the first direction.

11. The light-emitting device according to claim 1, wherein:
the movement mechanism comprises an electromagnetic actuator.

12. The light-emitting device according to claim 1, wherein:
the light-emitting unit is one of a plurality of light-emitting units that are configured to be independently controlled and turned on.

13. The light-emitting device according to claim 1, wherein:
the light-emitting unit is one or a plurality of light-emitting units that are arranged in a grid.

14. The light-emitting device according to claim 1, wherein:
the light-emitting unit comprises:
a light-emitting element,
a light-transmitting member located above an upper surface of the light-emitting element, and
a covering member that covers a lateral surface of the light-emitting element and a lateral surface of the light-transmitting member.

15. The light-emitting device according to claim 1, wherein:
the second surface further comprises a curved surface that is curved away from the first surface, and
the plurality of concentric protrusions surround the curved surface.

16. A light-emitting device comprising:
a light-emitting unit having a light-emitting surface;
a light guide member configured to guide light from the light-emitting unit, the light guide member having a first surface that comprises an incident portion on which light from the light-emitting unit is incident, and a second surface from which the light exits, the light guide member comprising:
a first lens and a second lens wherein:
the first lens comprises the incident portion,
the second lens comprises a plurality of concentric protrusions, and
the second lens is on a light emission side of the first lens; and
a movement mechanism configured to move the light guide member such that the incident portion and the plurality of concentric protrusions move together relative to the light-emitting unit in a first direction that intersects a center axis of the light-emitting surface.

17. The light-emitting device according to claim 16, wherein:
the first lens and the second lens are bonded to each other.

18. A light-emitting device comprising:
a light-emitting unit having a light-emitting surface;
a light guide member configured to guide light from the light-emitting unit, the light guide member having a first surface that comprises an incident portion on which light from the light-emitting unit is incident, and a second surface from which the light exits, the second surface comprising a plurality of concentric protrusions; and
a movement mechanism configured to move the light guide member such that the incident portion and the plurality of concentric protrusions move together relative to the light-emitting unit in a first direction that intersects a center axis of the light-emitting surface;
wherein:
a center axis of the light guide member coincides with a center axis of the incident portion and with a center of the plurality of concentric protrusions.

\* \* \* \* \*